(12) United States Patent
van't Schip et al.

(10) Patent No.: US 11,473,649 B2
(45) Date of Patent: Oct. 18, 2022

(54) CONVEYOR BELT FASTENER APPLICATORS AND FASTENER BEDS

(71) Applicant: Flexible Steel Lacing Company, Downers Grove, IL (US)

(72) Inventors: Joannes Stefanus van't Schip, Ionia, MI (US); Daniel J. Kuiper, Alto, MI (US); Jason Carr, Kent City, MI (US); Nekheel Gajjar, Lisle, IL (US); William J. Daniels, Orland Park, IL (US); William Robert Wawczak, Glen Ellyn, IL (US)

(73) Assignee: Flexible Steel Lacing Company, Downers Grove, IL (US)

( * ) Notice: Subject to any disclaimer, the term of this patent is extended or adjusted under 35 U.S.C. 154(b) by 144 days.

(21) Appl. No.: 17/100,490

(22) Filed: Nov. 20, 2020

(65) Prior Publication Data

US 2021/0071736 A1    Mar. 11, 2021

Related U.S. Application Data

(63) Continuation-in-part of application No. 15/713,258, filed on Sep. 22, 2017, now Pat. No. 10,844,930.
(Continued)

(51) Int. Cl.
*B23P 11/00* (2006.01)
*F16G 3/00* (2006.01)
(Continued)

(52) U.S. Cl.
CPC ............... *F16G 3/003* (2013.01); *B27F 7/32* (2013.01); *F16G 3/006* (2013.01); *F16G 3/04* (2013.01)

(58) Field of Classification Search
CPC ......... B23P 11/00; B23P 15/00; B23P 11/005; B27F 7/17; B27F 7/19; B27F 7/23;
(Continued)

(56) References Cited

U.S. PATENT DOCUMENTS 2,899,680 A    8/1959  Potter
2,908,008 A    10/1959 Potter
(Continued)

FOREIGN PATENT DOCUMENTS

CN    2359522 Y    1/2000
CN    2589754 Y    12/2003
(Continued)

OTHER PUBLICATIONS

Invitation to Pay Additional Fees and, Where Applicable, Protest Fee mailed Jan. 5, 2022, issued in corrseponding International Application No. PCT/US21/57049, 2 pages.
(Continued)

*Primary Examiner* — Lee D Wilson
(74) *Attorney, Agent, or Firm* — Fitch, Even, Tabin & Flannery LLP

(57) ABSTRACT

In one aspect, a system is provided for securing fasteners to a conveyor belt end. The system includes a fastener bed to support fasteners, the fastener bed including a plurality of aligned fastener holes configured to receive staples of lower plates of the fasteners. The system further includes an applicator comprising a plurality of operating members operable to interface with the fastener holes of the fastener bed to advance the applicator along the fastener bed, secure the applicator relative to the fastener bed, and drive legs of the staples through the conveyor belt and into apertures of upper plates of the fasteners. The applicator is operable to urge upper plates of the fasteners against the conveyor belt end and bend the staple leg end portions against the upper
(Continued)

plates of the fasteners to secure the fasteners to the conveyor belt end.

36 Claims, 73 Drawing Sheets

Related U.S. Application Data

(60) Provisional application No. 63/106,816, filed on Oct. 28, 2020, provisional application No. 62/398,978, filed on Sep. 23, 2016.

(51) Int. Cl.
*F16G 3/04* (2006.01)
*B27F 7/32* (2006.01)

(58) Field of Classification Search
CPC ......... B27F 7/32; B25C 5/025; B25C 5/0235; B25C 5/0285; F16G 3/00; F16G 3/003; F16G 3/04; F16G 3/006; F16G 3/16
See application file for complete search history.

(56) References Cited

U.S. PATENT DOCUMENTS

| | | | |
|---|---|---|---|
| 2,908,009 A | 10/1959 | Potter | |
| 3,458,099 A | 7/1969 | Jules | |
| 4,144,628 A | 3/1979 | Schick | |
| 4,333,217 A | 6/1982 | Pray | |
| 4,538,755 A | 9/1985 | Schick | |
| 4,789,092 A | 12/1988 | Schick | |
| 4,995,542 A | 2/1991 | Schick | |
| 5,044,539 A | 9/1991 | Hargreaves | |
| 5,170,924 A * | 12/1992 | Musil | F16G 3/16 227/111 |
| 5,531,012 A | 7/1996 | Schick | |
| 5,544,801 A | 8/1996 | Schick | |
| 5,848,463 A * | 12/1998 | Herold | F16G 3/16 227/155 |
| 7,080,767 B2 | 7/2006 | Kurabayashi | |
| 7,267,256 B2 | 9/2007 | Kobayashi | |
| 8,327,515 B2 * | 12/2012 | Ren | F16G 3/16 29/408 |
| 8,403,139 B2 | 3/2013 | Richardson et al. | |
| 8,740,032 B2 | 6/2014 | Chan | |
| 8,789,252 B2 | 7/2014 | Ng | |
| 8,931,155 B2 | 1/2015 | Daniels | |
| 9,556,930 B2 | 1/2017 | Daniels | |
| 10,844,930 B2 * | 11/2020 | van't Schip | F16G 3/003 |
| 2010/0319175 A1 | 12/2010 | Daniels | |
| 2017/0043524 A1 | 2/2017 | Guttenberg | |
| 2018/0087601 A1* | 3/2018 | van't Schip | B25C 5/11 |
| 2021/0071736 A1* | 3/2021 | van't Schip | B25C 5/11 |

FOREIGN PATENT DOCUMENTS

| | | |
|---|---|---|
| CN | 200940660 Y | 8/2007 |
| CN | 200940674 Y | 8/2007 |
| CN | 200978942 Y | 11/2007 |
| CN | 200982374 Y | 11/2007 |
| CN | 101126431 A | 2/2008 |
| CN | 101126432 A | 2/2008 |
| CN | 201031918 Y | 3/2008 |
| CN | 201031919 Y | 3/2008 |
| CN | 201031920 Y | 3/2008 |
| CN | 201050574 Y | 4/2008 |
| CN | 201050575 Y | 4/2008 |
| CN | 101210601 A | 7/2008 |
| CN | 101245825 | 8/2008 |
| CN | 101245825 A | 8/2008 |
| CN | 201133442 Y | 10/2008 |
| CN | 201133445 Y | 10/2008 |
| CN | 101328951 A | 12/2008 |
| CN | 101334087 A | 12/2008 |
| CN | 101334088 A | 12/2008 |
| CN | 201170287 Y | 12/2008 |
| CN | 101487512 A | 7/2009 |
| CN | 101487528 A | 7/2009 |
| CN | 100557266 C | 11/2009 |
| CN | 101131195 B | 5/2010 |
| CN | 101210602 B | 9/2010 |
| CN | 101270795 B | 11/2010 |
| CN | 101270795 B1 | 11/2010 |
| CN | 102116361 A | 7/2011 |
| CN | 102116362 A | 7/2011 |
| CN | 102235479 A | 11/2011 |
| CN | 202108928 U | 1/2012 |
| CN | 202215667 U | 5/2012 |
| CN | 202719073 U | 2/2013 |
| CN | 302476655 S | 6/2013 |
| CN | 103615498 A | 3/2014 |
| CN | 203627650 U | 6/2014 |
| CN | 203702989 U | 7/2014 |
| CN | 203702990 U | 7/2014 |
| CN | 204344807 U | 5/2015 |
| CN | 109488725 A | 3/2019 |
| CN | 209414512 U | 9/2019 |
| GB | 2202605 | 9/1988 |
| GB | 2230074 | 10/1990 |
| SU | 101109 A1 | 11/1954 |
| SU | 229120 A1 | 2/1969 |
| WO | 2009106013 | 9/2009 |

OTHER PUBLICATIONS

International Search Report and the Written Opinion mailed in corresponding International Patent Application No. PCT/US2021/057049 dated Mar. 9, 2022, 10 pages.

English translation of Office Action and Search Report (completed on Feb. 11, 2021) dated Mar. 1, 2021, issued in related Russian application No. 2019112013 (9 pages).

Translation of Office Action dated Jun. 3, 2021, issued in related Chinese Application No. 201780072150.5, (29 pages).

Machine Translation of Office Action and Supplementary Search dated Jan. 27, 2022, in related Chinese Application No. 201780072150.5, (19 pages).

International Search Report and Written Opinion of related International Patent Application No. PCT/US2017/053011, dated Dec. 20, 2017, 8 pages.

Extended European search report issued in European Application No. 17854008.4, dated May 27, 2020, 7 pages.

Translation of Office Action and Search Report dated Nov. 3, 2020, issued in related Chinese application No. 201780072150.5, 40 pages.

Communication pursuant to Article 94(3) EPC issued in European Application No. 17854008.4, dated Nov. 12, 2021.

* cited by examiner

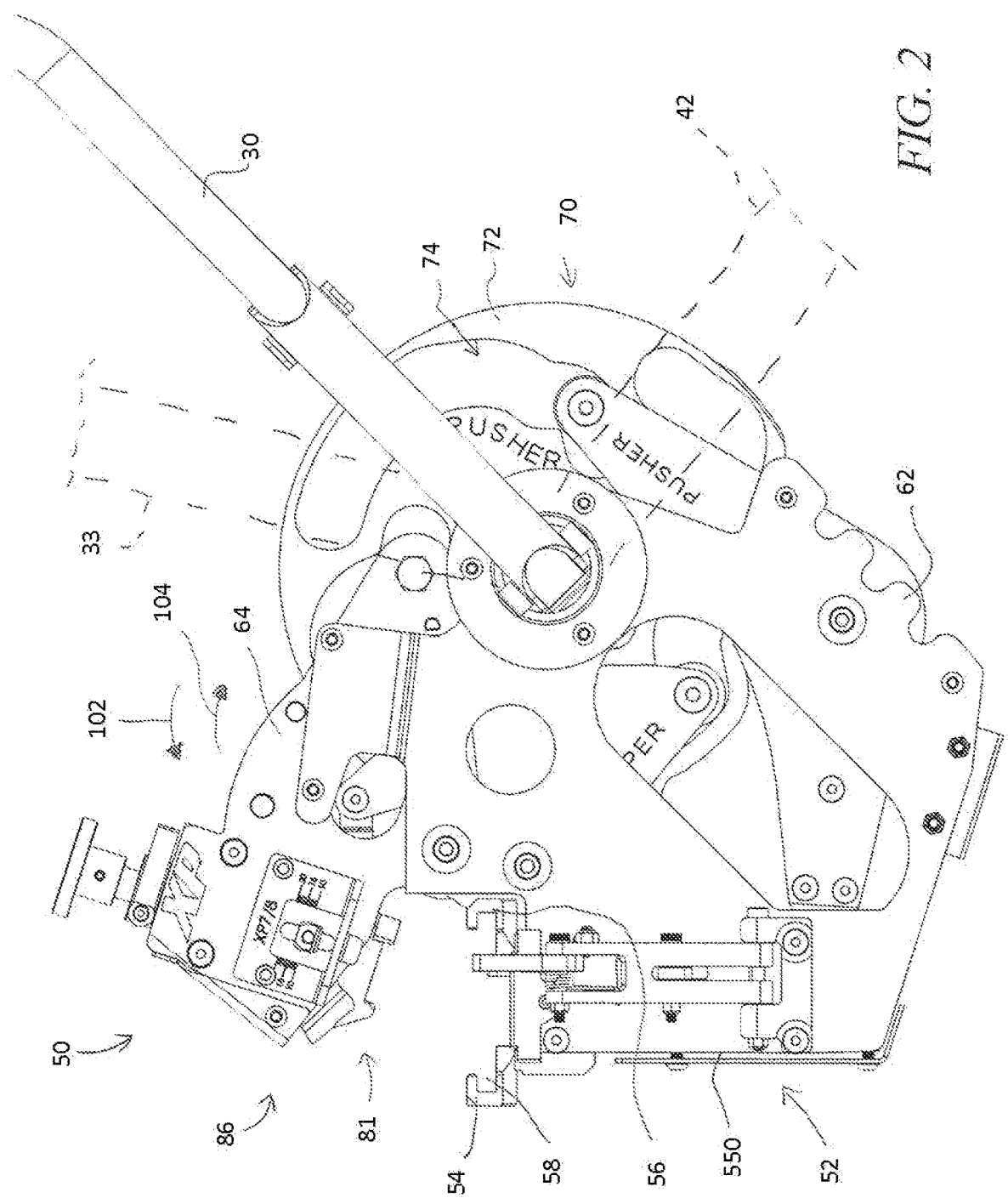

CONVEYOR BELT FASTENER APPLICATORS AND FASTENER BEDS

CROSS-REFERENCE TO RELATED APPLICATIONS

This application is a continuation-in-part of U.S. application Ser. No. 15/713,258 filed Sep. 22, 2017 which claims the benefit of U.S. Provisional Patent App. No. 62/398,978, filed Sep. 23, 2016. This application also claims the benefit of U.S. Provisional Patent App. No. 63/106,816, filed Oct. 28, 2020. All of these applications are hereby incorporated by reference herein in their entireties.

FIELD

This disclosure relates to tools for joining ends of conveyor belts and, more particularly, to tools for connecting fasteners to ends of conveyor belts.

BACKGROUND

Conveyor belt fasteners are used to join ends of a conveyor belt such as during installation of a conveyor belt or to repair a broken conveyor belt. In some approaches, each conveyor belt fastener has an upper and a lower plate joined by one or more arcuate hinge loops. Each fastener has one or more staples preinstalled or preset in apertures of one of the plates of the fastener.

To join the ends of a conveyor belt, one end of the conveyor belt is positioned between the upper and lower plates of fasteners and a machine is used to secure the plates of the fasteners to the belt. United Kingdom Patent No. 2 202 605 B discloses a prior apparatus for affixing fasteners to a conveyor belt. The apparatus has an upper die portion and a lower punch portion that are moved relative to each other by extension of a pneumatic ram of the apparatus and contact three fasteners on the conveyor belt. The upper die portion has an alignment head, a staple folding die, and a staple flattening head which each contact a different one of the three fasteners. The apparatus operates by moving the upper die portion and lower punch portion together so that the alignment head clamps the plates of a first one of the fasteners onto the belt and presses a staple through the upper and lower plates and the belt therebetween. The movement of the upper die portion and lower punch portion together causes the staple folding die to bend over the ends of a staple of a second one of the fasteners which previously had been subjected to the clamping step. Further, the movement of the upper die portion and the lower punch portion together causes the staple flattening head to clamp down the bent-over ends of a staple associated with a third one of the fasteners which had previously been subjected to the clamping and staple folding steps.

The apparatus of the '605 patent is then shifted along the conveyor belt and the upper die portion and lower punch portion are again brought together. This causes the apparatus to subject the first fastener to the staple folding step, the second fastener to the pressing step, and a third fastener to the clamping step. This sequence is repeated along the belt until all of the fasteners have been secured to the belt. Because the apparatus of the '605 patent performs one step of the fastener securing process with each advance of the apparatus along the conveyor belt, the apparatus of the '605 patent starts at one side of the conveyor belt and moves across the conveyor belt until reaching the other side. This sequential operation inhibits a user from starting the apparatus of the '605 patent at a position other than the one side of the conveyor belt, such as at the middle of the conveyor belt.

SUMMARY

In accordance with one aspect, an applicator for securing fasteners to a conveyor belt is provided that includes a body and an advancing assembly, at least one anvil, a pusher, and at least one swiper that are movably mounted to the body. The advancing assembly is operable so that a portion thereof engages a fastener bed to shift the body along the fastener bed to a fastener location therealong. The at least one anvil and a pusher are operable so that the anvil contacts an upper plate of a fastener received in the fastener bed at the fastener location to move the fastener upper plate toward a conveyor belt and the pusher drives legs of at least one staple of the fastener through the conveyor belt. The at least one swiper is operable to move the swiper along the upper plate of the fastener at the fastener location to bend end portions of the drive legs of the fastener. The applicator also includes a common rotary drive shaft mounted to the body so that rotation thereof operates the advancing assembly, the at least one anvil, the pusher, and the at least one swiper. In this manner, rotating the drive shaft operates the advancing assembly, the at least one anvil, the pusher, and the at least one swiper which makes the applicator intuitive and easy to use. Further, the applicator performs the upper plate movement, staple leg driving, and staple leg swiping on a fastener at a fastener location so that the applicator can be moved to any fastener location along the fastener bed and the drive shaft rotated to cause the applicator to secure a fastener at the fastener location to a conveyor belt. This provides a user with improved flexibility in securing one or more fasteners to a conveyor belt and stands in contrast to the apparatus of the '605 patent that sequentially advances along several fasteners to secure one of the fasteners to a conveyor belt.

In one form, the applicator includes a cam plate that is rotated by rotation of the drive shaft. The cam plate is connected to the at least one anvil, the pusher, and the at least one swiper so that rotation of the drive shaft causes rotation of the cam plate and movement of the at least one anvil, the pusher, and the at least one swiper. The cam plate provides a compact and efficient way to transfer the torque the actuator applies to the drive shaft to the at least one anvil, the pusher, and the swiper.

In accordance with another aspect, a manually-powered applicator for securing fasteners to a conveyor belt is provided that includes a body, a pilot mounted to the body and operable so that a portion of the pilot engages the fastener bed to fix the body at a fastener location along the fastener bed. The applicator includes at least one anvil, a pusher, and at least one swiper mounted to the body that are movable relative to the fastener while the pilot keeps the body fixed to the fastener bed at the fastener location therealong. The applicator includes a handle movably mounted to the body and configured to be operated manually so that the at least one anvil, the pusher, and the at least one swiper are driven by movement of the handle to move an upper plate of the fastener toward a conveyor belt, drive staple legs of the fastener through the conveyor belt, and bend end portions of the staple legs while the pilot fixes the body at the fastener location. Because the pilot fixes the body at the fastener location, the applicator operates the at least one anvil, the pilot, and the at least one swiper to perform their operations on the fastener at the fastener location before the pilot is retracted and the applicator advances to the next fastener location. If the applicator does not secure the fastener to the conveyor belt, such due to the staple legs missing apertures of the fastener upper plate, the user may simply move the handle to retract the pilot and move the applicator to the next fastener location. This permits the user to readily skip over a fouled fastener and finish securing the remaining fasteners to the conveyor belt end. The applicator thereby provides an advantage over the apparatus of the '605 patent that performs different operations on three fasteners at a time. For example, if one of the operations of the apparatus of the '605 patent fouls one fastener, the fouled fastener must be replaced and the sequence of operations is repeated on the replacement fastener. The presence of the other two fasteners that were successfully secured to the belt may interfere with the apparatus of the '605 patent performing the sequence of operations on the replacement fastener.

A method of securing fasteners to a conveyor belt is also provided that includes turning a drive shaft of an applicator to cause the applicator to advance along a fastener bed to a first fastener location. The turning of the drive shaft also causes the applicator to secure a first fastener having at least one staple to a conveyor belt while the applicator remains at the first fastener location. In this manner, the applicator is easy to use because the drive shaft is rotated to cause the applicator to both advance along the fastener bed to the first fastener location and secure the first fastener to the conveyor belt. Further, by securing the first fastener to the conveyor belt end while the applicator remains at the first fastener location, the first fastener is secured before the applicator moves on to a different fastener location. This permits a user to secure a fastener to a conveyor belt without having to proceed in a particular order of fasteners across the belt as well as permits the user to skip over fouled fasteners and continue securing fasteners to the conveyor belt.

In one form, operating the actuator to turn the drive shaft of the applicator includes pivoting a handle of the applicator in a downward direction from an upper, start position to a lower, end position. This allows the user to pull the handle downward using both hands, their arms, core, and back muscles to provide a biomechanical advantage for the user. This is particularly advantageous in confined spaces such as a mine.

In another aspect, a manually-powered applicator for securing conveyor belt fasteners to a conveyor belt is provided that includes a body configured to be connected to a fastener bed, a handle manually movable relative to the body, and at least one anvil and a pusher that are movable relative to the body. The handle has an operating mode wherein the at least one anvil and the pusher are driven by movement of the handle from initial positions thereof to move an upper plate of a fastener toward a conveyor belt and drive staple legs of the fastener through the conveyor belt. The handle also has a return mode wherein the at least one anvil and the pusher are returned to initial positions thereof. The applicator further includes a resilient drive assist that is resiliently loaded during movement of the handle in the return mode thereof and unloaded to provide a bias-assist during movement of the handle in the operating mode thereof. The resilient drive assist supplements the force the user applies to the handle and assists in moving the at least one anvil, the pusher, and/or one or more other components of the applicator. This force from the resilient drive assist may assist the user in overcoming resistance to movement of the at least one anvil, pusher, and/or one or more other components of the applicator due to friction or inertia. For example, the applicator may include an advancing member configured to engage the fastener bed and the resilient drive assist may unload to assist movement of the advancing member when the handle is in the operating mode.

In accordance with one aspect of the present disclosure, a system is provided for securing fasteners to a conveyor belt end. The system includes a fastener bed to support fasteners, the fastener bed including a plurality of aligned fastener holes configured to receive staples of lower plates of the fasteners. The system further includes an applicator comprising a plurality of operating members operable to interface with the fastener holes of the fastener bed to advance the applicator along the fastener bed, secure the applicator relative to the fastener bed, and drive end portions of legs of the staples through the conveyor belt and into apertures of upper plates of the fasteners. The applicator is operable to urge upper plates of the fasteners against the conveyor belt end and bend the staple leg end portions against the upper plates of the fasteners to secure the fasteners to the conveyor belt end. In this manner, the applicator is configured to shift along the fastener bed, locate itself along the bed at the fastener locations, and secure the fasteners to the conveyor belt end by interfacing with the fastener holes of the fastener bed.

The present disclosure also provides a system for securing fasteners to a conveyor belt end. The system includes an applicator and a fastener bed having a plurality of aligned fastener holes configured to receive staples of fasteners. The applicator includes an advancing member having at least a portion thereof configured to extend into the fastener holes, the advancing member operable to shift the applicator along the fastener bed. The applicator includes a pilot configured to extend into the fastener holes and secure the applicator along the fastener bed and an anvil configured to contact upper plates of the fasteners and move the upper plates toward a conveyor belt end received in the fasteners. The applicator further includes a pusher operable to be advanced into the fastener holes to drive end portions of legs of the fastener staples through the conveyor belt end and into apertures of the upper plates of the fastener. The applicator has a swiper operable to bend the staple leg end portions against the upper plates of the fasteners and secure the fasteners to the conveyor belt end. The advancing member, pilot, and pusher cooperate with the fastener holes and permit the applicator to be moved to any fastener location along the fastener bed and secure the fastener at the fastener location to the conveyor belt end. This approach stands in contrast to some prior applicators that had to sequentially advance along the entire belt end due to the sequence of fastener clenching, staple driving, and swiping operations performed by the prior applicators.

In yet another aspect of the present disclosure, a fastener bed is provided for facilitating the securing of fasteners to a conveyor belt end. The fastener bed includes a lower bed member having a plurality of lower hole portions and an upper bed member having a plurality of upper hole portions. The upper bed member is configured to be separably coupled to the lower bed member. The lower hole portions of the lower bed member and the upper hole portions of the upper bed member cooperate to form a plurality of fastener holes with the upper bed member coupled to the lower bed member, the fastener holes configured to receive staples of fasteners for being secured to the conveyor belt end. Each of the fastener holes include wall portions spaced apart from each other across the fastener holes, the wall portions configured to be engaged by a pilot of an applicator to secure the applicator relative to the fastener holes. The wall portions of the fastener holes are configured to guide the staples of the fasteners and a pusher of the applicator through the fastener hole as the pusher drives the staples into the conveyor belt end. The upper bed member may wear over time due to the movement of the staples and pusher through the upper hole portion. The worn-out upper bed member may be replaced by separating the upper bed member and coupling a new upper bed member to the lower bed member.

BRIEF DESCRIPTION OF THE DRAWINGS

FIG. 2 is a left side elevational view of the applicator of FIG. 1A showing the applicator removed from the fastener bed and a housing of the applicator removed;

DETAILED DESCRIPTION

Figure 1A:
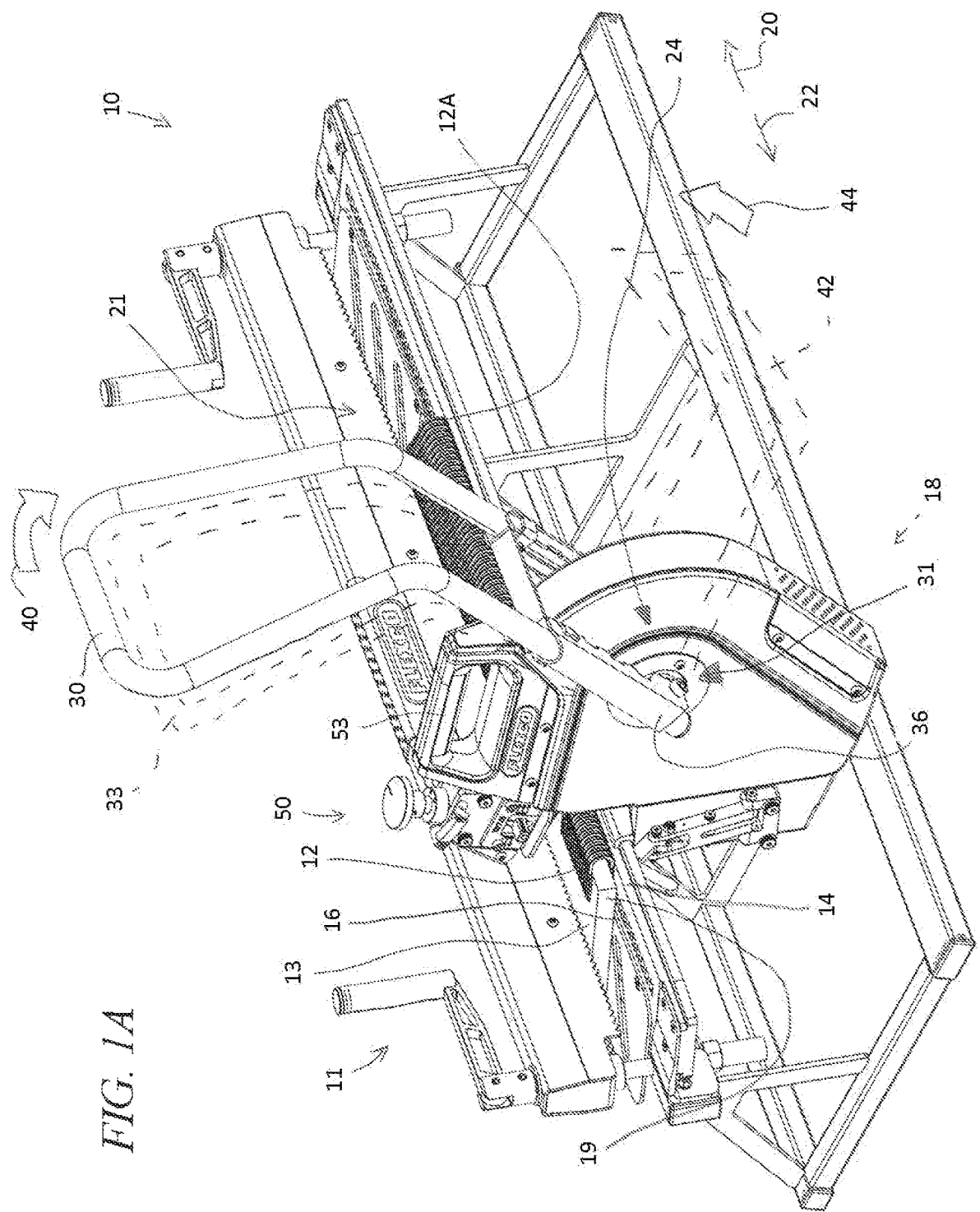
FIG. 1A is a perspective view of a conveyor belt fastener applicator system showing an applicator and a fastener bed for securing conveyor belt fasteners to an end of a conveyor belt.
Figure 1B:
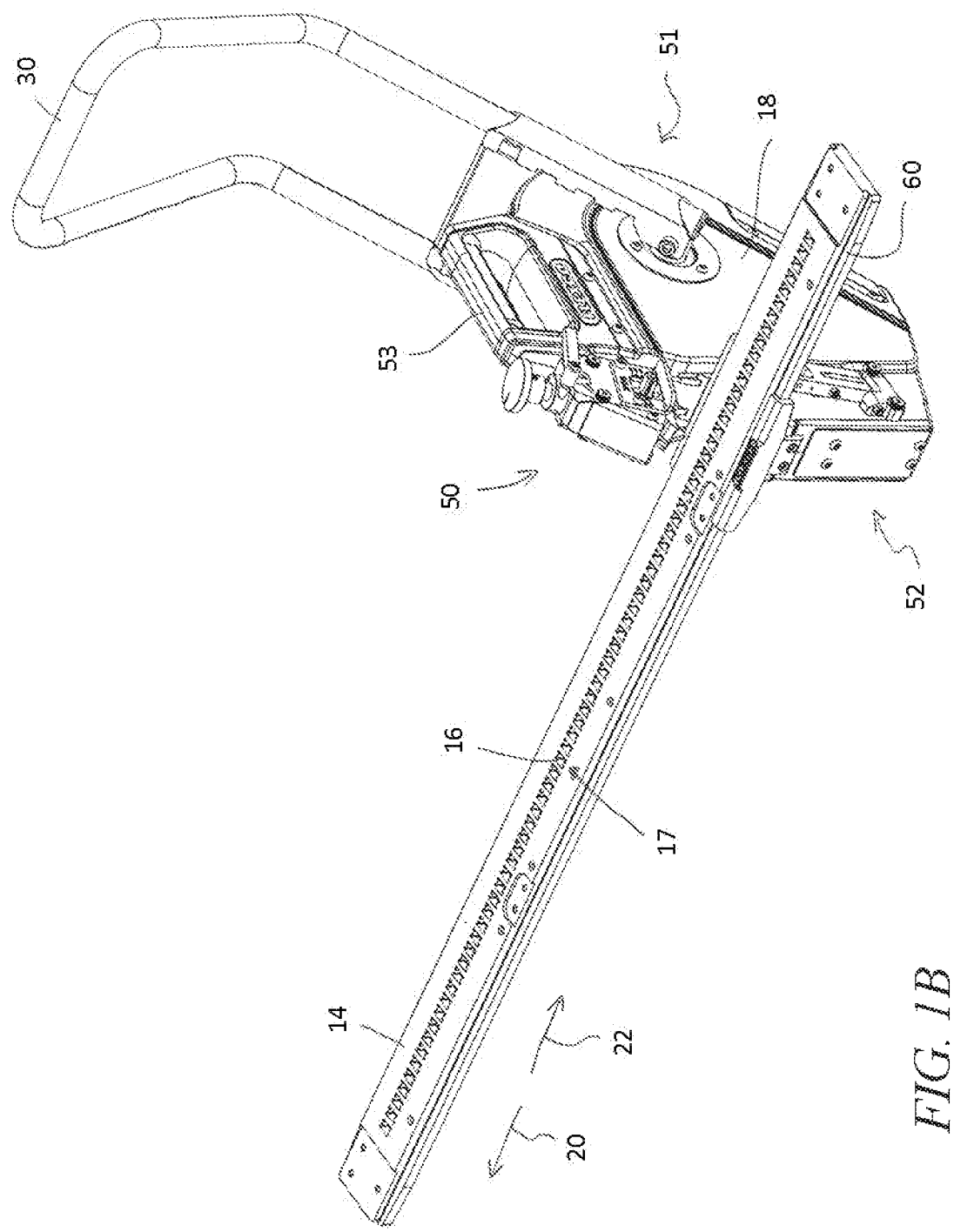
FIG. 1B is a perspective view of the applicator and the fastener bed showing the applicator slidably mounted to the fastener bed.

With reference to FIGS. 1A and 1B, a system 10 for applying fasteners 12 to a conveyor belt end 13 is provided. The system 10 includes a fixture 11 for holding the conveyor belt end 13 and an elongate fastener bed 14 for receiving a strip 12A of fasteners 12 (see FIGS. 15A and 15B). The fastener bed 14 has a hole 16 at each fastener location 17 along the fastener bed 14. Each hole 16 receives one or more staples 412 of the fastener 12 at the fastener location. The system 10 further includes an applicator 18 that is slidably mounted to the fastener bed 14 and linearly shiftable in directions 20, 22 to position the applicator 18 at any one of the holes 16 and secure the associated fastener 12 to the conveyor belt end 13. The applicator 18 has an actuator 24 that is operated to perform applicator advancing, fastener clenching, staple driving, staple leg swiping, and final set operations as discussed in greater detail below. In use, the applicator 18 may be positioned on the fastener bed 14 toward a first side 19 of the conveyor belt end 13 and the actuator 24 is operated to move the applicator 18 in direction 20 along the fastener bed 14 and sequentially apply the fasteners 12 to the conveyor belt end 13 until reaching a second side 21 thereof such that all of the fasteners 12 in the strip 12A are secured to the belt end 13. In one form, the applicator 18 performs all of the operations required to secure the fastener 12 to the conveyor belt end 13 before advancing to the next fastener 12.

The applicator 18 has a drive 31 configured to transfer an input from the actuator 24 into the applicator advancing, fastener clenching, staple driving, and staple leg swiping and final set operations involved in securing the fasteners 12 to the conveyor belt end 13. In one form, the drive 31 includes a drive shaft 32 and the actuator 24 includes a handle 30 connected to the drive shaft 32 via a mount 36. The mount 36 may be adjustable to allow a user to change the position of the handle 30 relative to the drive shaft 32. The handle 30 has an operating mode wherein movement of the handle 30 effectuates the operations involved in securing a fastener 12 to the conveyor belt end 13 and a return mode wherein movement of the handle 30 causes the components that perform the fastener securing operations to return to their initial positions and be ready for the next operating mode.

To operate the applicator 18, the handle 30 is pivoted in generally downward from an upper, initial position 33 in direction 40 to a lower, end position 42. In one approach, the drive 31 is configured to cause all of the applicator advancing, fastener clenching, staple driving, staple leg swiping, and final set operations in response to the handle 30 traveling from its upper, initial position 33 to its lower, end position 42. Thus, when the handle 30 has reached the lower, end position 42, the applicator 18 has performed all of the operations involved in securing the fastener 12 to the conveyor belt end 13 and the user simply returns the handle in direction 44 to the upper, initial position 33 thereof so the applicator 18 is ready for being advanced to the next, adjacent fastener 12. Because all of the operations are performed by pivoting the single handle 30 downward in direction 40, the applicator 18 is intuitive and straightforward to use. The single-stroke movement of the handle 30 in pivotal downward direction 40 also allows a user to pull the handle 30 downward using their arms, core, and back muscles to provide a biomechanical advantage for the user.

This biomechanical advantage is pronounced in confined quarters, such as a mine, where a user may be on their knees using the system 10 to secure the fasteners 12 to the conveyor belt end 13. In another form, the actuator 24 includes a motor, such as an electric or hydraulic motor, connected to the drive shaft 32 and operable to turn the drive shaft 32 in directions 40, 44 to secure fasteners 12 to the conveyor belt end 13 and drive the applicator 18 along the fastener bed 14. In yet another form, the actuator 24 may include a handheld power tool such as a drill.

The applicator 18 may secure only one fastener 12 to the conveyor belt end 13 with each movement of the handle from the upper, initial position 33 to the lower position 42. If the applicator 18 cannot secure the fastener 12 to the conveyor belt end 13, such as due to legs 460, 462 of staples 412 (see FIG. 15A) of the fastener 12 missing apertures 464 of an upper plate 414 of the fastener 12, the user may simply return the handle 30 in pivotal upward direction 44 back to the upper, initial position 33. The user then pivots the handle 30 in direction 40, which causes the applicator 18 to shift in direction 20 and moves the applicator 18 to the next fastener 12. In this manner, the applicator 18 may move from the unsecured fastener 12 to the next fastener 12.

Another advantage of the applicator 18 is that the advancing operation is controlled by a first portion, such as ten to fifteen degrees, of the downward stroke of the handle 30 in direction 40. This allows a user to shift the applicator 18 along the fastener bed 14 in direction 20 to the next hole 16 with each pivot of the handle 30 in direction 40 through the fifteen degrees and back upward in direction 44. Because the handle 30 only pivots through a short arc, the applicator 18 can be advanced to a particular fastener 12 along the conveyor belt end 13 without pivoting the handle 30 to the lower, end position 42 and causing the applicator 18 to perform the fastener clenching, staple driving, staple swipe, and final set operations. This is particularly advantageous if there are fasteners 12 secured to the conveyor belt end 13 since the fastener clenching, staple driving, and staple swipe operations could interfere with those fasteners 12.

With reference to FIGS. 1B and 2, the applicator 18 has a head 50 that is pivotal relative to a body 52. The body 52 includes a fastener bed interface, such as a pair of side guide bearings, such as gibs 54, 56, which have a generally u-shaped configuration to define a recess 58 opening towards each other. The recesses 58 of the gibs 54, 56 receive a lower, enlarged base portion 60 of the fastener bed 14. The body 52 includes frame plates 62 and the applicator 18 includes a pair of head arms 64 that support the head 50 and are pivotally connected to the frame plates 62 at a pivot connection such as formed by a bushing 94 (see FIG. 3). The applicator 18 includes a housing 51 to protect the internal components of the applicator 18. The housing 51 may include a handle 53. The handle 53 is secured to the frame plates 62 to permit a user to carry the applicator 18 by the handle 53.

In operation, pivoting the handle 30 in direction 40 to the lower position 42 causes the head 50 to pivot in direction 102, push the upper plate 414 of the fastener 12 down to clench the fastener 12 onto the conveyor belt end 13, and keep downward pressure on the fastener upper plate 414 to keep the fastener 12 held and clamped on the conveyor belt end 13 as the projecting ends 415 (see FIG. 27) of the staple legs 460, 462 are pressed through the upper plate 414 and swiped. The fastener 12 may be clenched onto the belt end 13 by the head 50 pressing the upper plate 414 toward the lower plate 416 and compressing the conveyor belt end 13 therebetween. In another approach, the fastener 12 may be clenched onto the belt end 13 by the head 50 pressing the upper plate 414 toward the lower plate 416 until the upper plate is nominally above the conveyor belt end 13 so that the conveyor belt end 13 is not compressed between the upper and lower plates 414, 416.

Swiping and clamping of the staple leg ends 415 into recesses or channels 454, 456 (see FIG. 15A) of the upper plate 414 keeps the upper and lower fastener plates 414, 416 securely clamped to the conveyor belt end 13 as will be described hereinafter.

Pivoting the handle 30 in direction 44 back to the upper, initial position 33 causes the head 50 to pivot in direction 104 and release the clamping pressure on the fastener 12 so that the applicator 18 may be advanced in direction 20 to the next fastener 12.

Figure 5:
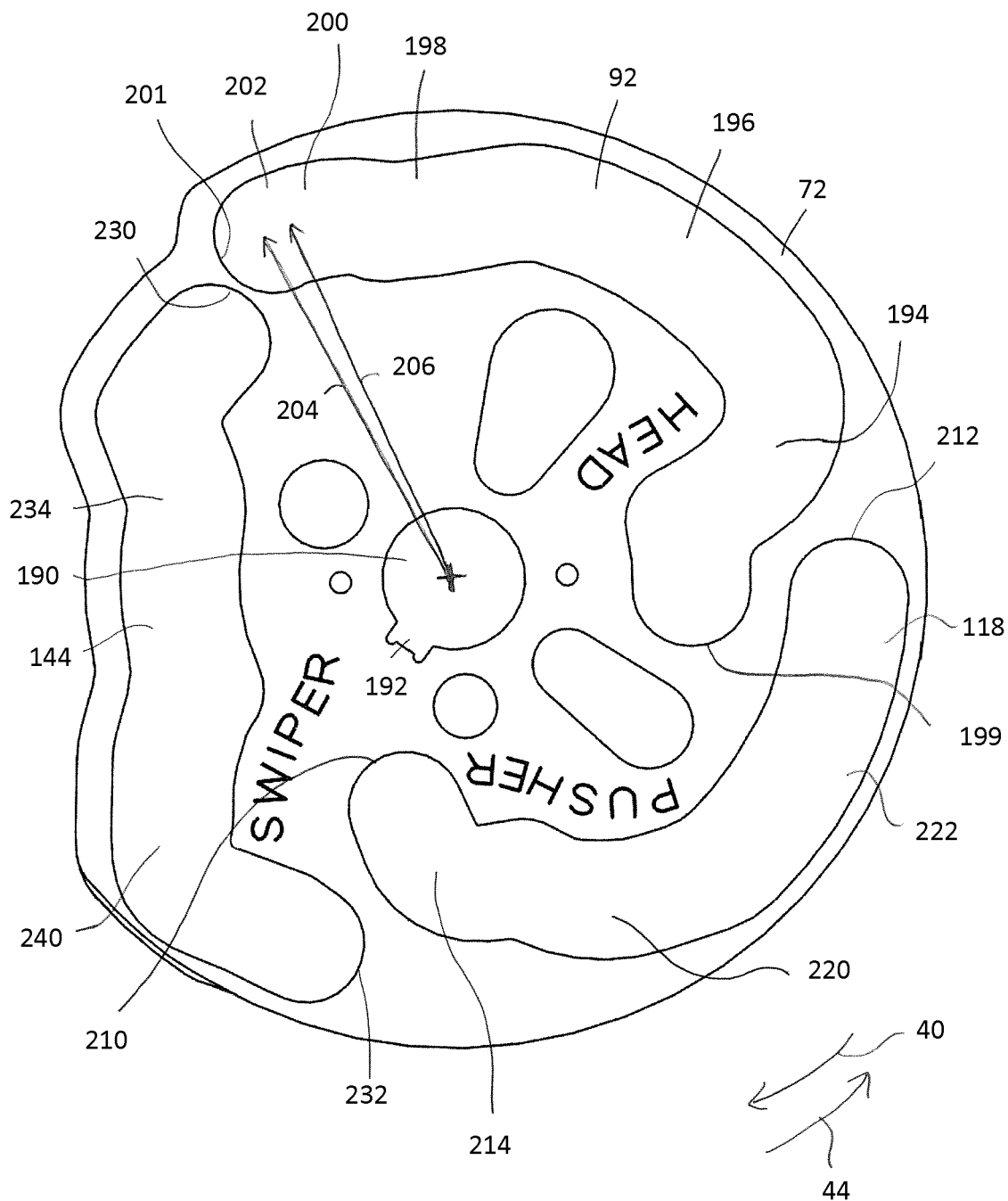
FIG. 5 is an elevational view of a cam plate of the applicator of FIG. 3 showing cam paths that control the operation of the applicator.

The drive 31 of the applicator controls the movement of different components of the applicator 18 to perform the operations on the fastener 12. In one form, the drive 31 includes at least one cam member, such as a cam plate 72, with cam paths 74 formed therein. The cam plate 72 is fixed relative to the drive shaft 32 to rotate therewith so that pivoting of the handle 30 in direction 40 produces corresponding rotation of the cam plate 72 in direction 40. Pivoting of the handle 30 in direction 40 from the start position 33 to the end position 42 turns the cam plate 72 through angular positions A-K as discussed below, with angular position A being the starting angular position of the cam plate 72 and angular position K being the end angular position of the cam plate 72. Although the cam member is shown in FIG. 5 as being a single cam plate 72, in other forms the cam member may include a plurality of cam members having one or more cam paths thereon that are fixed to the drive shaft 32 and rotate therewith.

Figure 4:
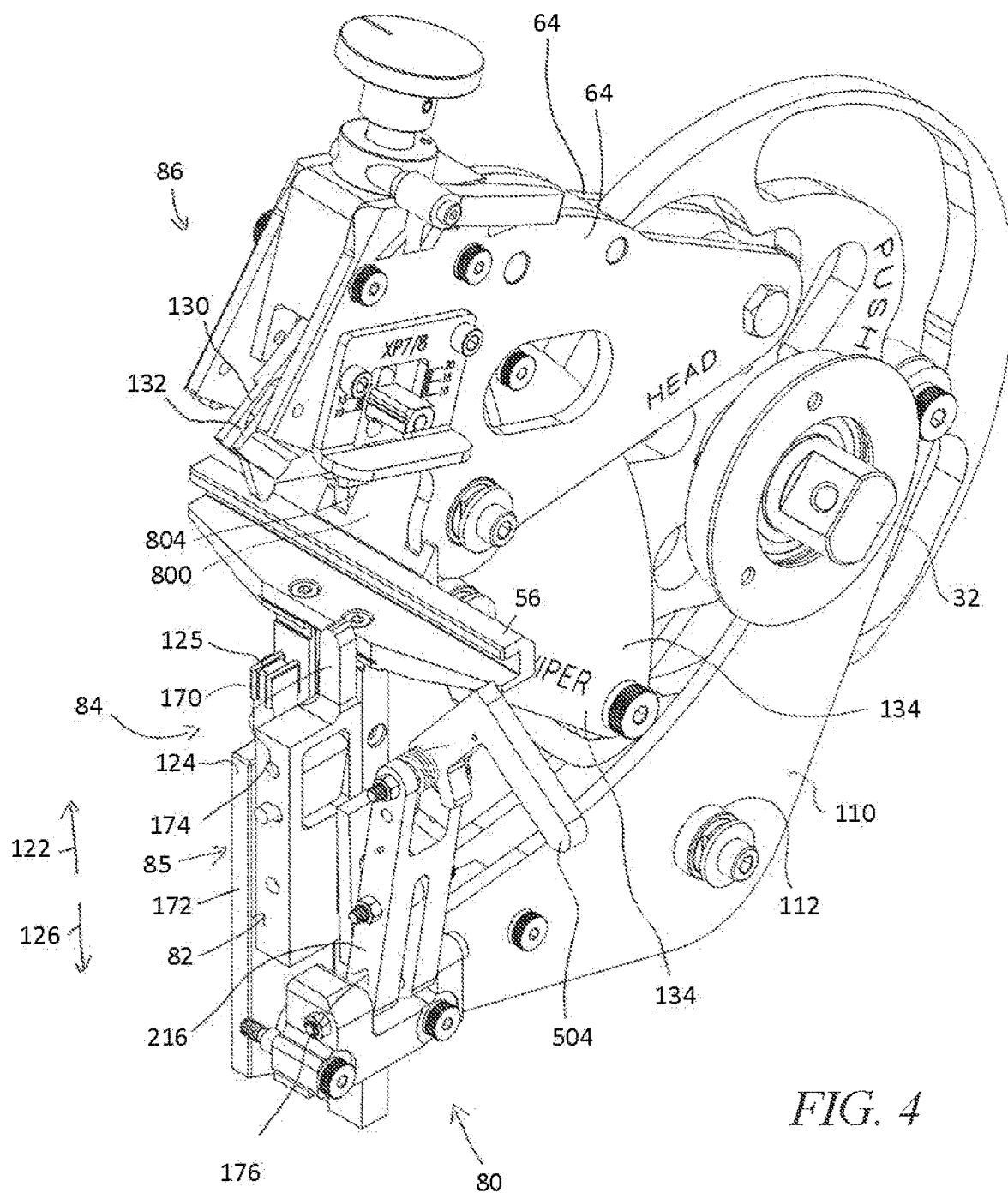
FIG. 4 is a perspective view of the applicator of FIG. 3 with portions removed to show an advancing arm, a pilot, and a staple pusher of the applicator.

With reference to FIG. 4, the operating components of the applicator 18 that are controlled by the drive 31 may include an advance mechanism 80, a pilot mechanism 82, and a pusher mechanism 84 having portions thereof that may be disposed below the fastener bed 14. The cam plate 72 may also control the operation of a swiper mechanism 86 that is configured to bend the ends 415 of the staple legs 460, 462 over after the staples 412 have been driven through the conveyor belt end 13.

Figure 3:
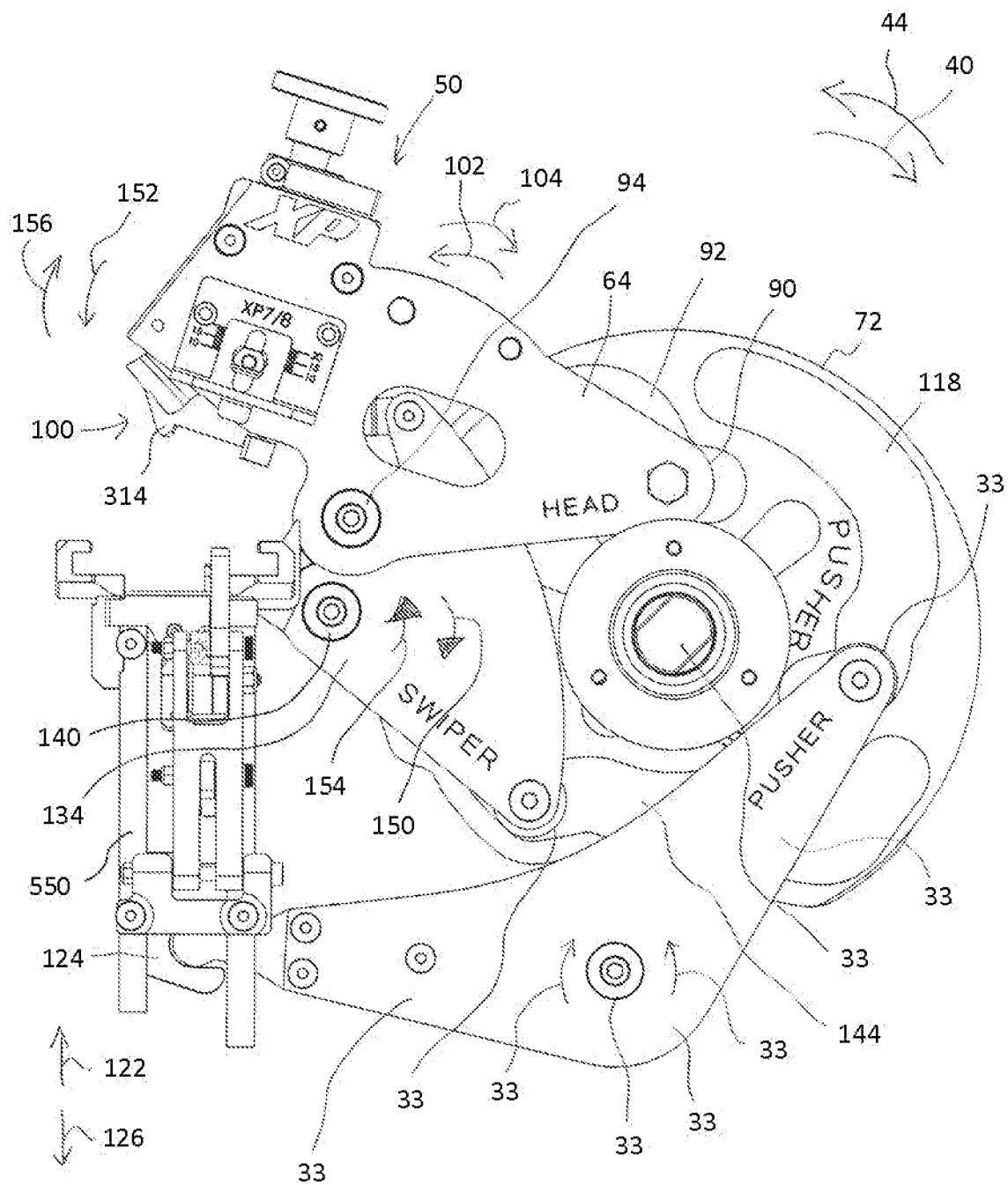
FIG. 3 is a view similar to FIG. 2 with frame plates of the applicator removed to show internal components of the applicator including a pivotal head and a body of the applicator.

With reference to FIGS. 2 and 3, the head arms 64 connect to a head cam follower 90 that travels in a head cam path 92 of the cam plate 72. Radial movement of the head cam follower 90 relative to the drive shaft 32 causes the head arms 64 to pivot about the bushing 94 which pivotally connects the head arms 64 to the frame plates 62. To clench the fastener 12 onto the conveyor belt end 13, the head 50 includes one or more anvils 100 that contact the upper plate 414 (see FIG. 15A) of the fastener 12. The one or more anvils 100 may be fixed during operation relative to the head arms 64 so that pivoting of the head arms 64 in directions 102, 104 produces corresponding pivoting of the one or more anvils 100.

With reference to FIGS. 3 and 4, the pusher mechanism 84 includes a pusher 124 and pusher arms 110 for moving the pusher 124 in directions 122, 126 in response to rotation of the cam plate 72. The pusher 124 has a driving portion 125 with a pair of grooves that receive the crowns 463 (see FIG. 15A) of the fasteners 12. The pusher arms 110 can have a V-shaped or bell-crank type configuration and are pivotally connected to the frame plates 62 by a pivot connection, such as formed by a bushing 112, generally at a juncture between transverse arm portions 110A, 110B. The transverse arm portion 110B is connected to a pusher cam follower 116 that rides in a pusher cam path 118 of the cam plate 72. Radially outward movement of the pusher cam follower 116 away from the shaft 32 creates pivoting of the pusher arms 110 in direction 124 and corresponding upward movement of the pusher 124. Conversely, radially inward movement of the pusher cam follower 116 toward the shaft 32 creates pivoting of the pusher arms 110 in direction 120 and downward movement of the pusher 124 in direction 126. To translate the pivoting of the arms 110 into vertical movement of the pusher 124, the ends of the arm portions 110A of the pusher arms 110 are connected to a pusher ball 612 that is received in a socket 610 of the pusher 124 (see FIGS. 20 and 24).

Figure 6:
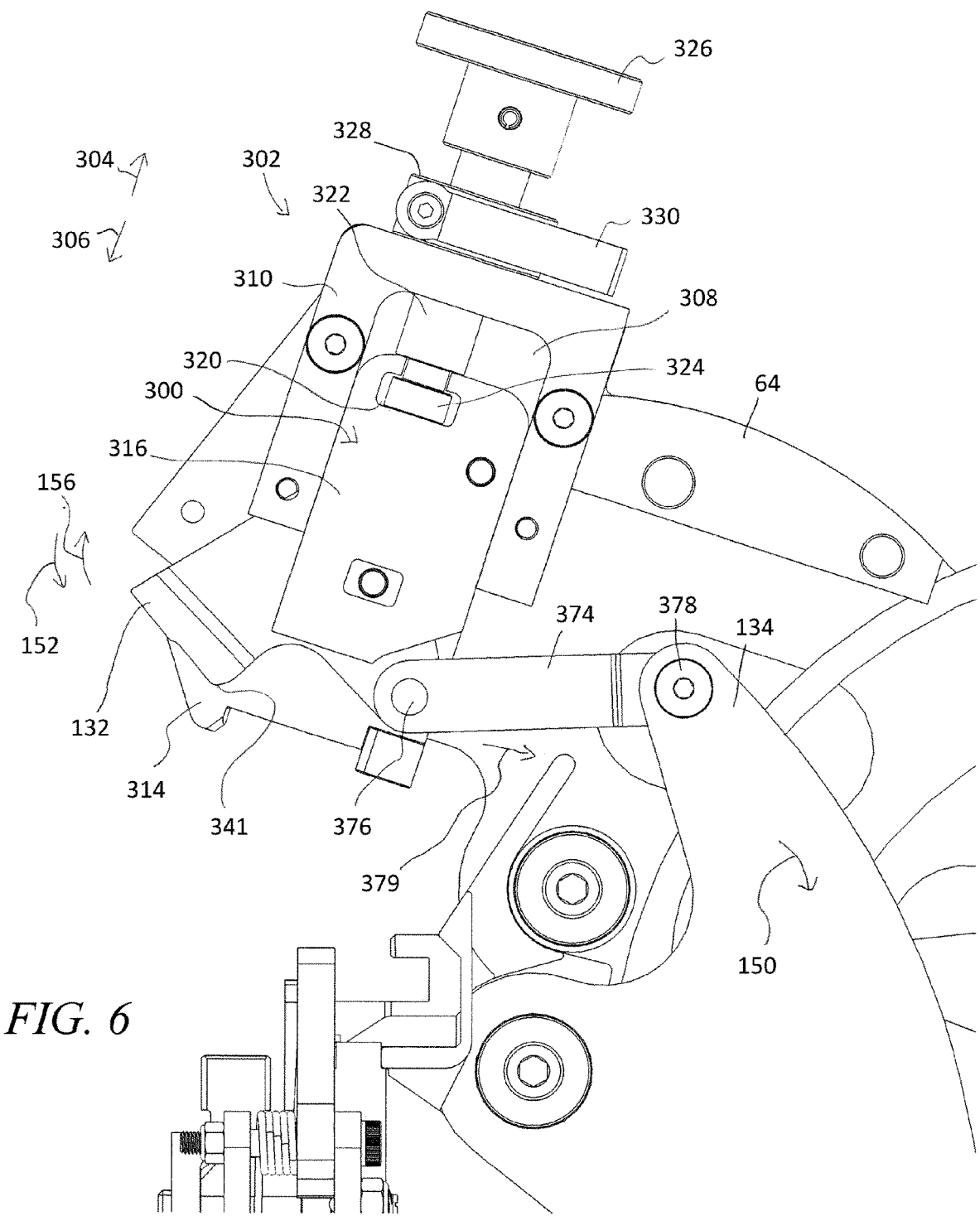
FIG. 6 is side elevation view the head of the applicator and a height adjustment mechanism for the head.

With reference to FIGS. 4 and 6, the swiper mechanism 86 includes a pair of swipers 130, 132 connected by links 374 (see FIG. 6) to swiper arms 134. Pins 376 extend through openings 380 (see FIGS. 11 and 12) of the swipers 130, 132 and connect the swipers 130, 132 to the links 374. Likewise, pins 378 connect the links 374 to the swiper arms 134. The swiper arms 134 are, in turn, pivotally connected to the frame plates 62 by a pivot connection, such as formed by a bushing 140 (see FIG. 3), and are also connected to a swiper cam follower 142. The swiper cam follower 142 rides in a swiper cam path 144 of the cam plate 72. Radially outward movement of the swiper cam follower 142 away from the shaft 32 causes the swiper arms 134 to pivot in direction 150 and pivot the swipers 130, 132 in direction 152 by way of the links 374. Conversely, radially inward movement of the swiper cam follower 142 toward the shaft 32 causes the swiper arms 134 to pivot in direction 154 and pivot the swipers 130, 132 in direction 156.

When the handle 30 is pivoted from the initial or upper, start position 33 in direction 40, the swiper cam path 144 is configured so that the swipers 130, 132 pivot in direction 152 from an outboard position (see FIG. 3) to an inboard position (see FIG. 28) to bend the projecting ends 415 of the staple legs 460, 462. When the handle 30 is pivoted in direction 44 back toward the upper, start position 33, the cam plate 72 rotates in direction 44 and causes the swipers 130, 132 to pivot in direction 156 back to the outboard position so that the swipers 130, 132 are returned back toward their initial position. Preferably, the head 50 pivots upward as the handle 30 is pivoted in direction 44 back toward the upper, start position 33 so that the swipers 130, 132 avoid contact with the staple legs 460, 462 as the swipers 130, 132 return to the outboard position thereof.

Figure 18:
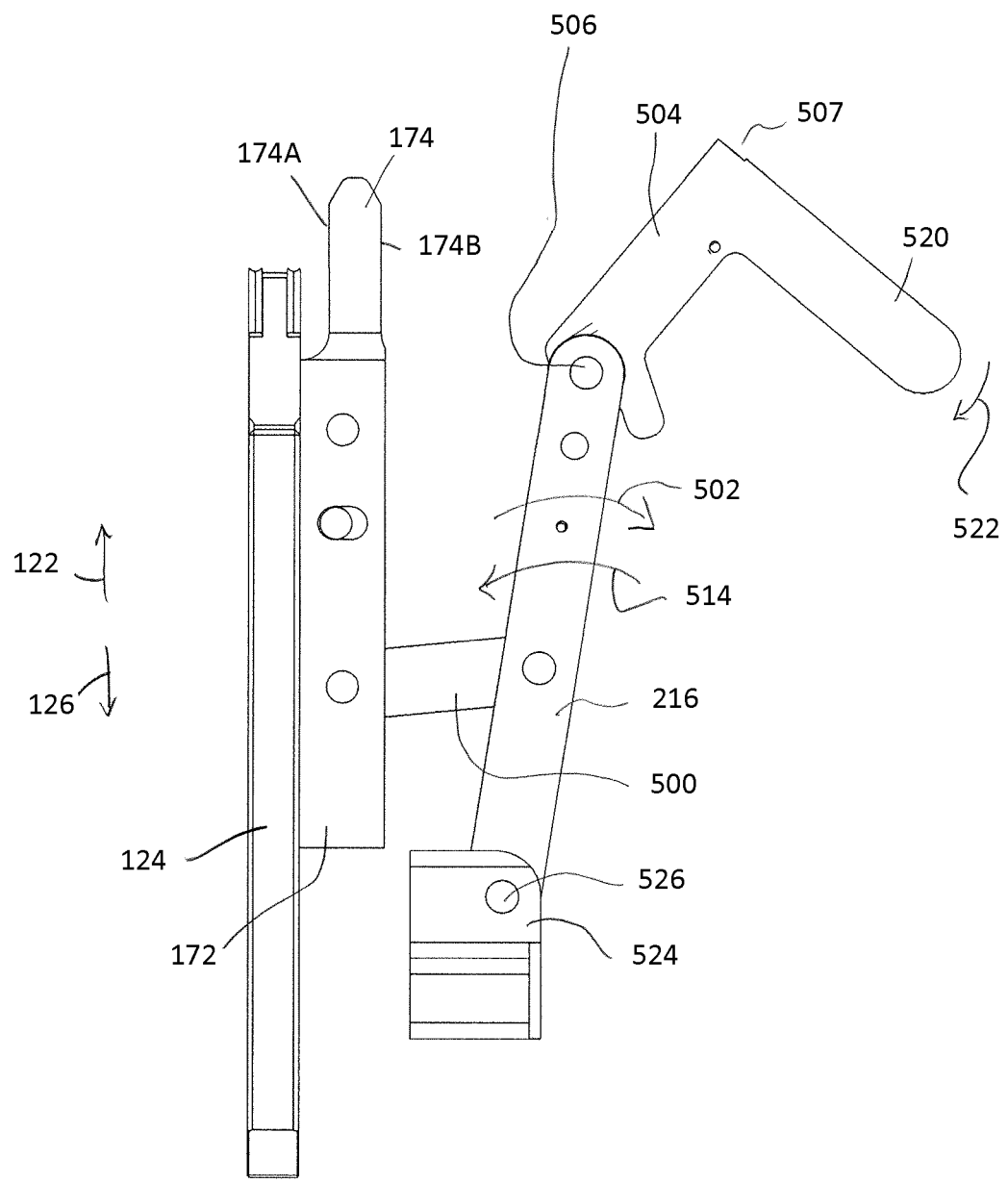
FIG. 18 is a front elevation view of the pusher, pilot, and advancing arm of FIG. 4 showing a link connecting the advancing arm to the pilot.

With reference to FIGS. 4 and 18, the advance mechanism 80 includes a pilot 172 having a projecting finger portion 174 for being advanced in direction 122 into an enlarged lower portion 570 (see FIG. 46) of the hole 16 as will be described more fully hereinafter. The pusher 124 and the pilot 172 are positioned so that the pusher 124 and the pilot 172 extend into holes 16 that are immediately adjacent to each other. Alternatively, the holes 16 through which the pusher 124 and pilot 172 extend may be separated by one or more holes 16. The finger 174 has sides 174A, 174B that contact straight side wall portions 930A, 930B (see FIG. 45) of a side wall 930 of the enlarged lower portion 570. The abutting contact of the sides 174A, 174B positively holds the applicator 18 in position along the fastener bed 14. To drive the pilot 124 in direction 122 into the hole 16, the applicator 18 includes a coupler 85 that selectively couples the pilot 172 to the pusher 124 so that upward movement of the pusher 124 from a lower position thereof (see FIG. 24) causes upward movement of the pilot 172 as well.

In one approach, the pusher 124 has a longer stroke in direction 122 to fully drive the staples 412 than the stroke required to fully engage the finger 174 with the lower portion 570 of the hole 16. To provide different strokes for the pusher 124 and the pilot 172, the coupler 85 decouples the pilot 172 from the pusher 124 once the pilot 172 has shifted vertically in direction 122 and reaches a predetermined vertical position. This predetermined vertical position may be toward near the beginning of the rotation of the cam plate 72, such as at angular position E of the cam plate 72. The pusher 124, however, continues to shift vertically upward in direction 122 due to continued rotation of the cam plate 72 in direction 40 and pivoting of the pusher arms 110 in direction 124 as the user continues to pivot the handle 30 in direction 40 toward the lower position 42. When the pilot 172 has decoupled from the pusher 124, the pilot 172 remains at the predetermined vertical position.

Once the user reverses the handle 30 in direction 44 from the lower position 42, the cam plate 72 turns in direction 44 and causes the pusher 124 to shift downward in direction 126. When the pusher 124 reaches a predetermined position along its downward stroke in direction 126, the coupler 85 re-couples the pilot 172 to the pusher 124 such that continued downward movement of the pusher 124 in direction 126 causes downward movement of the pilot 172 in direction 126. The pusher 124 and the pilot 172 continue to shift downward together in direction 126 until returning to their initial positions (see FIGS. 24 and 31) as the handle 30 returns to the upper, start position 33. The operation of the coupler 85, pusher 124, and pilot 172 are discussed in greater detail below with respect to FIGS. 31-37.

With reference to FIGS. 4 and 18, the advance mechanism 80 includes an advancing arm 216 connected to the pilot 172 by a link 500. The advancing arm 216 is pivotally connected at one end to an advancing finger 504 via a pivot connection 506 and is pivotally connected to a mount 524 of one of the frame plates 62. The advancing finger 504 has a portion, such as a notch or edge 507, for engaging a corner 510 (see FIG. 46) of one of the holes 16. When the pilot 172 shifts upwardly in direction 122, the link 500 causes the advancing arm 216 to pivot in direction 502 and urges the advancing finger 504 against the corner 510 of the hole 16. Once the advancing finger 504 contacts the corner 510, continued pivoting of the advancing arm 216 in direction 502 shifts the applicator in direction 20 along the fastener bed 14 into position at the next fastener 12. The advancing finger 504 provides a rough or approximate positioning of the applicator 18 along the fastener bed 14. The pilot 172 provides the fine or final positioning of the applicator 18 along the fastener bed 14 as the pilot 172 advances into an area 922 of associated hole 16 (see FIG. 45). With reference to FIG. 18, once the coupler 85 has decoupled the pilot 172 from the pusher 124, the continued upward movement of the pusher 124 in direction 122 may not create further pivoting of the advancing arm 216. In this manner, once the pilot 172 has been decoupled from the pusher 124, the applicator 18 remains in position along the fastener bed 14. Further, the pilot finger 174 of the pilot 172 is fully extended into the enlarged lower portion 570 of the hole 16 next to the hole 16 receiving the pusher 124 such that the applicator 18 is positively locked in position along the fastener bed 14 when the applicator 18 is securing the fastener 12 to the conveyor belt end 13.

When the handle 30 is pivoted in direction 44 from the lower position 42 back to the upper, start position 33, the cam plate 72 turns in direction 44 which causes the pusher arms 110 to pivot in direction 120 and shift the pusher 124 downward in direction 126. The coupler 85 re-couples the pilot 172 to the pusher 124 as the pusher 124 shifts downward in direction 126 so that the pilot 172 shifts downward in direction 126 with the pusher 124. Further, the downward movement of the pilot 172 in the direction 126 pivots the advancing arm 216 in direction 514 which disengages the notch 504 from the corner 510 of the hole 16 and moves the notch 507 toward the corner 510 of the next hole 16. When the handle 30 is again pivoted in direction 40 from the upper, start position 33 to the lower position 42, the cam plate 72 again causes the pusher 124 and pilot 172 to shift upward in direction 122 and pivots the advancing arm 216 in direction 502 and shifts the applicator 18 in direction 20 to the next fastener 12.

In one form, the pivot connection 506 includes a torsion spring which biases the advancing finger 504 into contact with the fastener bed 14. To slide the applicator 18 to a desired position along the fastener bed 14, a user pivots the advancing finger 504 in direction 522 against the bias of the torsion spring to disconnect the advancing finger 504 from the fastener bed 14. When the advancing finger 504 has been disconnected from the fastener bed 14 and the handle 30 is in the upper, start position 33, the user can slide the applicator 18 in either direction 20, 22 along the fastener bed 14.

The head cam path 92, pusher cam path 118, and the swiper cam path 144 of the cam plate 72 are thereby configured so that pivoting of the handle 30 and turning of the cam plate 72 in direction 40 causes pivoting of the head 50 in direction 102, shifting of the pusher 124 and pilot 172 in direction 122, pivoting of the advancing arm 216 in direction 502, and pivoting of the swipers 130, 132 in direction 152. As discussed in greater detail below, the cam paths 92, 118, 144 are configured to cause the movements of these components in a predetermined sequence. For example, the sequence may be selected so that two or more of the movements occur at the same time and one or more of the movements occur before or after the two or more movements. Further, pivoting of the handle 30 and turning of the cam plate 72 in direction 44 causes pivoting of the head 50 in direction 104, shifting of the pusher 124 and pilot 172 in direction 124, pivoting of the advancing arm 216 in direction 514, and pivoting of the swipers 130, 132 in direction 156. The return rotation of the cam plate 72 in direction 44 thereby returns these components to an initial configuration so that the applicator 18 is ready to secure the next fastener 12 to the conveyor belt end 13 in response to the user pivoting the handle 30 in direction 40 from the upper, start position 33 to the lower position 42.

With reference to FIG. 5, the cam plate 72 has an opening 190 sized to receive the drive shaft 132. In one approach, the cam plate 72 is fixed relative to the drive shaft 32 by way of a key of the drive shaft 132 that mates with a keyhole 192 of the cam plate 72. The head cam path 92 has ends 199 and 201. With the handle 30 in the upper, start position 33, the cam plate 72 is oriented so that the head cam follower 90 is positioned at the end 199 of the cam plate 72. As the handle 30 is pivoted in direction 40 from the upper, start position 33, the cam plate turns in direction 40 and the head cam follower 90 travels through a fastener clench portion 194 that pivots the head 50 in direction 102 and causes the head 50 to clench the upper plate 414 of the fastener 12 against the conveyor belt end 13. As the cam plate 72 continues to rotate in direction 40, the head cam follower 90 travels through an idle portion 196 which causes the head 50 to remain relatively steady and the cam follower 90 eventually reaches a swiper portion 198. The swiper portion 198 is configured to cause the head 50 to pivot upward in direction 104 slightly as the swipers 130, 132 are pivoted in direction 152 to bend over the staple leg ends 415. Continued turning of the cam plate 72 in direction 40 causes the head cam follower 90 to reach the final set portion 200 which pivots the head 50 in direction 102 to provide a final clench of the fastener 12.

The drive 31 includes a detent that provides tactile feedback to the user when the handle 30 has reached the lower position 42. In one form, the detent includes a compression relief portion 202 of the head cam path 92. The compression relief portion 202 positions a center of the head cam follower 90 at a radius 204 and the final set portion 200 positions the center of the head cam follower 90 at a radius 206 that is larger than the radius 204. In this manner, as the head cam follower 90 travels from the final set portion 200 to the compression relief portion 202 the head cam follower 90 may shift radially inward a small distance. Due to the head 50 clenching the fastener 12 onto the conveyor belt end 13, the conveyor belt end 13 is compressed. The relief portion 202 allows the conveyor belt end 13 to decompress slightly while the fastener 12 remains secured to the conveyor belt end 13. The release of compression in the conveyor belt end 13 may be transmitted to the user by the head 50, head arms 64, head cam follower 90, cam plate 72, shaft 32, and handle 30.

Additionally, the compression relief portion 202 provides a safety feature in that the compression relief portion 202 resists the cam plate 32 from reversing quickly in direction 44 and causing the handle 30 to strike the user after the handle 30 has reached the lower position 42. The compression relief portion 202 provides this safety feature because the cam plate 72 must be rotated in direction 44 with sufficient force to re-compress the conveyor belt end 13 caused by moving the head cam follower 90 from the smaller radius 204 to the larger radius 202. The compression relief portion 202 thereby provides an over-center lock to resist unintentional rebounding of the cam plate 72 and handle 30 after the handle 30 has reached the lower position 42.

With reference to FIG. 5, the pusher cam path 118 includes ends 210, 212 and the pusher cam follower 116 is at the end 210 when handle 30 is at the upper, start position 33. Turning of the cam plate 72 in direction 40 causes the pusher cam follower 116 to travel through an advance and pilot portion 214. The advance and pilot portion 214 causes the pusher 124 and pilot 172 to shift upward in direction 122 and pivots the advancing arm 216 in direction 502.

Continued rotation of the cam plate 72 in the direction 40 causes the pusher cam follower 116 to travel through a staple driving portion 220 of the pusher cam path 118. In one approach, the coupler 85 has decoupled the pilot 172 from the pusher 124 as the pusher cam follower 116 travels through the staple driving portion 220. The staple driving portion 220 thereby causes the pusher 124 to continue to shift upward in direction 122 to a maximum upper position (see FIG. 27) while the pilot 172 remains at a vertical position. Next, continued rotation of the cam plate 72 causes the pusher cam follower 116 to travel through an idle portion 222. The idle portion 222 maintains the pusher 24 at the maximum upper position until the pusher cam follower 116 reaches the end 212 of the pusher cam path 118. In another embodiment, the cam path may be configured to drop the pusher 24 slightly during the staple bend phase and then raises the pusher 24 for the final fastener clench.

The head cam path 92, pusher cam path 118, and the swiper cam path 144 may be configured to operate components of the applicator 18 as the cam plate 72 turns in direction 40 from angular position A to angular position K. The paths 92, 118, 144 may be configured to operate the components according to a predetermined script. For example, the paths 92, 118, 144 may operate the components of the applicator 18 according to the following script:

| CAM PLATE ANGULAR POSITION | CYCLE STEPS | HEAD 50 ACTION | PUSHER 124 ACTION | SWIPER 130, 132 ACTION | PILOT 172 ACTION |
| --- | --- | --- | --- | --- | --- |
| A-C | Advance the unit & lock in place | Idle in 18° up position | −23 mm to 0 mm move pilot up and contact staple | Idle | 23 mm up; drive advance and lock in place |
| C-F | Collapse plate | Down 18° to 0° | Idle at 0 mm | Idle | Idle in lock position |
| F-H | Push staple up | Idle at 0° | 0 mm to +29 mm | Idle | Idle in lock position |
| H-I | Bend staple legs over | Move up ~3° during swipe | Idle at +29 mm | 25° rotation to swipe staples | Idle in lock position |
| I-J | Push staple legs flat | Move down to 0° for final set | Idle at +29 mm | Idle | Idle in lock position |
| J-K | Some idle for operator feed back | Idle | Idle | Idle | Idle |
| K-A | Return | Return | Return | Return | Return |

With continued reference to FIG. 5, the swiper cam path 144 includes ends 230, 232 and the swiper cam follower 142 begins at the end 230 when the applicator 18 is in the initial configuration thereof. As the cam plate 72 turns in the drive direction 40, the swiper cam follower 142 travels through an idle portion 234. The idle portion 234 has curvatures that maintain the swipers 130, 132 in their initial, upward position while the head 50 pivots downward due to the head cam follower 90 traveling through the collapsed plate portion 194. The continued rotation of cam plate 72 and drive direction 40 causes the swiper cam follower 142 to travel through the swiper portion 240 of the swiper cam path 144. The swiper portion 240 causes the swiper arms 134 to pivot in direction 150 and produce pivoting and cause the swipers 130, 132 to pivot in direction 152 in an inboard direction.

With reference to FIG. 6, the head 50 includes an anvil and swiper assembly 300 and the applicator 18 includes a head height adjustment mechanism 302 for shifting the anvil and swiper assembly 300 in directions 304, 306. The anvil and swiper assembly 300 includes the one or more anvils 100 and the swipers 130, 132. The anvil and swiper assembly 300 has a dovetail channel 320 and the height adjustment mechanism 302 includes a shaft 322 with an enlarged head 324 received in the dovetail channel 320. The dovetail channel 320 permits the enlarged head 324 of the shaft 322 to rotate within the channel 320 while the enlarged head 324 remains retained within the channel 320. The height adjustment mechanism 302 includes a handle 326 connected to the shaft 322 and the shaft 322 includes threads that engage with a threaded opening of the guide 310. Due to the threaded engagement between the shaft 322 and the guide 310, turning of the handle 326 shifts the shaft 322 and the anvil and swiper assembly 300 in directions 304, 306. In this manner, the height of the head 50 may be adjusted to correspond to the thickness of the conveyor belt end 13.

In one form, the head height adjustment mechanism 302 includes a lock, such as collar 328, for securing the shaft 322 and the anvil and swiper assembly 300 at a desired position. The collar 328 includes a handle 330 that may be pivoted from an unlocked position wherein the collar 328 permits the shaft 322 to shift in directions 304, 306 relative to the collar 328 to a locked position wherein the collar 328 tightly grips the shaft 322 and resists rotation of the shaft 322 and shifting of the shaft 322 in directions 304, 306.

Figure 7:
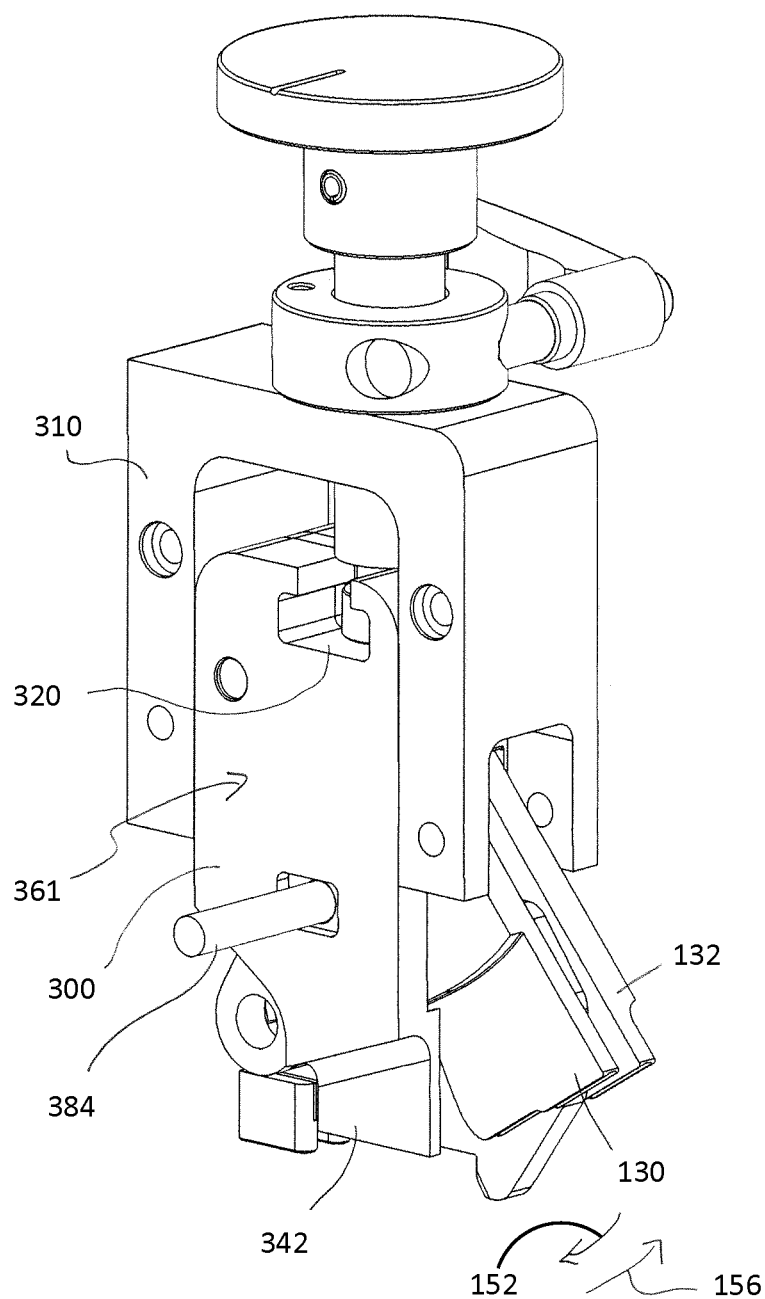
FIG. 7 is a perspective view of an anvil and swiper assembly of the head of FIG. 6 showing the anvil and swiper assembly slidably received in a guide of the height adjustment mechanism.
Figure 8:
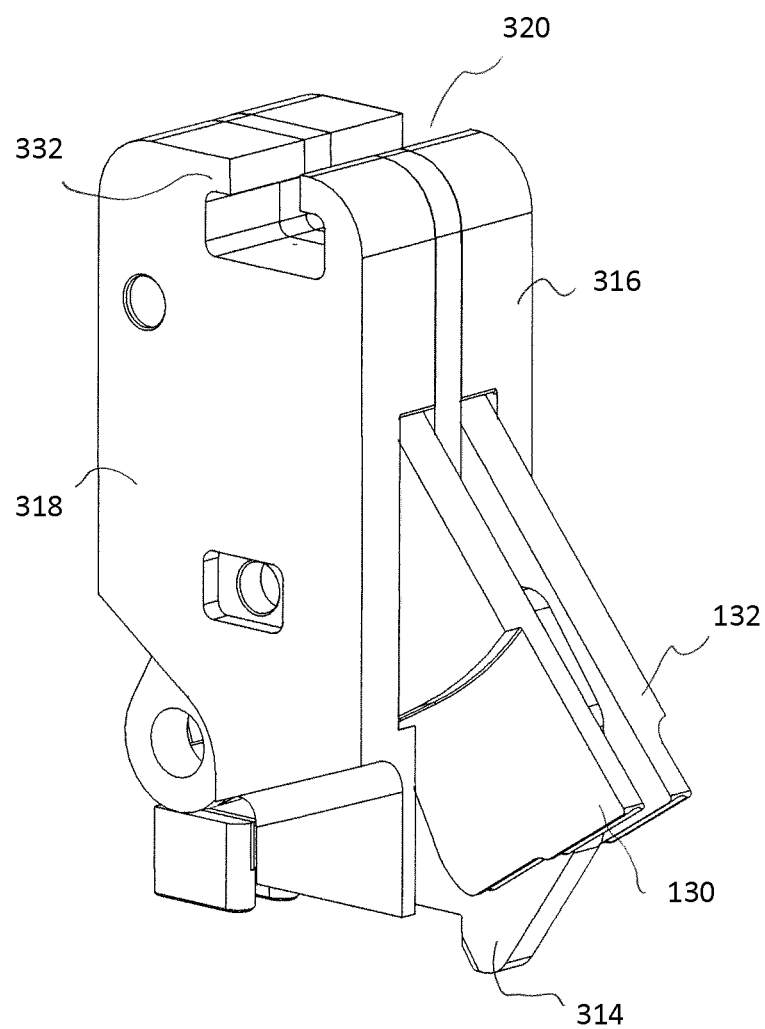
FIG. 8 is a view similar to FIG. 7 with the anvil and swiper assembly removed from the guide showing swipers of the assembly in an outboard position.
Figure 9:
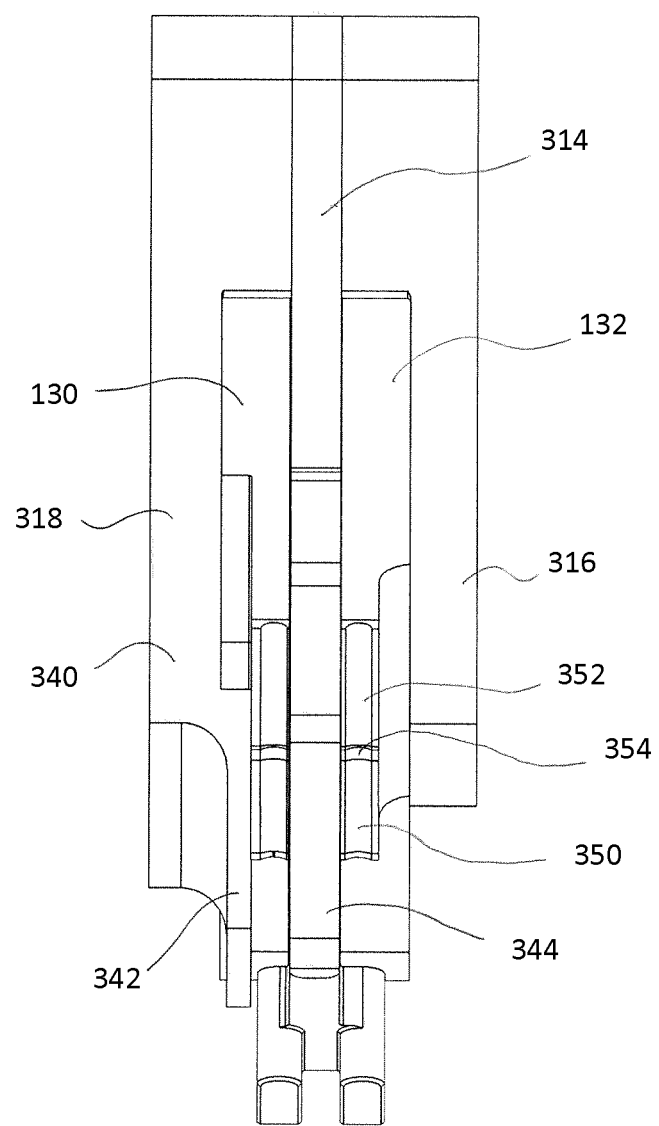
FIG. 9 is a front elevational view of the anvil and swiper assembly of FIG. 8 showing the anvils sandwiched between right, left, and center anvils.

With reference to FIGS. 7 and 8, the anvil and swiper assembly 300 includes the one or more anvils 100 and the swipers 130, 132. The one or more anvils 100 may include a center anvil 314, a left anvil 316, and a right anvil 318. Turning to FIG. 9, the swipers 130, 132 are sandwiched between the right anvil 318, center anvil 314, and left anvil 316. The right anvil 318 has a lower portion 340 with a clamping leg 342 that contacts the upper plate 414 of the fastener 12 during the fastener clench operation. The center anvil 314 also includes a lower portion 344 that contacts the upper plate 414 of the fastener 12 during the fastener clench operation.

Figure 12:
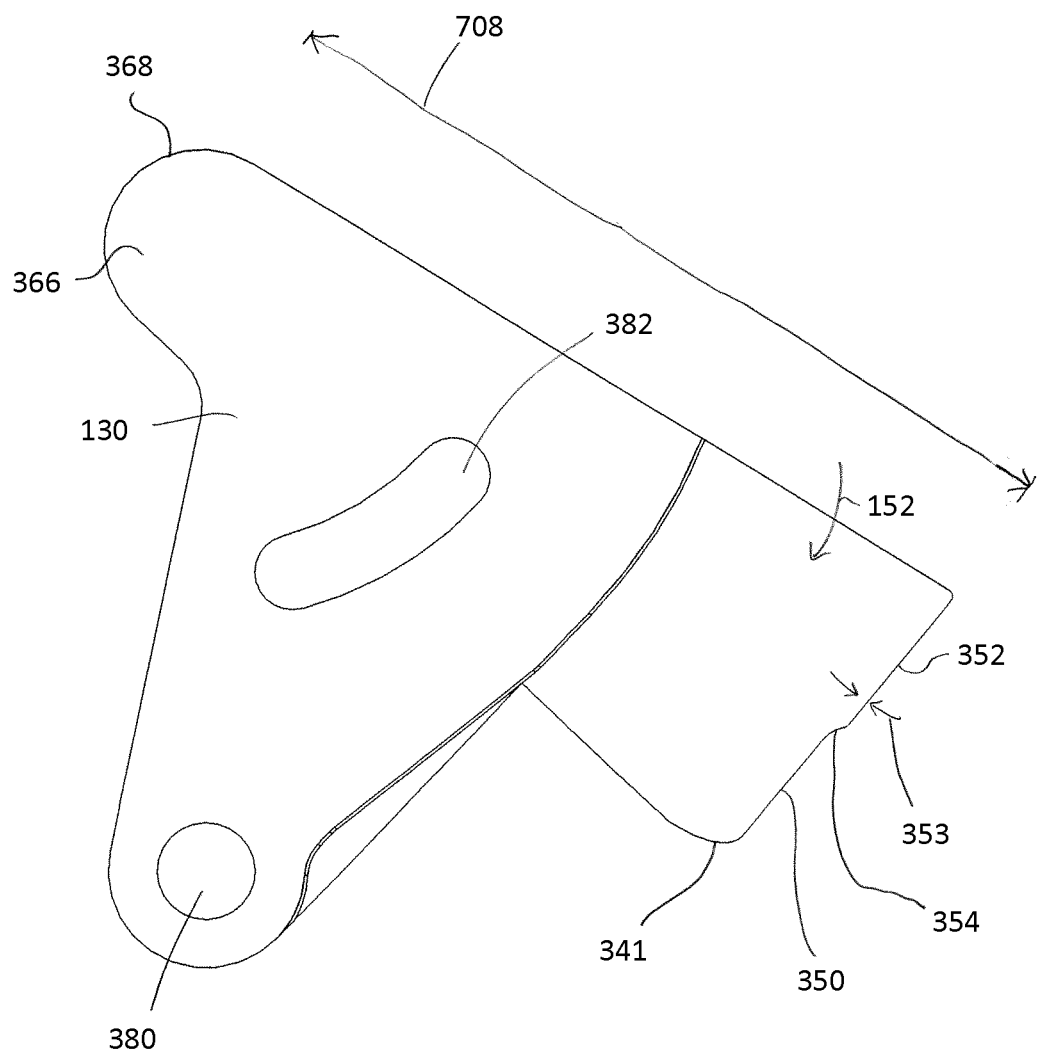
FIG. 12 is a right side elevation view of the right swiper showing an upper rocker portion that is received in the rocker pocket of the right anvil of FIG. 10.

As shown in FIGS. 6 and 12, the swipers 130, 132 have curved leading surfaces 341 that first contact and bend staple leg 460 (see FIG. 15A) toward the upper plate 414 and then contact and bend staple leg 462 toward the upper plate 414 as the swipers 130, 132 pivot in direction 152. With reference to FIG. 9, the swipers 130, 132 have a first clamping surface 350, a second clamping surface 352, and a transition 354. During the final set operation (see FIG. 29), the first swiper surface 350 presses the staple leg 462 against the fastener upper plate 414 and the second swiper surface 352 presses the staple leg 460 against the fastener upper plate 414. The first swiper surface 350 and second swiper surface 352 may each extend at an angle 353 to ensure the ends 415 of the staple legs 460, 462 are pressed firmly against the upper plate 414 and compensate for rebound of the ends 415 after the swiping operation. The transition 354 connects the first and second clamping surfaces 350, 352 and provides a smooth transition therebetween.

With reference to FIG. 7, the swipers 130, 132 are pivotal in the inboard direction 152 relative to the center, left, and right anvils 314, 316, 318 to swipe the staple legs 460, 462. The anvil and swiper assembly 300 includes one or more pivot connections, such rocker joints 361, which permit pivoting of the swipers 130, 132 and guides, such as a pin 384, which guide the swipers 130, 132 along a predetermined arcuate path.

Figure 10:
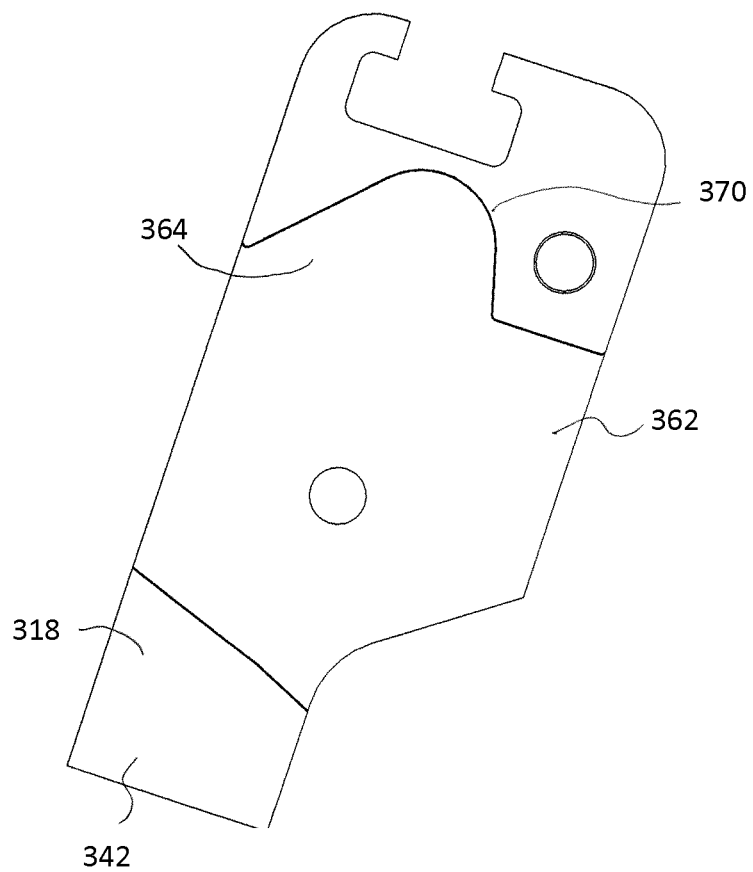
FIG. 10 is a left side elevation view of the right anvil showing a recessed area of the right anvil that includes a rocker pocket for forming a rocking pivot joint with the right swipe.
Figure 11:
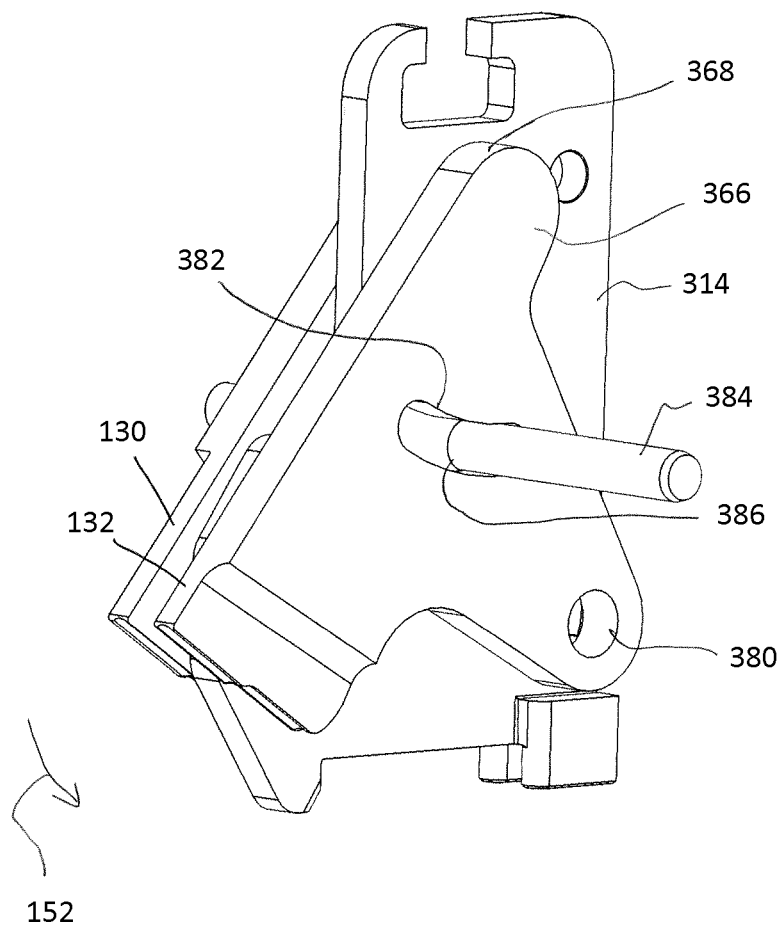
FIG. 11 is a perspective view of the left and right swipers on opposite sides of the center anvil showing a pin extending through an arcuate slot of each of the swipers.

With reference to FIGS. 10 and 12, the right anvil 318 includes a recessed area 362 that receives the swiper 130 and the rocker joints 361 include a rocker pocket 364 of the right anvil 318. The swiper 130 has a rocker projection portion 366 that extends into the rocker pocket 364 and pivots therein with pivoting of the swiper 130 in directions 152, 156. The rocker pocket 364 includes a curved wall 370 and the rocker projection portion 366 includes a rounded end 368 that abuts the curved wall 370. The curved wall 370 provides a large bearing surface for the rocker projection portion 366 as the swiper 130 pivots which, in turn, provides a large, arcuate motion for the swiper 130. Further, the large bearing surface of the curved wall 370 provides a large contact area which reduces contact stress and associated wear rate by operating at lower pressure between the rocker rounded end 368 and the anvil curved wall 370. Friction, as defined by $F=\mu N$, is constant relative to the area. As shown in FIG. 11, the swiper 132 also includes a rocker projection portion 366 with a rounded end 368 that cooperates with a rocker pocket 364 of the left anvil 316. In another form, the anvil and swiper assembly 300 may utilize a pin extending through circular holes in the swipers 130, 132 to provide a pivot connection for the swipers 130, 132.

With reference to FIGS. 11 and 12, the pin 384 extends through arcuate openings 382 of the swipers 130, 132 to constrain the swipers 130, 132 to a predetermined arcuate path as the swipers 130, 132 pivot in directions 152, 156. The pin 384 extends through openings 386 in the center, left, and right anvils 314, 316, 318 such that the anvils 314, 316, 318 support the pin 384. Returning to FIG. 6, when the swipers 130, 132 are pulled in direction 379 by the links 374, the sliding movement of the arcuate openings 382 of the swipers 130, 132 along the pin 384 guides the swipers 130, 132 along an arcuate path.

Figure 15A:
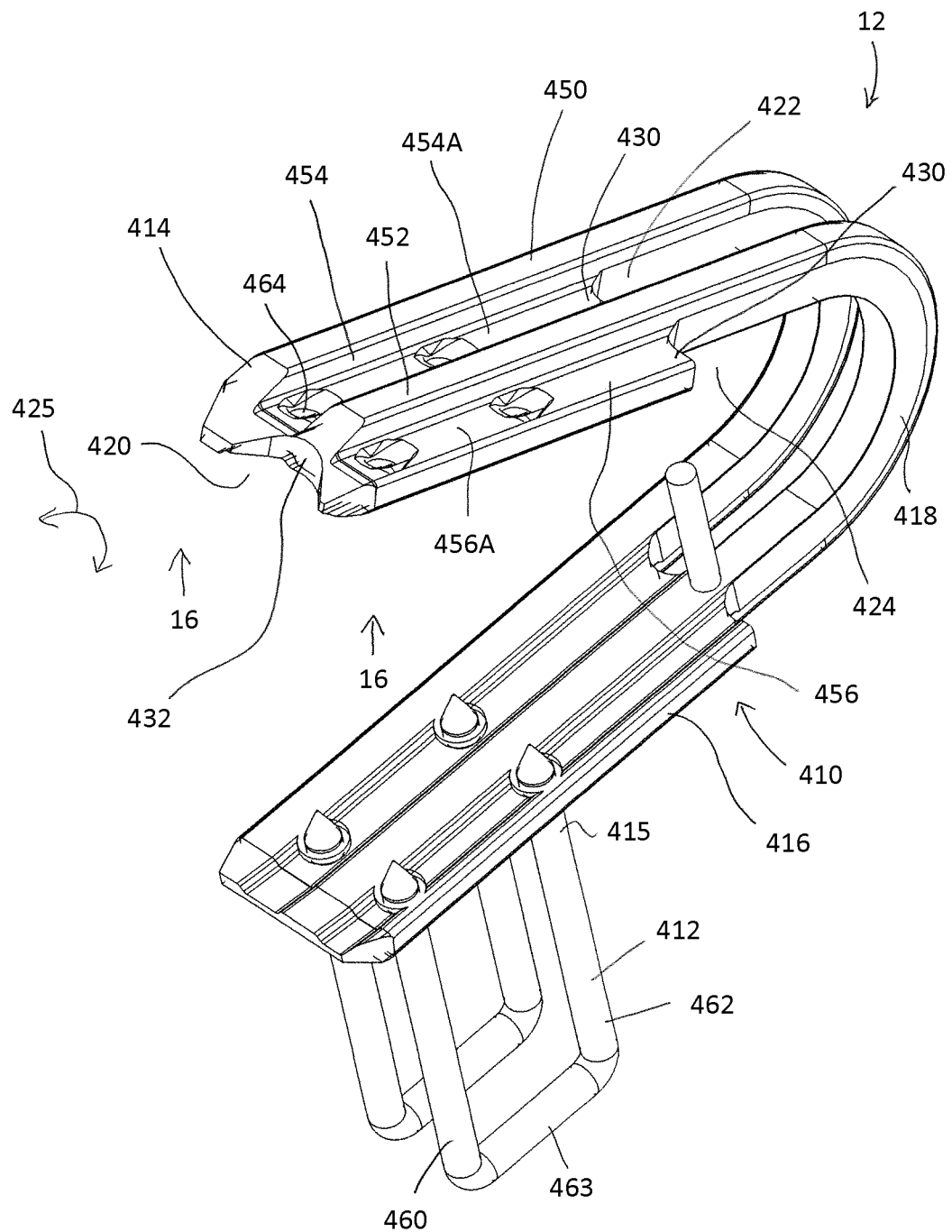
FIG. 15A is a perspective view of a fastener that may be used with the applicator system of FIG. 1.
Figure 15B:
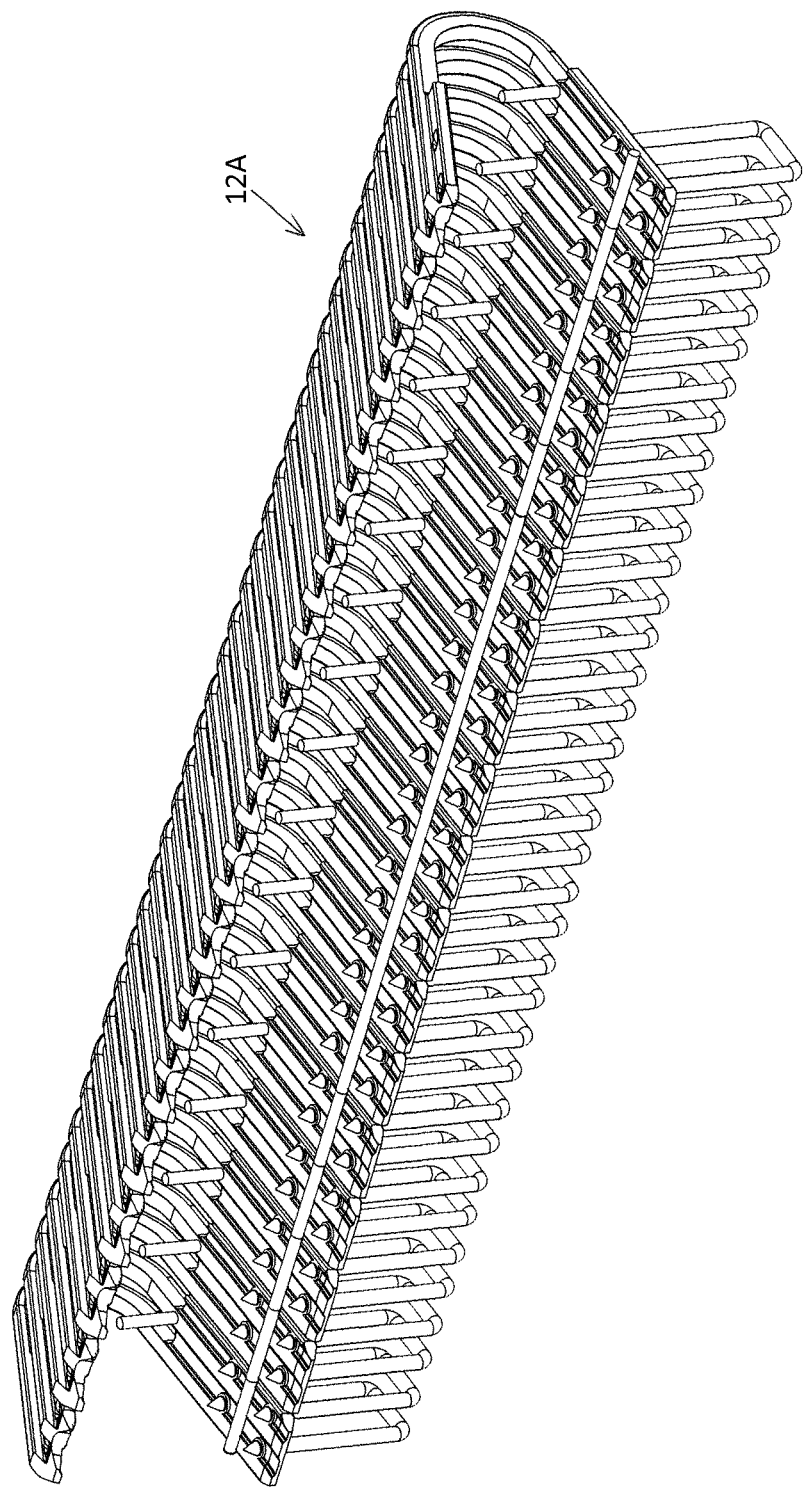
FIG. 15B is a perspective view of a strip of the fasteners of FIG. 15A.

With reference to FIG. 15A, the fastener 12 includes a fastener body 410 having the one or more staples 412 preassembled to the fastener body 410. The fastener body 410 includes the upper plate 414, a lower plate 416, and one or more loops 418 connecting the upper and lower plates 414, 416. The upper plate 414 includes an outboard alignment notch 420 and a pair of inboard recesses 422, 424. The upper plate 414 also includes a pair of longitudinally extending walls 450, 452 and channels 454, 456. When the pusher 124 drives the staples 412, the legs 460, 462 travel through the conveyor belt end 13, through the apertures 464, and extend upward from the upper plate 414.

Figure 13:
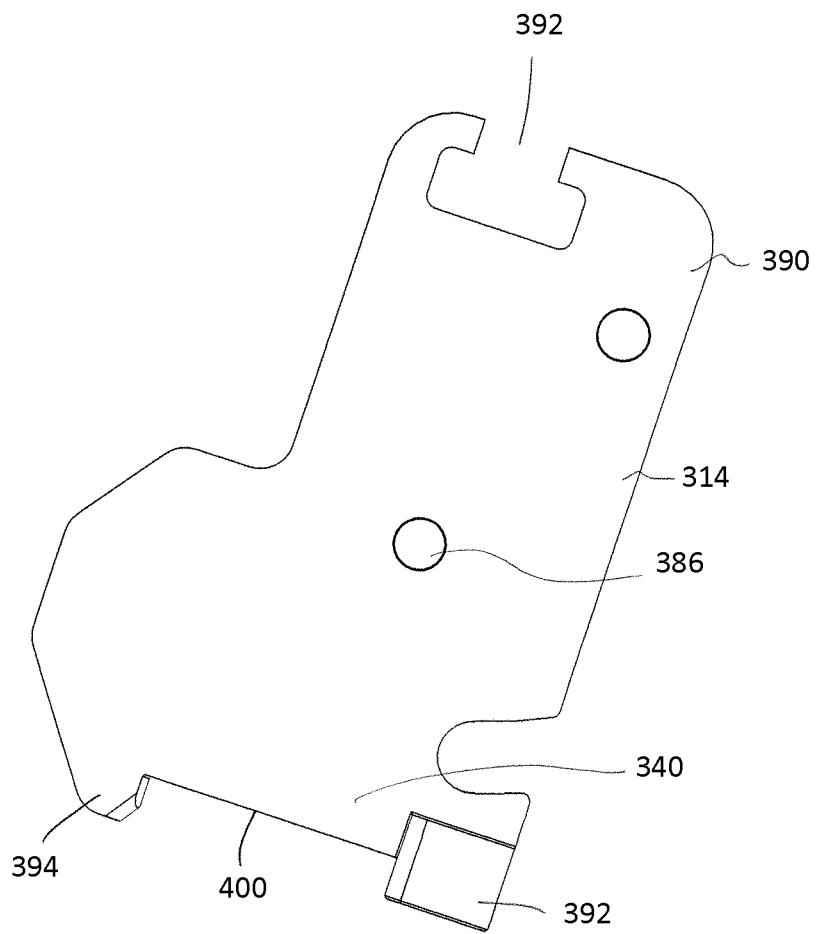
FIG. 13 is a left side elevation view of the center anvil showing an inboard lug and an outboard lug at a lower end of the center anvil.
Figure 14:
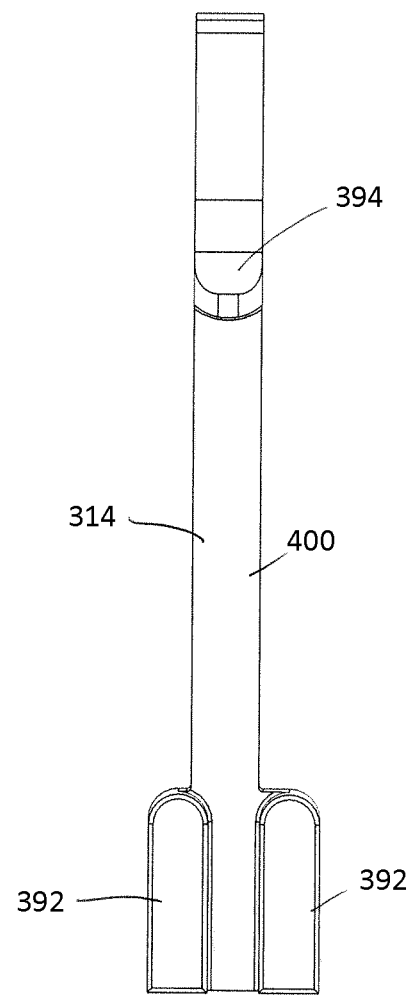
FIG. 14 is a bottom plan view of the center anvil of FIG. 13 showing the inboard lugs laterally offset from the outboard lug.

With reference to FIGS. 13 and 14, the center anvil 314 includes an upper end 390 with a channel portion 392 that forms part of the dovetail channel 320. The center anvil 314 includes a lower clamp portion 340 with one or more guide members, such as an outboard lug 394 and inboard lugs 392. The lower clamp portion 340 includes a clamping surface 400 extending between the lugs 392, 394 for contacting upper surface of the upper plate 414 of the fastener 12 and clenching the upper plate 414 onto the conveyor belt end. The outboard lug 394 and the inboard lugs 392 are laterally offset from each other to engage complimentary features of the fastener 12. In one form, the outboard lug 394 is configured to fit within the outboard alignment notch 420, one inboard lug 392 is configured to fit within the inboard recess 422, and the other inboard lug 392 is configured to fit within the inboard recess 424.

During the clenching operation, the clamping surface 400 contacts the wall 452 of the upper plate 414 and the clamping leg 342 of the right anvil 318 contacts the wall 450 of the upper plate 414. The clamping surface 400 and the clamping leg 342 drive the upper plate 414 toward the conveyor belt end 13. The inboard and outboard lugs 392, 394 engage inboard and outboard edge portions 430, 432 of the upper plate 414 and resist movement in the outboard and inboard directions of the upper plate 414 so that the upper plate 414 follows the arcuate path of the center and right anvils 314, 318. The inboard and outboard lugs 392, 394 also resist rolling of the upper plate 414 in directions 425 (see FIG. 15A) during the clenching procedure. By reducing rolling of the upper plate 414, the lugs 392, 394 assist in maintaining alignment of the upper plate 414 and the lower plate 416 during the clenching operation so that the staple legs 460, 462 may be driven through the apertures 464.

Once the center and right anvils 314, 318 have clenched the upper plate 414 against the conveyor belt 13, the swipers 130, 132 are aligned with the channels 454, 456 of the upper plate 414. The swipers 130, 132 are pivoted in the inboard direction 152 (see FIG. 6) along the channels 454, 456 to fold the ends 415 of the staple legs 460, 462 extending outward of the apertures 464 downward against the upper plate 414 and within the channels 454, 456.

Figure 16:
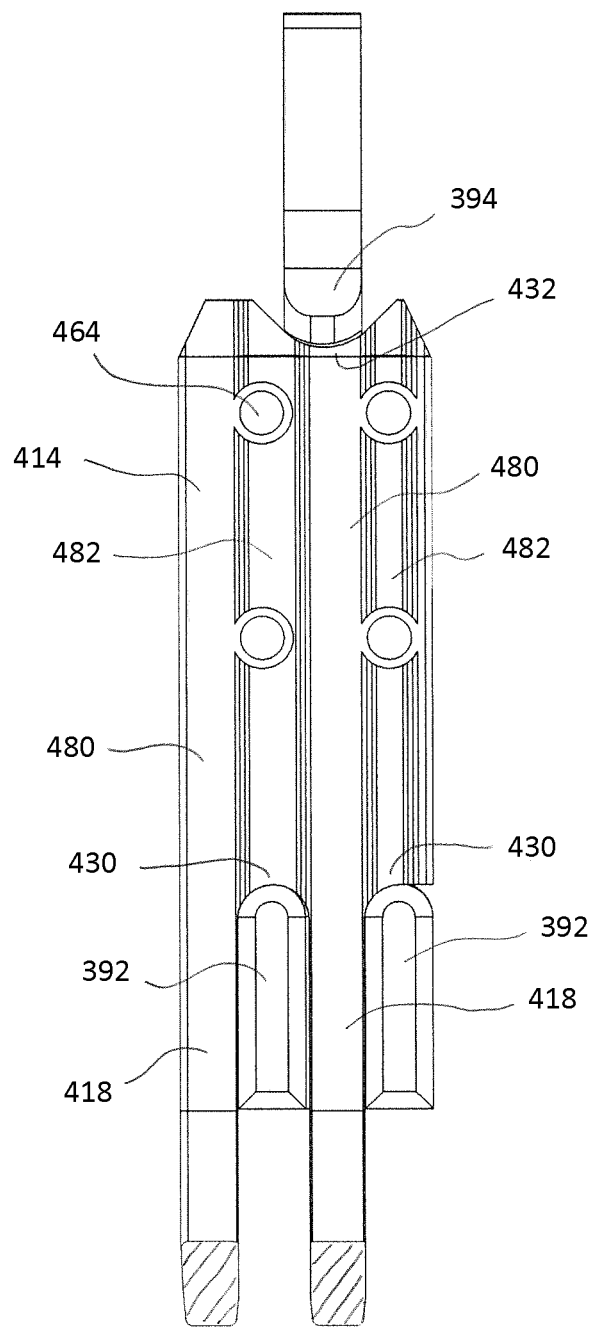
FIG. 16 is a bottom plan view of the upper plate of the fastener taken in the direction of 16-16 in FIG. 15A showing the inboard and outboard lugs of the center anvil of FIG. 14 positioned at respective inboard and outboard edge portions of the upper plate of the fastener.

With reference to FIG. 16, the inboard lugs 392 each engage one of the inboard edge portions 430 of the upper plate 414. The lower side of the fastener upper plate 414 includes rib portions 480 aligned with the loops 418. Extending between the rib portions 480 are reduced thickness plate portions 482. In this manner, the outboard lug 394 is longitudinally aligned with one of the ribs 480 and the associated loop 418. The inboard lugs 392 are each laterally offset from the outboard lug 394 and are longitudinally aligned with the reduced thickness plate portions 482. The inboard and outboard lugs 392, 394 guide the upper plate 414 during the clenching operation and resist inboard/outboard movement of the upper plate 414. The inboard and outboard lugs 392, 394 also resist rolling of the upper plate 414 (see directions 425 in FIG. 15A). Further, the inboard lugs 392 may be firmly engaged against both the inboard edge portions 430 and the loops 418 to resist inboard movement and rolling of the upper plate 414.

Figure 17:
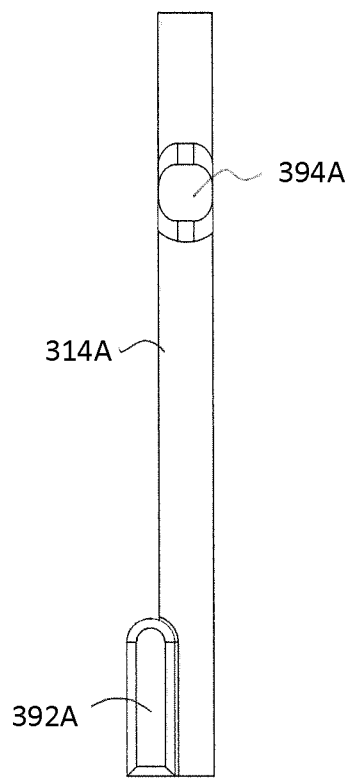
FIG. 17 is a bottom plan view of an alternative embodiment of the center anvil showing a single inboard lug laterally offset from an outboard lug.

In FIG. 17, an alternative embodiment of the center anvil 314A is provided wherein the center anvil 314A has only one inboard lug 392A. The inboard lug 392A is configured to fit within recess 422 and contacts one of the inboard edge portions 430. The inboard lug 392A is laterally offset from the outboard lug 394A.

Figure 19:
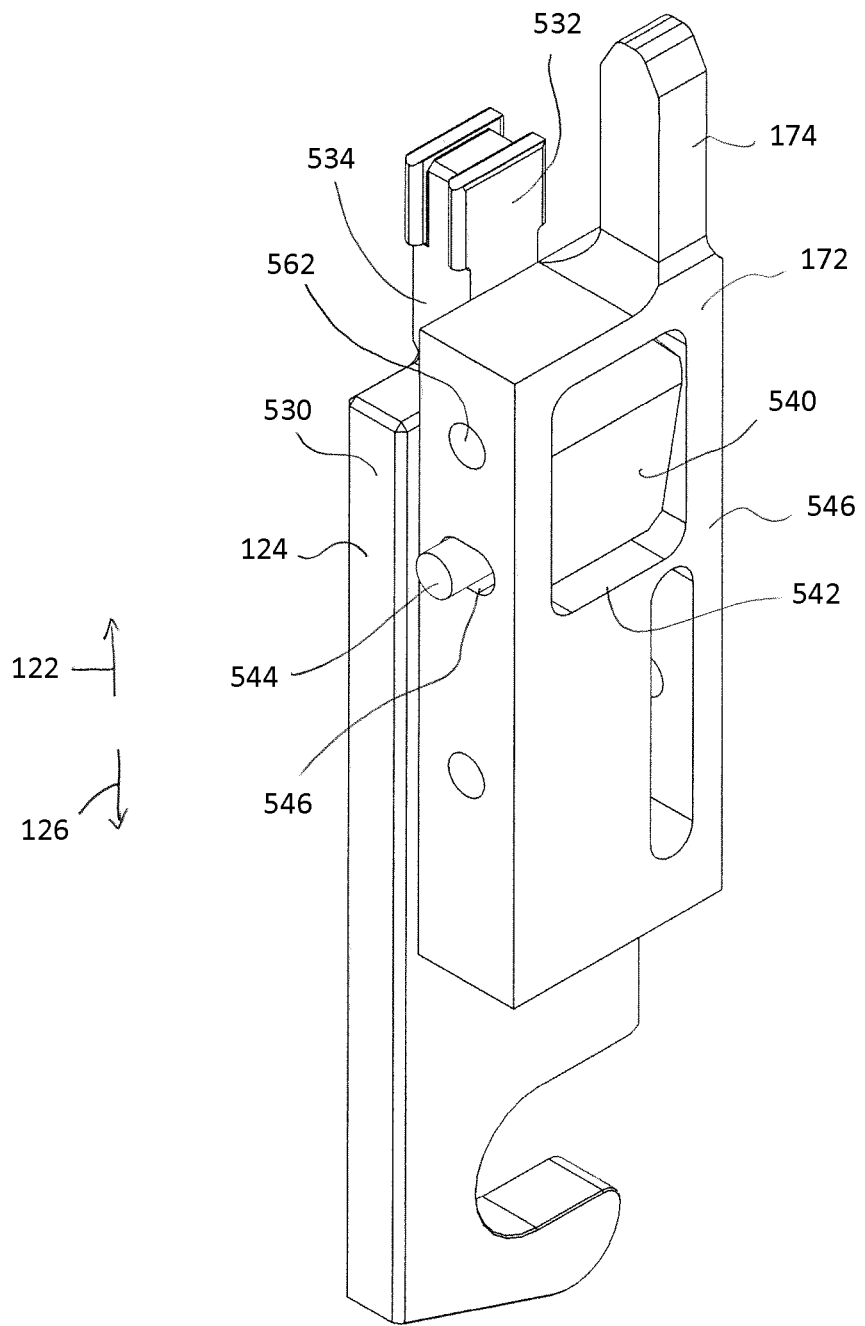
FIG. 19 is a perspective view of the pusher and the pilot of FIG. 18 showing a pivotal coupling member of the pilot for connecting and disconnecting the pusher and the pilot.

Turning to FIG. 19, the pusher 124 has a body 530 next to the pilot 172, a head 532 shaped to drive the staples 412, and a neck 534 connecting the head 532 to the body 530. As discussed above, the applicator 18 includes a coupler 85 for coupling and decoupling the pilot 172 relative to the pusher 124 so that the pilot 172 has a shorter stroke than the pusher 124. In one form, the coupler 85 includes a pivotal coupling member 540 received in an opening 542 of the pilot 172. The pivotal coupling member 540 includes a pin 544 that extends outward from elongated openings 546 on opposite sides of the pilot 172.

Figure 21:
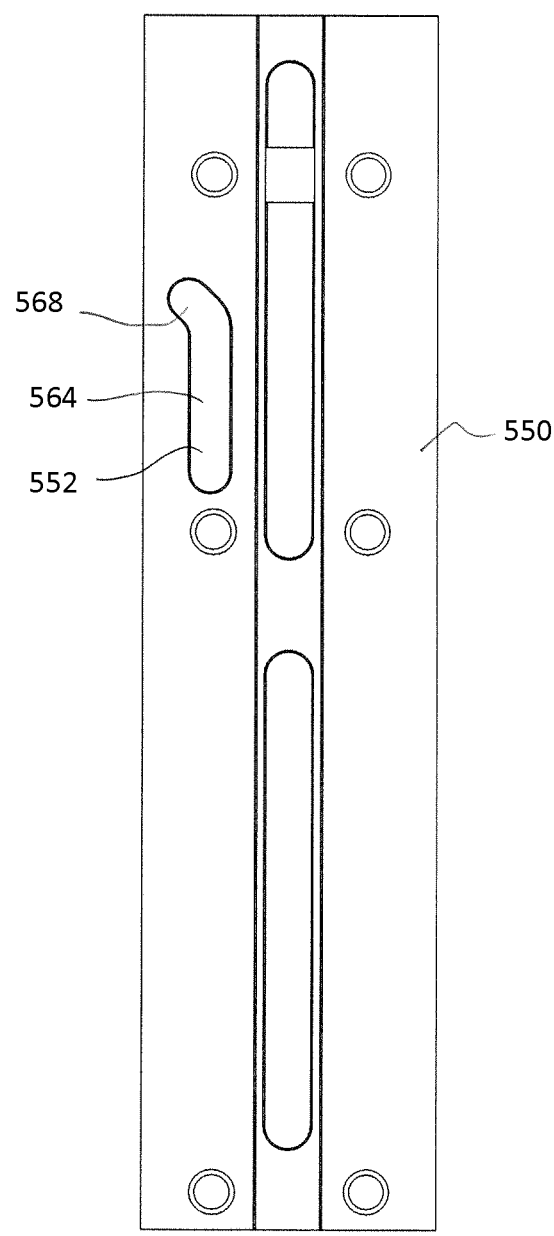
FIG. 21 is an elevation view of a front guide wall of the applicator of FIG. 2 showing a control groove that receives a pin of the coupling member and a dogleg-shaped portion of the control groove for pivoting of the coupling member as the pilot shifts vertically upward to a predetermined vertical position.
Figure 22:
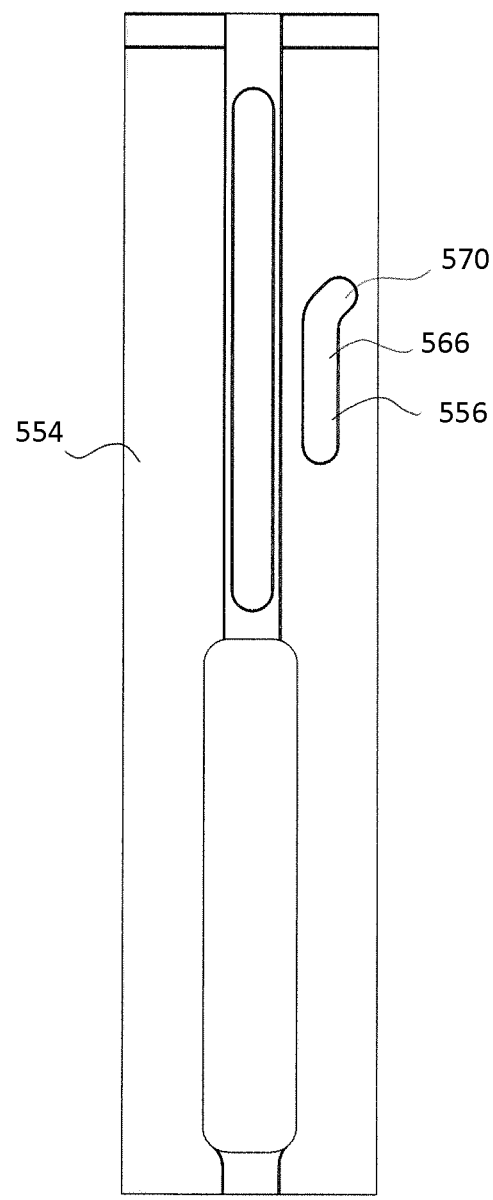
FIG. 22 is an elevation view of a rear guide wall of the applicator of FIG. 2 showing a matching control groove that receives the pin of the coupling member on an opposite side of the coupling member from the front guide wall.
Figure 23:
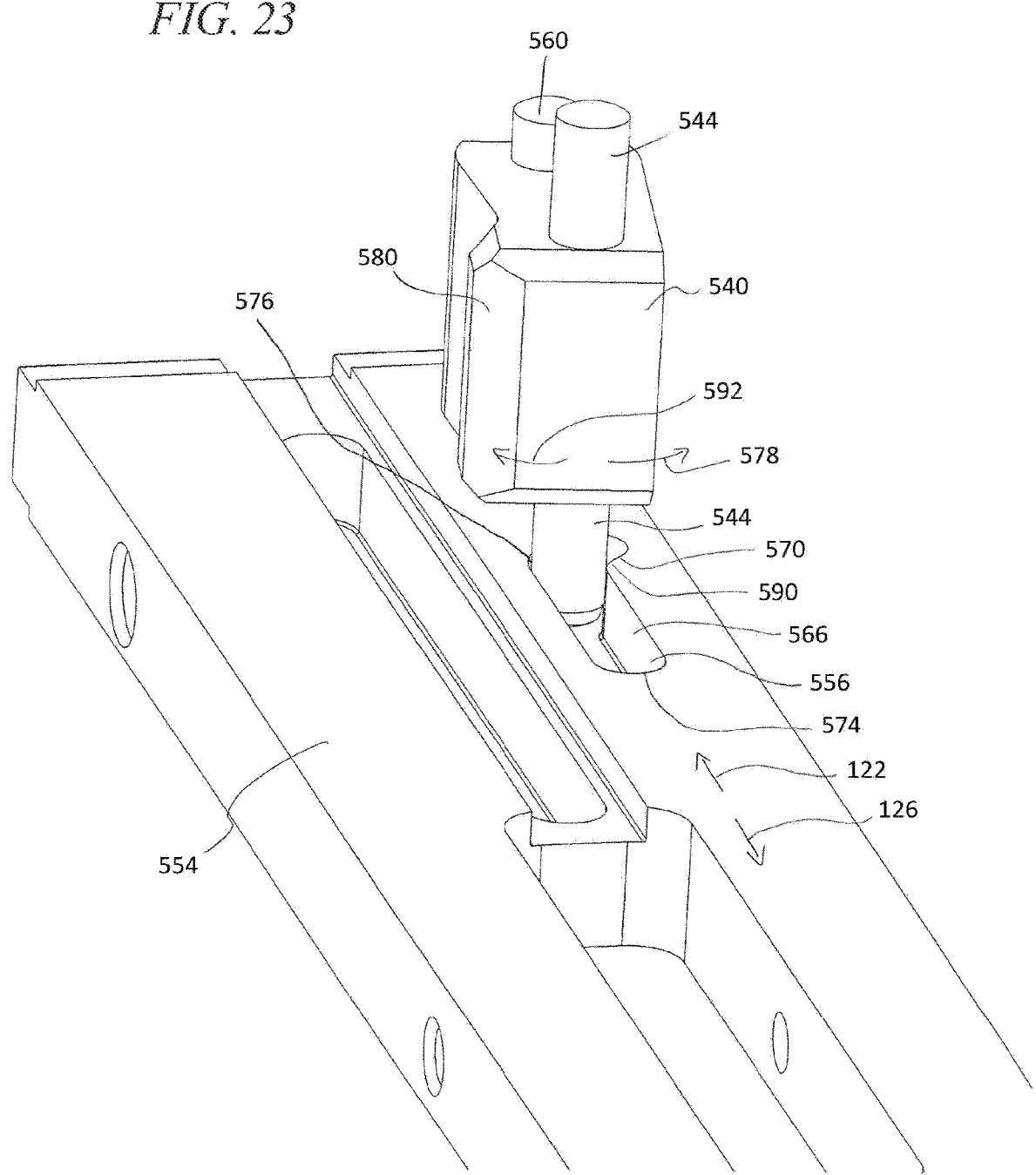
FIG. 23 is a perspective view showing the pin of the coupling member in the dogleg-shaped portion of the control groove of the rear guide wall for pivoting of the coupling member away from the pusher and disconnecting the pilot from the pusher once the pilot has reached the predetermined vertical position thereof.

With reference to FIGS. 3 and 21, the body 52 of the applicator 18 includes a front guide wall 550 with a control groove 552 facing the pilot 172 that receives the pin 544. With reference to FIG. 22, the body 52 also includes a rear guide wall 554 on the opposite side of the pilot 172 from the front guide wall 550. The rear guide wall 554 includes a control groove 556 that receives the pin 544 of the pivoting coupling member 540. With reference to FIG. 23, the coupling member 540 and the rear guide wall 554 are shown with the pin 546 received in the control groove 556. The coupling member 540 also includes a pivot pin 560 received in holes 562 (see FIG. 19) on opposite sides of the pilot 172. The engagement of the pin 560 in the holes 562 constrains the pivoting coupling member 540 to pivotal movement about the pin 544 relative to the pilot 172. In this manner, vertical movement of the pin 544 along the control grooves 552, 556 due to shifting of the pilot 124 in directions 122, 126 causes pivoting of the coupling member 540 relative to the pilot 172.

More specifically and with reference to FIGS. 21 and 22, the control grooves 552, 556 include straight portions 564, 566 and dog leg portions 568, 570. In FIG. 23, the coupling member 540 is shown at a vertical position where the pilot 172 has been decoupled from the pusher 124. To reach this position, the pin 544 started at a lower end 574 of the control groove 556 and shifted in direction 122 through the straight portion 566 as the pilot 172 moved upward in direction 122. Toward the end of the vertical movement of the pilot 172 in direction 122, the pin 544 contacts a redirect surface 576 of the dog leg portion 570 which causes the pin 544 and the coupling member 540 to pivot in direction 578 about the pivot pin 560.

Figure 34:
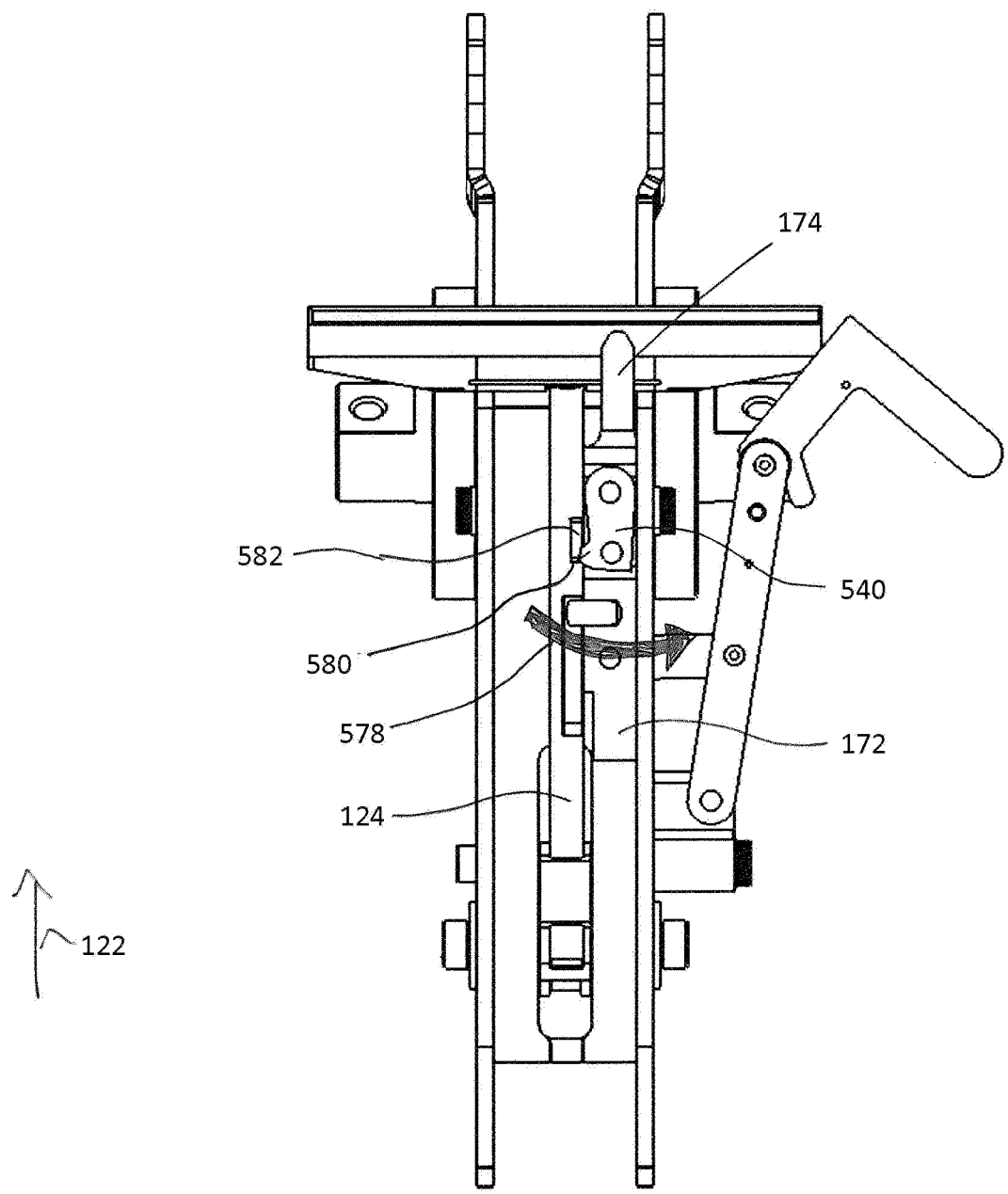
FIG. 34 shows the coupling member pivoting away from the pusher when the cam plate is shifted to an angular position D.
Figure 35:
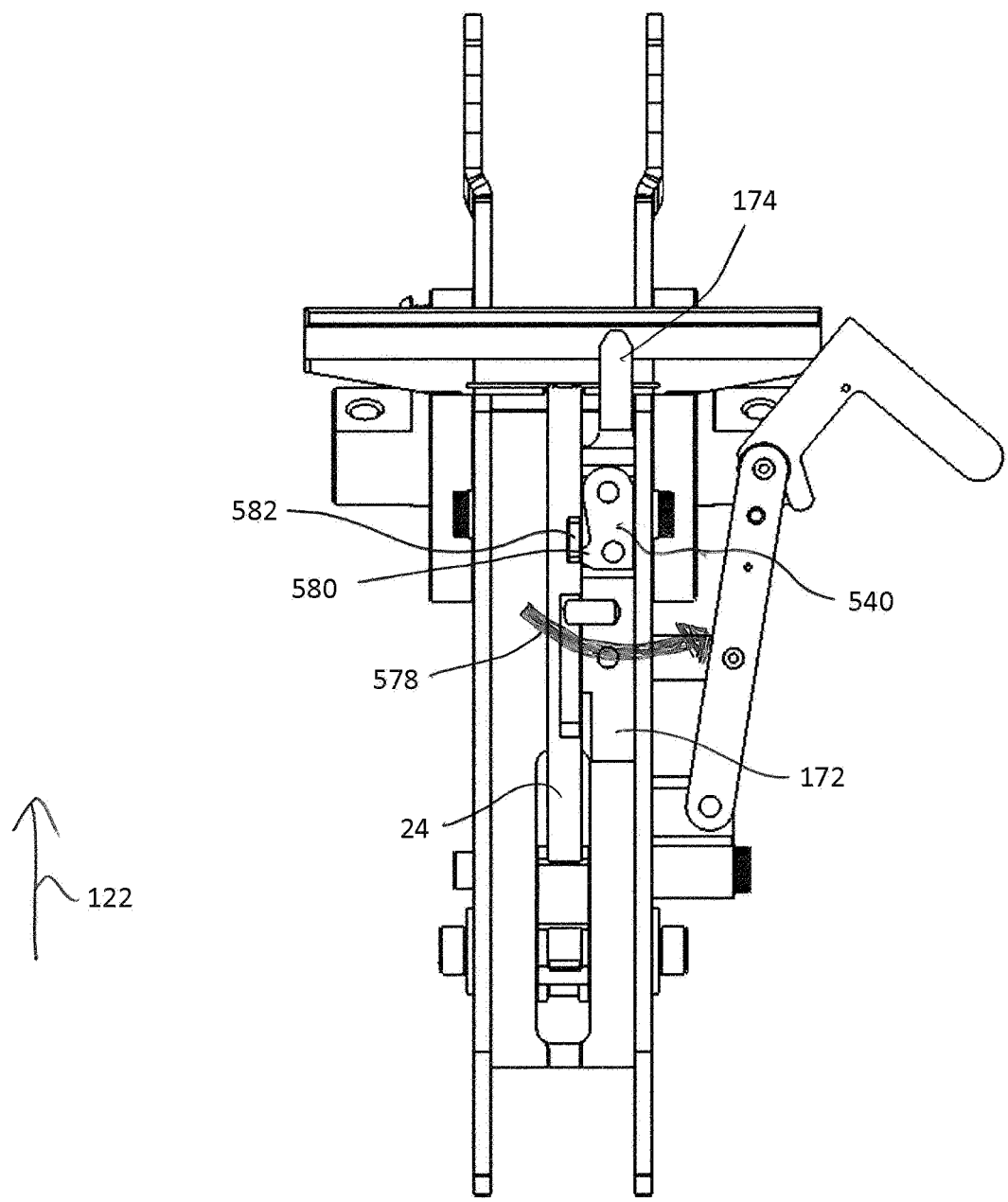
FIG. 35 shows the pilot decoupled from the pusher and the pusher continuing to shift vertically upward when the cam plate is shifted to an angular position E.

The coupling member has a tooth 580 and the pivoting of the coupling member 540 in direction 578 withdraws the tooth 580 from a recess 582 of the pusher 124 and decouples the pilot 172 from the pusher 124, as shown in FIGS. 34 and 35. Once the tooth 580 has been withdrawn from the recess 582, the pusher 124 continues to shift upwardly in direction 122 which causes the tooth 580 to be placed in sliding contact with a surface 583 (see FIG. 20) of the pusher 124 below the recess 582. This locks the coupling member 540 in position because the coupling member pin 544 is in the dog leg portions 568, 570 of the control grooves 552, 556 on one side of the coupling member 540 and the coupling member tooth 580 is sliding against the surface 583 of the pusher 124 on the other side of the coupling member 540. Because the coupling member 540 is locked in position by the pusher surface 583 and the dog leg portions 568, 570, the coupling member 540 holds the pilot 172 at the predetermined vertical position by way of the coupling member pin 560 engaged in the holes 562 (see FIG. 19) of the pilot 172. The coupling member 540 can pivot back in direction 592 and release the pilot 124 from the predetermined vertical position once the pusher 124 has shifted downward in direction 126 far enough that the recess 582 realigns with the tooth 580.

After securing the fastener to the conveyor belt end 13, the handle 30 is pivoted in direction 44 back toward the initial, start position 33 which causes the pusher 124 to shift in direction 126 and causes the pilot 172 to recouple with the pusher 124. The recoupling of the pilot 172 and the pusher 124 with downward movement of the pusher 124 in direction 126 is discussed in greater detail below with respect to FIGS. 36 and 37.

The coupled pusher 124 and pilot 172 shift downward together in direction 126 with continued upward pivoting of the handle 30 in direction 44. The downward movement of the pilot 172 in direction 126 shifts the coupling member 540 in direction 126 and causes the pin 544 to contact a redirect surface 590 of the dog leg portion 570 and pivot the coupling member 540 in direction 592 as the pin 544 travels into the straight portion 560 of the control groove 556. The pivoting of the coupling member 540 in direction 592 advances the tooth 580 back into the recess 582. When the tooth 580 of the coupling member 540 extends into the recess 582, the coupling member 540 can transfer upward shifting of the pusher 124 in direction 122 into upward shifting of the pilot 172. On the opposite side of the coupling member 540, the pin 544 and the control groove 552 operate in a similar manner to the pin 544 and control groove 556 as the pilot 172 shifts in directions 122, 126.

Figure 20:
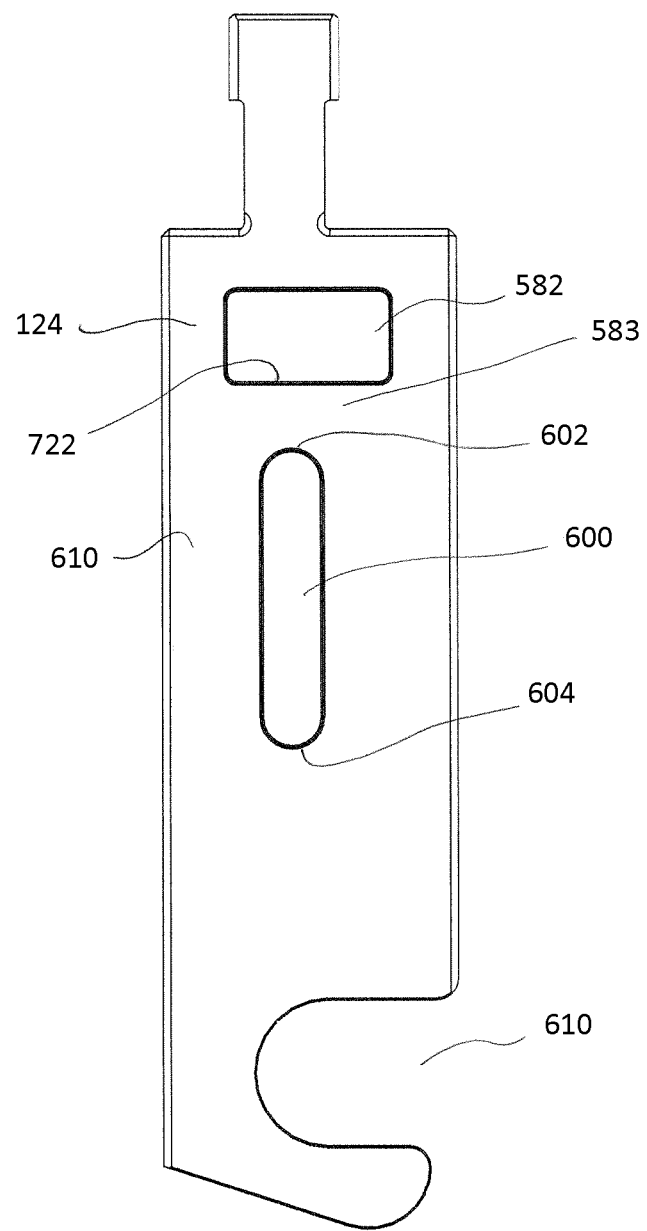
FIG. 20 is a left side elevation view of the pusher of FIG. 19 showing a recess of the pusher that receives a tooth of the coupling member of FIG. 19 and an elongated channel below the recess.
Figure 31:
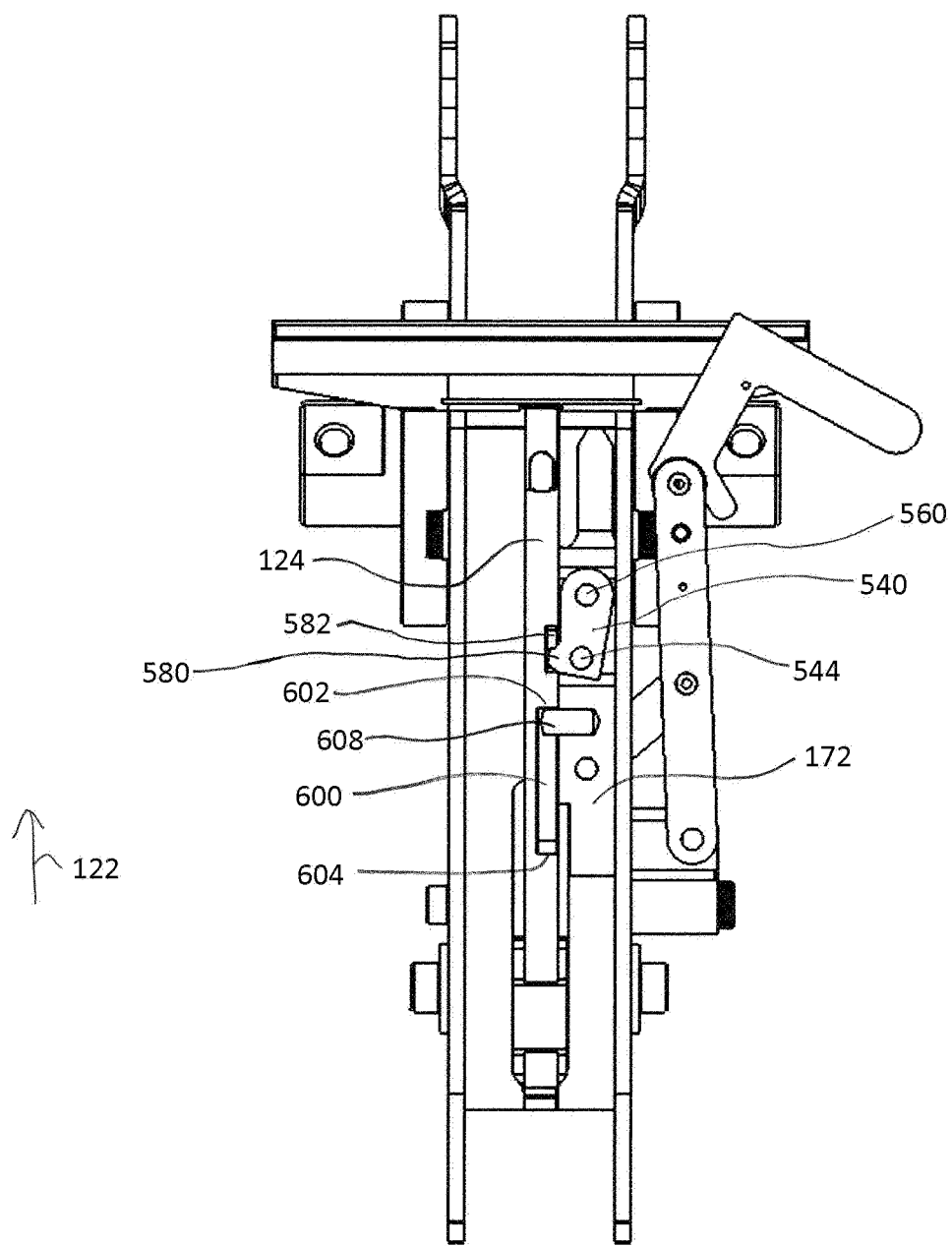
FIG. 31 is a front elevation view of the pusher, pilot, and advancing arm of the applicator of FIG. 4 showing the pusher, pilot, and advancing arm at initial positions thereof when the cam plate is at the angular position A.

With reference to FIGS. 20 and 31, the coupler 85 includes an elongated channel 600 of the pusher 124 and a pin 608 of the pilot 172 that cooperate to return the pilot 172 to the initial, lower position thereof as the handle 30 is pivoted back to the initial, start position 33. More specifically, the pusher body 530 includes the elongated channel 600 below the recess 582 having an upper end 602 and a lower end 604. The elongated channel 600 receives the pin 608 of the pilot 172 as shown in FIG. 31. The pin 608 is able to slide freely along the channel 600 between the upper and lower ends 602, 604 thereof. When the pusher 124 is decoupled from the pilot 172, shifting of the pusher 124 in the directions 122, 126 shifts the elongated channel 600 relative to the pin 608 until one of the upper and lower ends 602, 604 contacts the pin 608.

Figure 24:
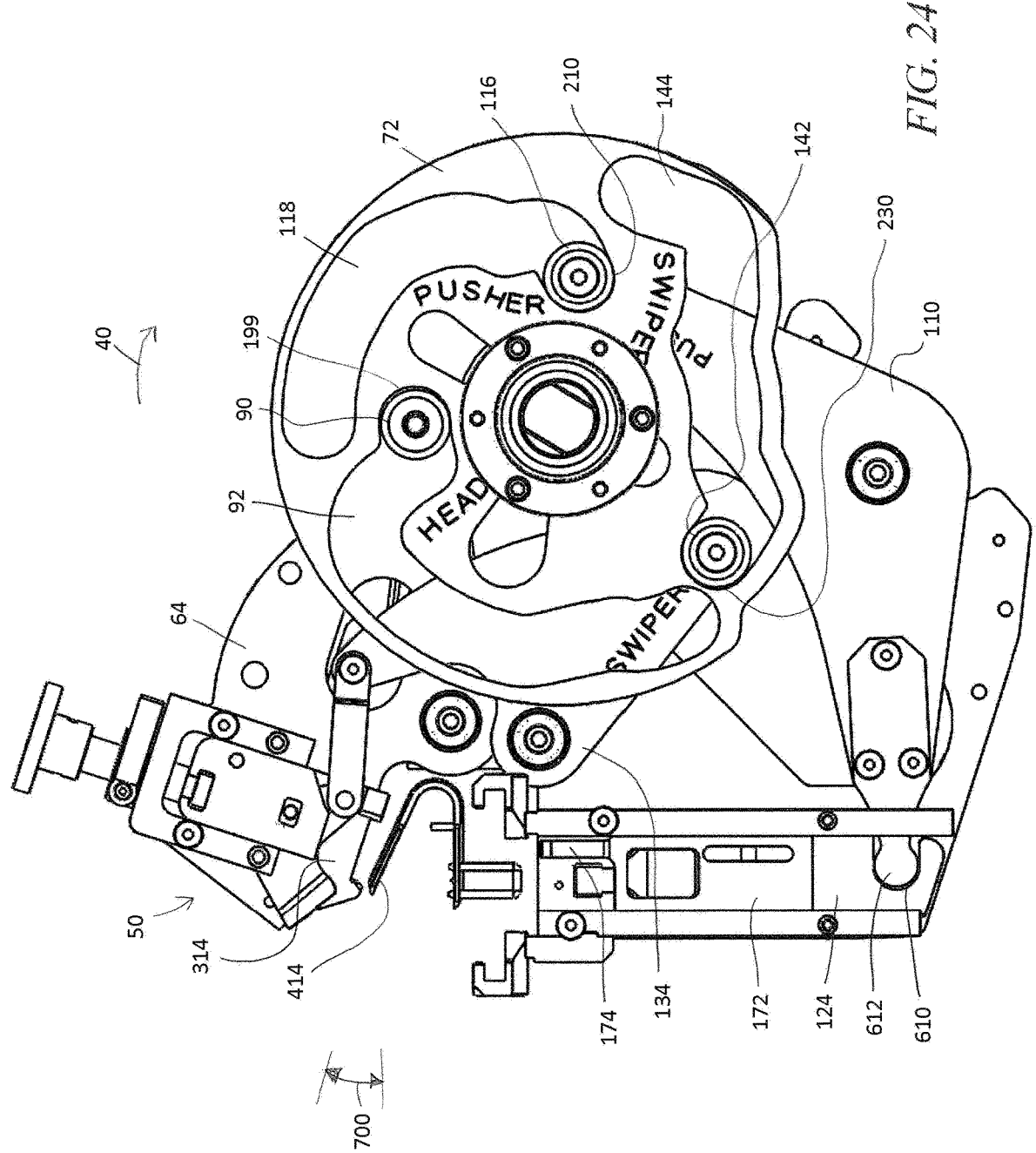
FIG. 24 is a left side elevation view similar to FIG. 3 with portions of the applicator removed to show head, pusher, and swiper cam followers of the applicator in corresponding cam paths of the cam plate in the initial, start position of the applicator.

With reference to FIGS. 24-30, the operation of the applicator 18 will be described as the cam plate 72 rotates in direction 40 from angular position A to angular position K in response to a user pivoting the handle 30 in direction 40 from the initial, start position 33 to the lower position 42 (see FIG. 2). With reference to FIG. 24, the cam plate 72 is shown at angular position A. The head cam follower 90, pusher cam follower 116, and the swiper cam follower 142 are all at the ends 199, 210, 230 of the respective head cam path 92, pusher cam path 118, and swiper cam path 144. When the cam plate 72 is at angular position A, the head 50 is in an initial position wherein there is an angle 700 from the lower clamp portion 340 of the center anvil 314 to a plane drawing a parallel to the fastener bed 14. The angle 700 may be in the range of approximately 10 degrees to approximately 25 degrees, such as approximately 18 degrees. With the head 50 in the initial position, the center and right anvils 314, 318 are spaced from the upper plate 414 of the fastener 12. Further, the pusher 124 and the pilot 172 are at an initial, lower position. When the applicator 18 in this initial configuration, the applicator 18 may be shifted along the anvil 14 in directions 20, 22 to position the head 50 and pusher 124 at the fastener 12 the user desires to secure to the conveyor belt end 13.

Figure 25:
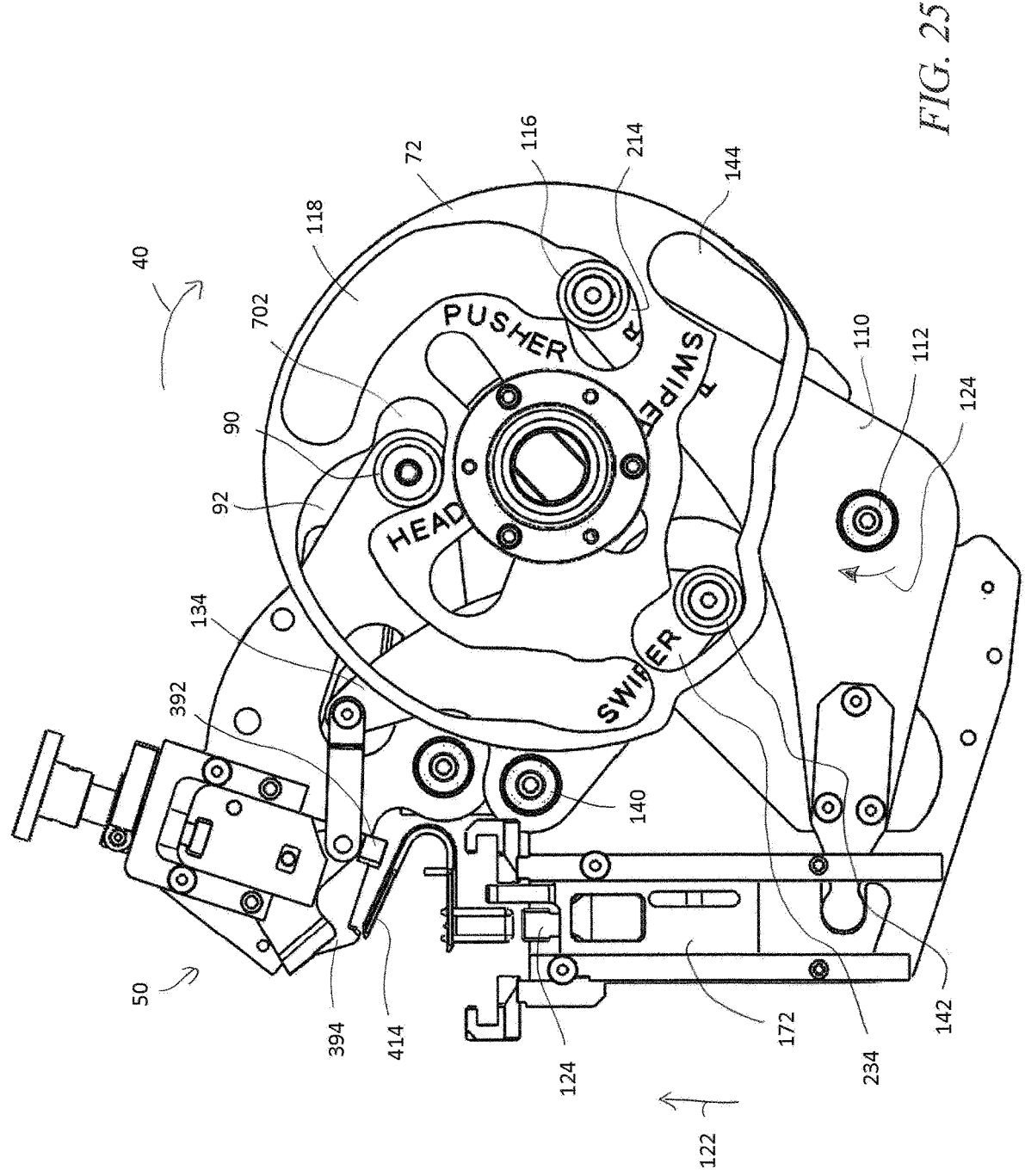
FIG. 25 shows the cam plate rotated clockwise from an angular position A in FIG. 24 to an angular position C which causes the pusher and pilot to be advanced upwardly.

With reference to FIG. 25, the cam plate 72 has rotated in direction 40 to angular position C. The head cam follower 90 has moved through an idle portion 702 such that the head 50 remains in the initial, upper position with the head 50 spaced from the upper plate 414 of the fastener 12. The pusher cam follower 116 has traveled through the advance and pilot portion 214 which caused the pusher arms 110 to pivot in direction 124 about the bushing 112. The pivoting of the pusher arms 110 in direction 124 shifts the pusher 124 and the pilot 172 upward in direction 122 since the pilot 172 is coupled to the pusher 124. The swiper cam follower 142 has traveled through an idle portion 234 of the swiper cam path 144 such that the swiper arms 134 may remain stationary about the bushing 140.

Figure 26:
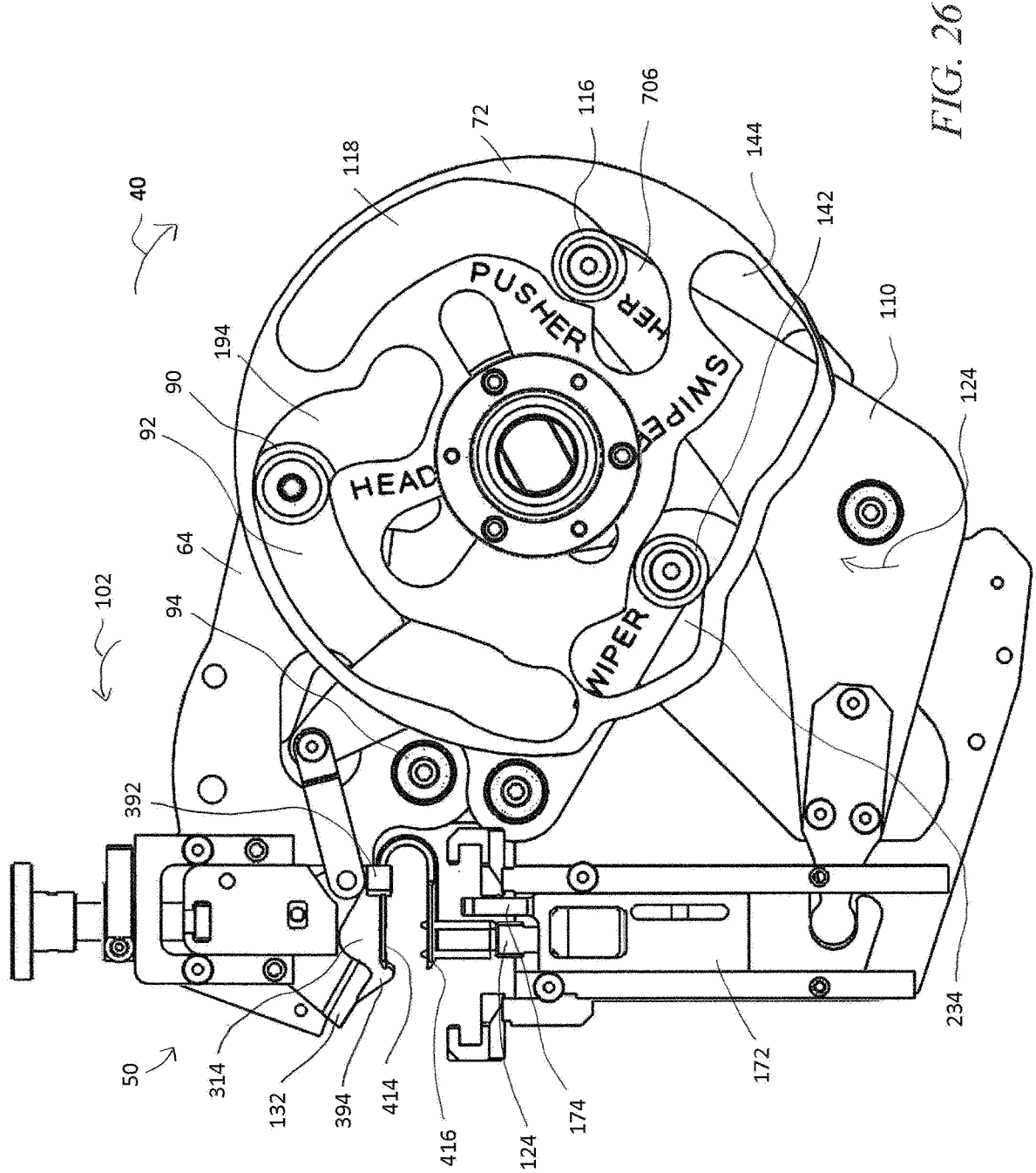
FIG. 26 shows the cam plate rotated clockwise to an angular position F which causes the head of the applicator tool to move the upper plate of the fastener downward toward the lower plate.

With reference to FIG. 26, the cam plate 72 has rotated in direction 40 to angular position F. The head cam follower 90 has traveled through the fastener clench portion 194 of the head cam path 92 which caused the head arms 64 to pivot in direction 102 about the bushing 94 and pivoted the head 50 in direction 102. Pivoting of the head 50 in direction 102 pivots the head 50 to a lowered position and clenches the upper plate 414 against the conveyor belt end 13 which tightly holds and compresses the conveyor belt end 13 between the upper and lower plates 414, 416. More specifically, pivoting of the head 50 in direction 102 causes the clamping leg 342 of the right anvil 318 to contact the wall 450, and the lower clamp portion 340 of the center anvil 314 to contact the wall 452, so that the center and right anvils 314, 318 clench the upper plate 414. Further, pivoting of the head 50 in direction 102 advances the inboard and outboard lugs 392, 394 in to the recesses 422, 424 and the alignment notch 420 so that the inboard and outboard lugs 392, 394 guide the upper plate 414 as the upper plate 414 shifts downward onto the conveyor belt end 13. But, as shown in FIG. 26, the swipers 130, 132 are at an outboard position clear of the upper plate 414 when the head 50 pivots downward in direction 102.

With continued reference to FIG. 26, the pusher cam follower 116 has traveled through a pusher-only portion 706 of the pusher cam path 118 wherein the pusher arms 110 continue to pivot in direction 124. In one form, when the cam plate 72 has rotated in direction 40 to angular position E, the coupling member 540 has pivoted in direction 578 (see FIG. 34) and decoupled the pilot 172 from the pusher 124. Thus, when the cam plate 72 is at angular position F shown in FIG. 26, the turning of the cam plate 72 in direction 40 causes shifting of the pusher 124 in direction 122 while the pilot 172 remains at the vertical position the pilot 172 was at when the pilot 172 decoupled from the pusher 124.

When the cam plate 72 rotates to the angular position F of FIG. 26, the swiper cam follower 142 travels through an idle portion 234 that maintains the swipers 130, 132 outboard of the upper plate 414. To maintain the swipers 130, 132 outboard of the upper plate 414, the idle portion 234 may have curvatures to compensate for the downward pivoting in direction 102 and clenching the upper plate 414.

Figure 27:
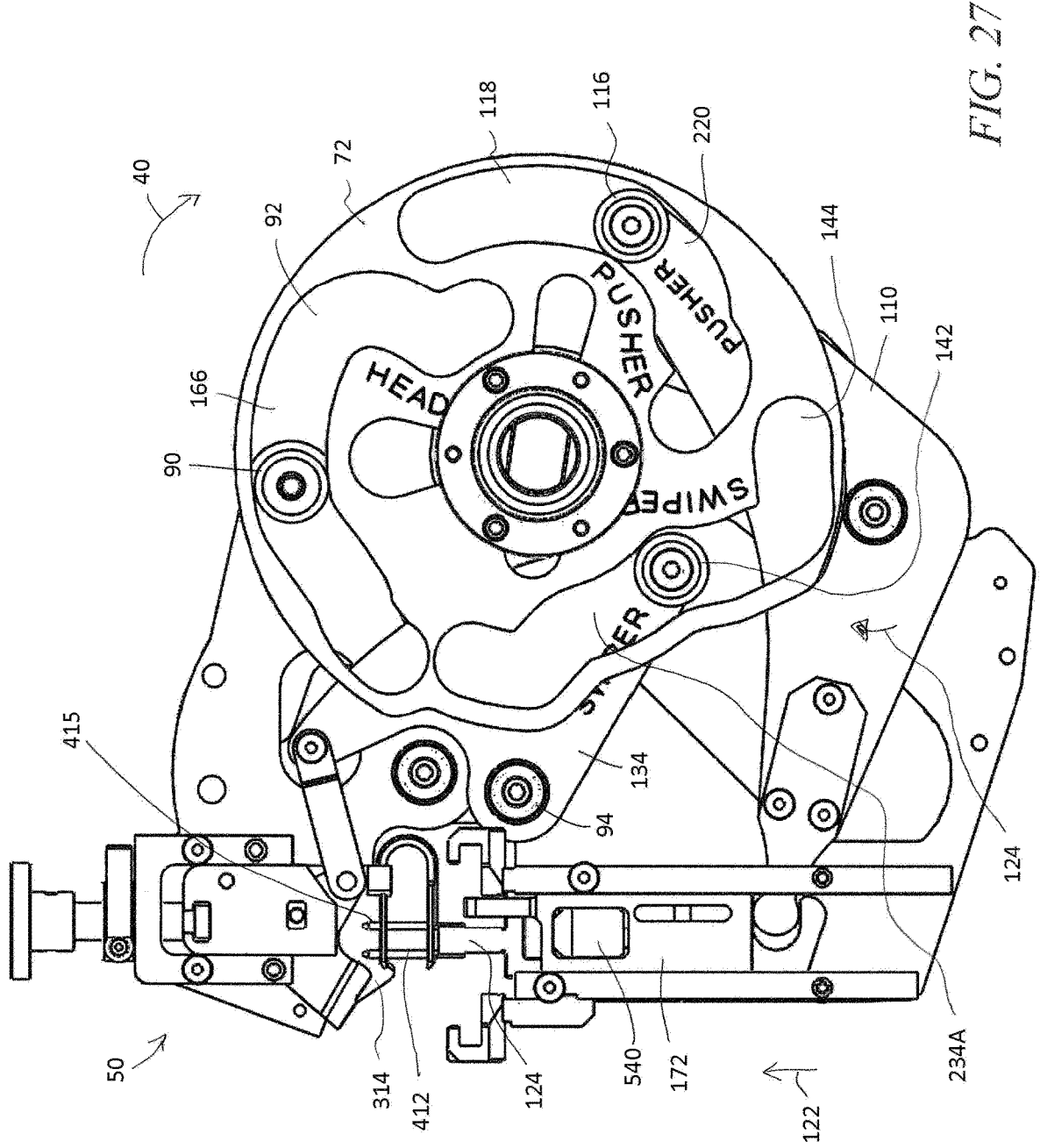
FIG. 27 shows the cam plate rotated clockwise to an angular position H which causes the pusher to shift upward and drive staples of the fastener.

With reference to FIG. 27, the cam plate 72 is shown having rotated in direction 40 to the angular position H. The head cam follower 90 has traveled through an idle portion 166 of the head cam path 92 so that the head 50 remains at the lowered position where the head 50 is at a zero degree angle. The head 50 may hold the upper plate 414 substantially parallel to the lower plate 416 with the conveyor belt end 13 compressed therebetween.

When the cam plate 72 has rotated to the angular position H shown in FIG. 27, the pusher cam follower 116 has traveled through the staple driving portion 220 of the pusher cam path 118. The staple driving portion 220 causes the pusher arms 110 to pivot further in direction 124 and continue to shift the pusher 124 upward in direction 122. Because the pilot 172 is decoupled from the pusher 124, the pilot 172 remains at the vertical position it was when the pilot 172 decoupled from the pusher 124 as the pusher 124 continues to shift in direction 122. Moving from FIGS. 26 to 27 shows that the pusher 124 shifting in direction 122 drives the legs 460, 462 of the staples 412 through the conveyor belt end 13 and into the apertures 464 of the upper plate 414.

With reference to FIG. 27, the rotation of the cam plate 72 to the angular position H also causes the swiper cam follower 142 to travel through an additional idle portion 234A such that the swiper arms 134 may remain stationary about the bushing 94. This causes the swipers 130, 132 to remain outboard from the upper plate 414 and out of the way of the staple legs 460, 462 as they are driven through the apertures 464 of the upper plate 414.

Figure 28:
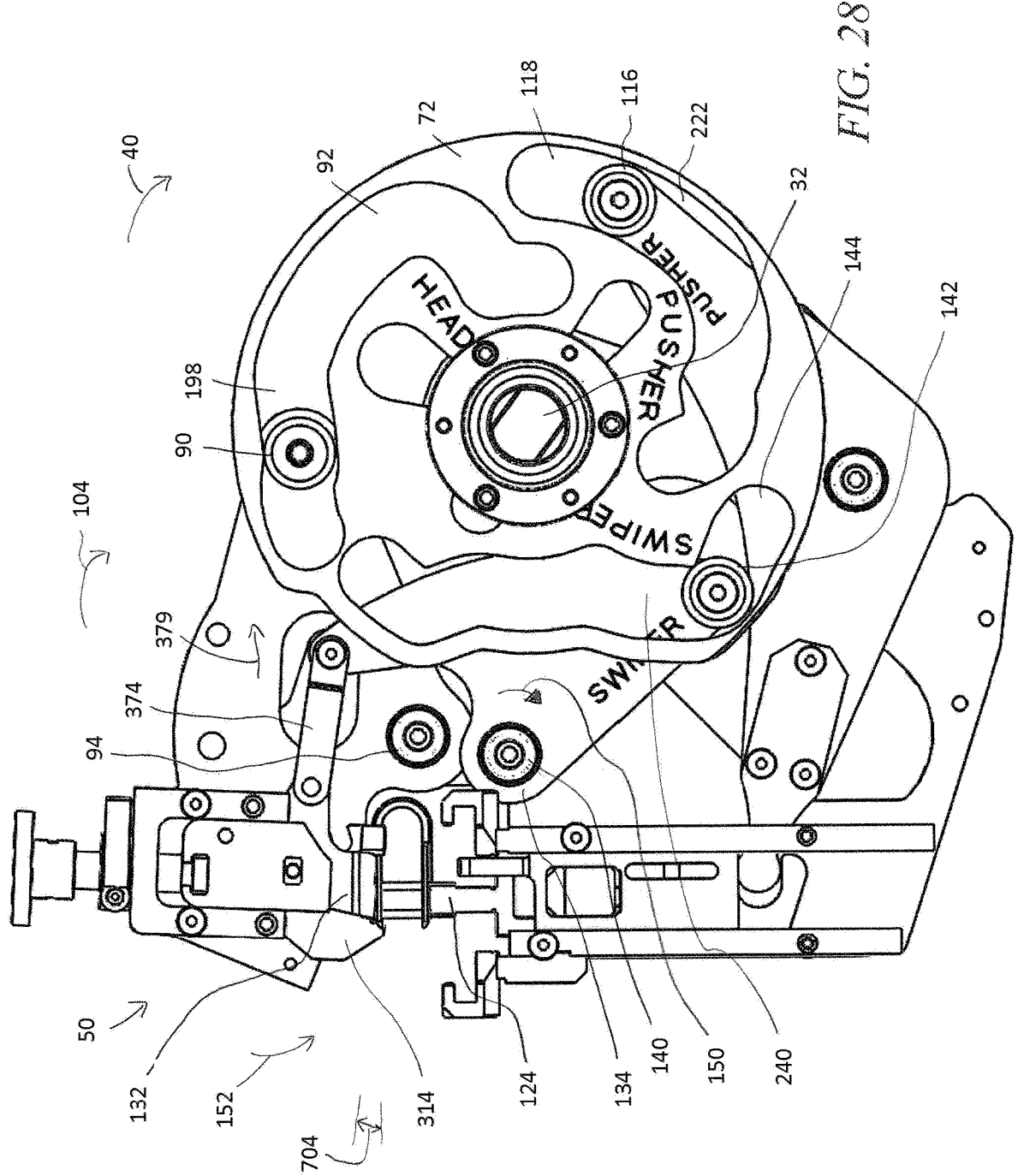
FIG. 28 shows the cam plate rotated clockwise to an angular position I which causes the swipers to bend over the projecting ends of the legs of the staples and pivots the head upward slightly during the swiping operation.

With reference to FIG. 28, the cam plate 72 is shown having rotated in direction 40 to the angular position I. This rotation causes the head cam follower 90 to travel through the swiper portion 198 which causes the head 50 to pivot upwardly in direction 104 to an angle 704 in the range of approximately zero degrees to approximately five degrees, such as approximately three degrees. The pivoting of the head 50 in direction 104 due to the swiper portion 198 causes the curved leading surfaces 341 of the swipers 130, 132 to travel along the channels 454, 456 at a substantially constant height from floors 454A, 456A (see FIG. 15A) of the channels 454, 456. This provides a linear path for the curved leading surfaces 341 and produces similar bending of the legs 460, 462.

With reference to FIG. 12, the head 50 may be pivoted upward in direction 104 during the swiping operation because the swipers 130, 132 have a fixed distance 708 between the rounded ends 368 and the curved leading surfaces 341. As the rounded ends 368 rock against the curved wall 370 of the rocker pockets 364, the curved leading surfaces 341 would travel along an arcuate path relative to the upper plate 414 with a decreasing distance from the channel floors 454A, 456A if the head 50 were held stationary. To compensate for the arcuate path of the curved leading surfaces 341, the swipe portion 198 of the head cam path 92 causes the head 50 to pivot upwardly which lifts the swipers 130, 132 upwardly and negates the downward movement of the curved leading surfaces 341 caused by pivoting of the swipers 130, 132.

The swiper portion 198 of the head cam path 92 and the swiper portion 240 of the swiper cam path 144 may be configured to delay pivoting of the head 50 in direction 104 until after the swipers 130, 132 have bent the outboard staple legs 460 to an angle, such as approximately 45 degrees. By bending the outboard staple legs 406 to approximately 45 degrees, the bent staple legs 460 contact the upper plate 414 and resist the upper plate 414 from shifting upward away from the conveyor belt end 13 when the head 50 pivots in direction 104. This keeps the conveyor belt 13 compressed between the upper and lower plates 414, 416 of the fastener 12.

With reference to FIG. 28, the rotation of the cam plate 72 to angular position I also causes the pusher cam follower 116 to travel through an idle portion 222 of the pusher cam path 118. The idle portion 222 permits the pusher arms 110 to remain stationary and hold the pusher 124 in an extended, upper position which supports the staples 412 during the swiping operation. In an alternative embodiment, the rotation of the camp plate 72 to angular position I causes the pusher 24 to lower slightly rather than staying in the extended, upper position.

As the cam plate 72 rotates to the angular position I of FIG. 28, the swiper cam follower 142 travels through the swiper portion 240 of the swiper cam path 144. The swiper portion 240 causes the swiper arms 134 to pivot in direction 150 about the bushing 140 which pulls the links 374 in direction 379 and causes the swipers 130, 132 to pivot in direction 152. The pivoting of the swipers 130, 132 bends the legs 460, 462 downward into the channels 454, 456 and against the floors 454A, 456A of the channels 454, 456.

Figure 29:
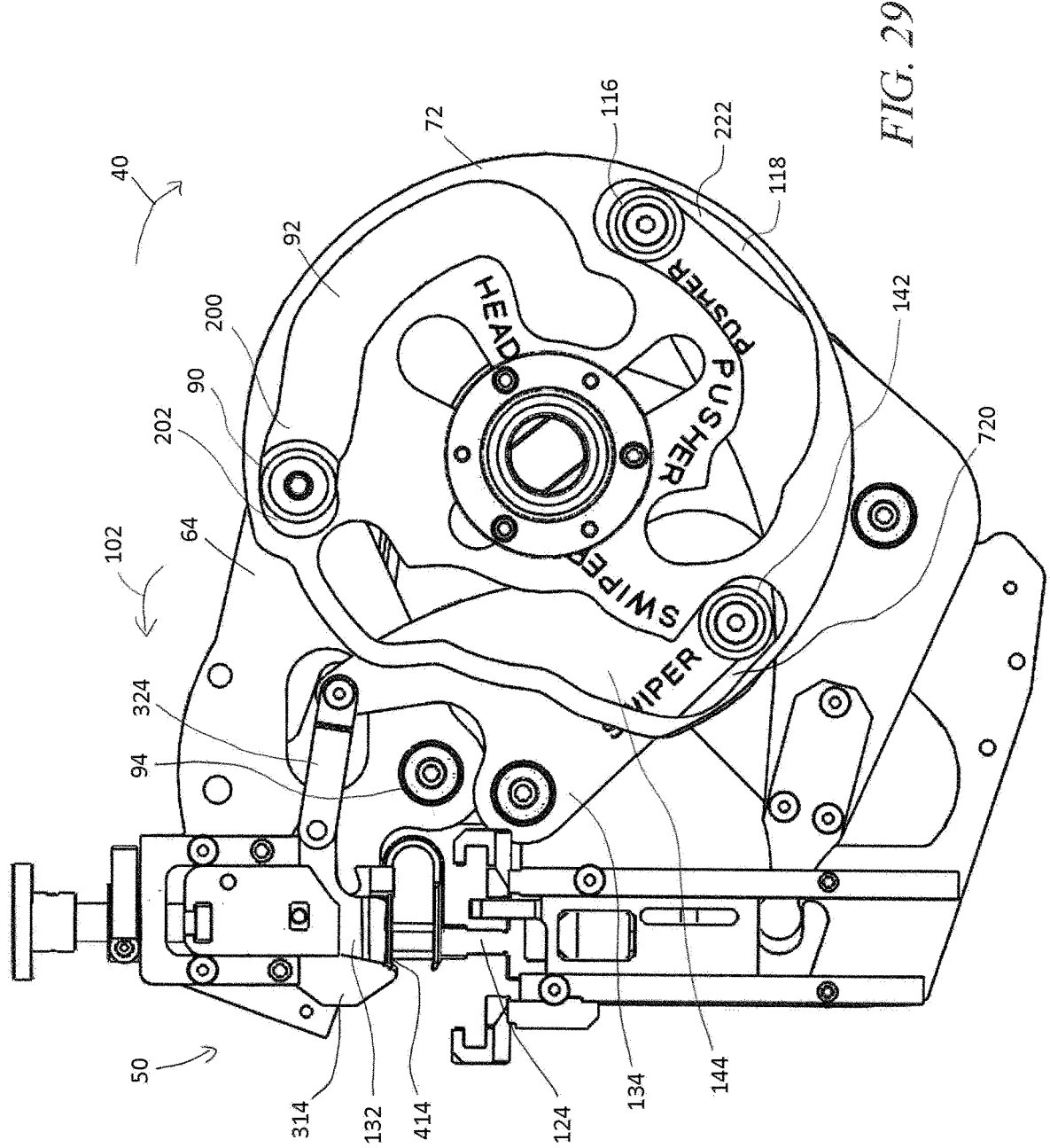
FIG. 29 shows the cam plate rotated clockwise to an angular position J which causes the head to pivot downward and perform a final clamping of the staple legs against the upper plate of the fastener.

With reference to FIG. 29, the cam plate 72 is shown rotated in direction 40 to the angular position J. This rotation causes the head cam follower 90 to travel through a final set portion 200 of the head cam path 92. The final set portion 200 causes the head arms 64 to pivot in direction 102 about the bushing 94 and pivots the head 50 in direction 102 back to the zero degree, lowered position. This pivoting of the head 50 in direction 102 causes the first clamping surface 350 (see FIG. 9) and the second clamping surface 352 of the swipers 130, 132 to press the now bent-over ends 415 of the staple legs 460, 462 against the channel floors 454A, 456A of the upper plate 414. In one approach, the center and right anvils 314, 318 do not contact the upper plate 414 when the swipers 130, 132 press the ends 415 against the channel floors 454A, 456A and perform the final set operation.

The rotation of the cam plate 72 to the angular position J of FIG. 29 also causes the pusher cam follower 116 to travel through an idle portion 222 of the pusher cam path 118. This allows the pusher 124 to remain at the extended, upper position thereof. In the alternative embodiment mentioned above with respect to rotation of the cam plate 72 to angular position I, the rotation of the cam plate 72 to the angular position J causes the pusher 24 to shift upward for a final fastener clench rather than remaining stationary.

The rotation of the cam plate 72 to the angular position J of FIG. 29 also causes the swiper cam follower 142 to travel through idle portion 720 whereby the swiper arms 134 and the links 374 may remain stationary. The idle portion 720 causes the swiper arms 134 and links 374 to maintain the swipers 130, 132 in position above the staple legs 460, 462 for flattening the staple legs as the head 50 pivots in direction 102 to perform the final set operation to the fastener 12.

Figure 30:
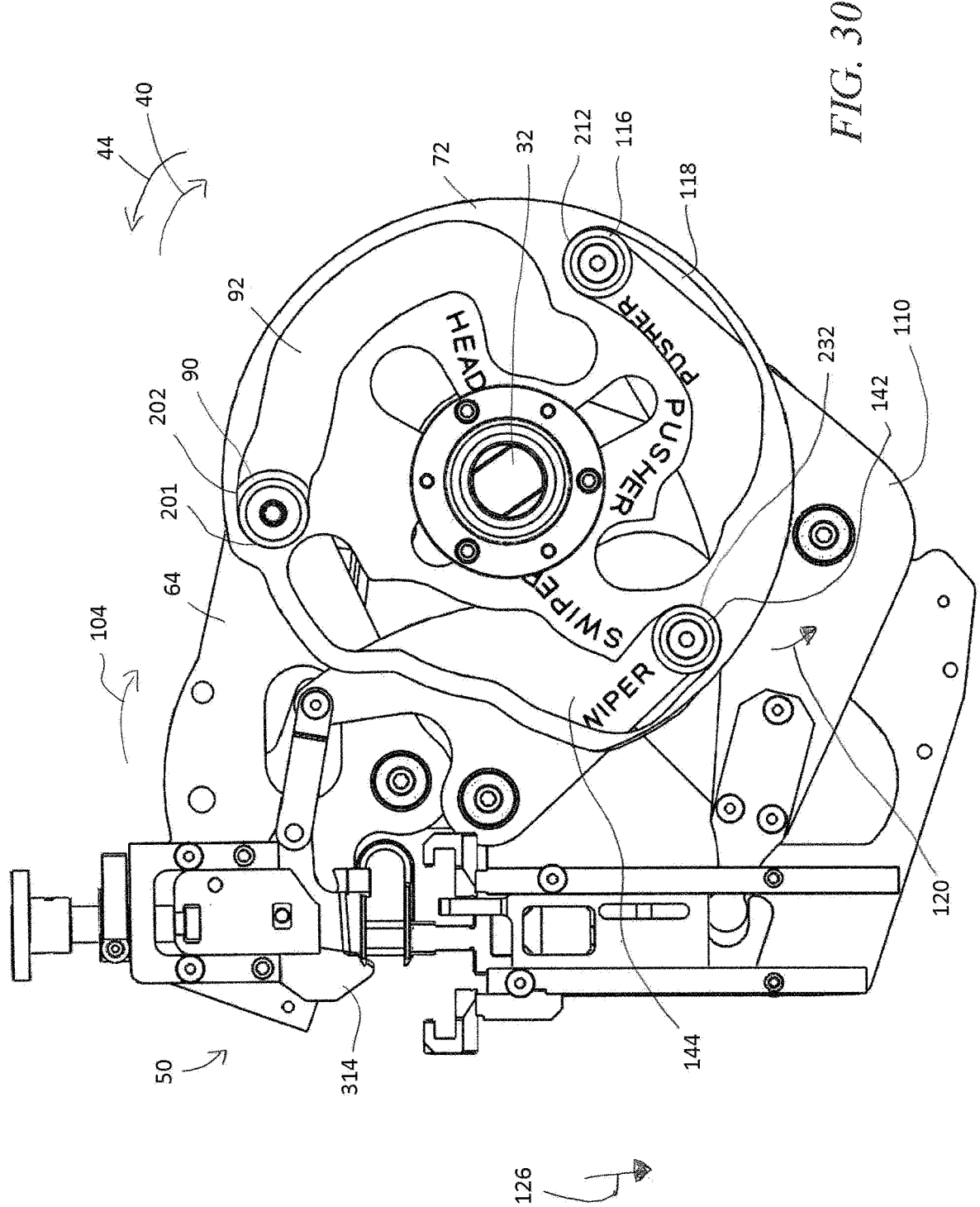
FIG. 30 shows the cam plate rotated clockwise to an end angular position K which positions the head, pusher, and swiper cam followers at the ends of their respective cam paths.

With reference to FIG. 30, the cam plate 72 is shown having rotated in direction 40 to the angular position K. In one form, the angular position K is the maximum angular position of the cam plate 72 and the angular position K occurs when the handle 30 has been pivoted to the lower position 42. The rotation of the cam plate 72 to the angular position K of FIG. 30 causes the head cam follower 90 to travel through the compression relief portion 202 and reaches the end 201 of the head cam path 92. The compression relief portion 202 allows the head cam follower 90 to shift radially inwardly a small distance which causes the head arms 64 and head 50 to pivot a small distance such as a fraction of a degree in direction 104. The movement of the head 50 in direction 104 releases a portion of the clenching force the head 50 applies against the fastener upper plate 414. This releases some of the compression in the conveyor belt end 13. The release in compression of the conveyor belt end 13 is transferred to the user through the head 50, head arms 64, cam plate 72, drive shaft 32, and handle 30 and provides tactile feedback that the head cam follower 90 has reached the end 201 of the head cam path 92. In the alternative embodiment mentioned above with respect to rotation of the cam plate 72 to angular positions I and J, the cam plate 72 does not include a compression relief portion such that rotation of the cam plate 72 to the angular position K does not cause the head 50 to move in direction 104 and release some of the compression in the conveyor belt end 13.

The compression relief portion 202 may also provide a safety mechanism to resist the handle 30 from rebounding back in direction 44 after the cam plate 72 has reached the angular position K and the handle 30 is at the lower position 42. Specifically, once the head cam follower 90 is within the compression relief portion 202, the head cam follower 90 must travel into the final set portion 200 in order for the cam plate 72 to turn in direction 44. Moving the head cam follower 90 from the compression relief portion 202 into the final set portion 200 involves shifting the head cam follower 90 radially outward which causes pivoting of the head arms 64 and head 50 in direction 102. The pivoting of the head 60 in direction 102 again applies the final set clench to the upper plate 414 and re-compresses the conveyor belt end 13. The conveyor belt end 13 resists being recompressed and thereby resists pivoting of the head 50 in direction 102 which, in turn, resists turning of the cam plate 72 and handle 30 in direction 44. In this manner, the transition between the compression relief portion 202 and the final set portion 200 operates as a detent to resist unintentional pivoting of the handle 30 in direction 44 from the lower position 42 and the handle 30 striking the user. However, if the user is ready to return the handle 30 from the lower position 42 to the upper, start position 33, the user simply applies sufficient force to the handle 30 to overcome the detent and move the head cam follower 90 from the compression relief portion 202 and into the final set portion 200. As noted above, in some embodiments, the cam plate 72 does not include the compression relief portion 202.

With reference to FIG. 30, the rotation of the cam plate 72 to the angular position K brings the pusher cam follower 116 to the end 212 of the pusher cam path 118. This rotation also brings the swiper cam follower 142 to the end 232 of the swiper cam path 144. In this manner, the rotation of the cam plate 72 in direction 40 from the angular position A (FIG. 24) to the angular position K (FIG. 30) has driven the advancing, piloting, fastener clenching, staple driving, staple swiping, and final set operations. The user may then pivot the handle 30 in direction 44 from the lower position 42 (where the cam plate 72 is at the angular position K) back to the initial, upper position 42.

Thus, the user pivoting the handle in direction 40 from the initial, upper position 33 to the lower position 42 causes the applicator 18 to perform all of the advancing piloting, fastener clenching, staple driving, staple swiping, and final set operations. Once the handle 30 has reached the lower position 42, all of these operations have been performed, such that the user may pivot the handle in direction 44 from the lower position 42 to the upper, start position 33 with less effort than pivoting the handle 30 in direction 40 from the upper, start position 33 to the lower position 42. Once the user overcomes the detent produced by the transition between the compression relief portion 202 and the final set portion 200 (discussed above), the force required to move the handle 30 is lower since the pivoting of the handle 30 in direction 44 is driving the components of the applicator 18 back to their initial positions rather than advancing the applicator 18, clenching the fastener 12, driving the staples 412, and swiping the staple 412.

With reference to FIG. 31-37, the operation of the pusher 124, pilot 172, and the coupling member 540 are discussed as the cam plate 72 rotates from the angular position A (see FIG. 24) to the angular position H (see FIG. 27).

With reference to FIG. 31, the cam plate 72 is at the angular position A such as when the handle 30 is at the upper, start position 33. As discussed above, the pilot 172 is initially coupled to the pusher 124 so that the pilot 172 and pusher 124 may shift upward together in direction 122. Specifically, the tooth 580 of the coupling member 540 extends into the recess 582 of the pusher 124 so that the tooth 580 abuts the pusher 124 when the pusher 124 shifts in direction 122.

Figure 32:
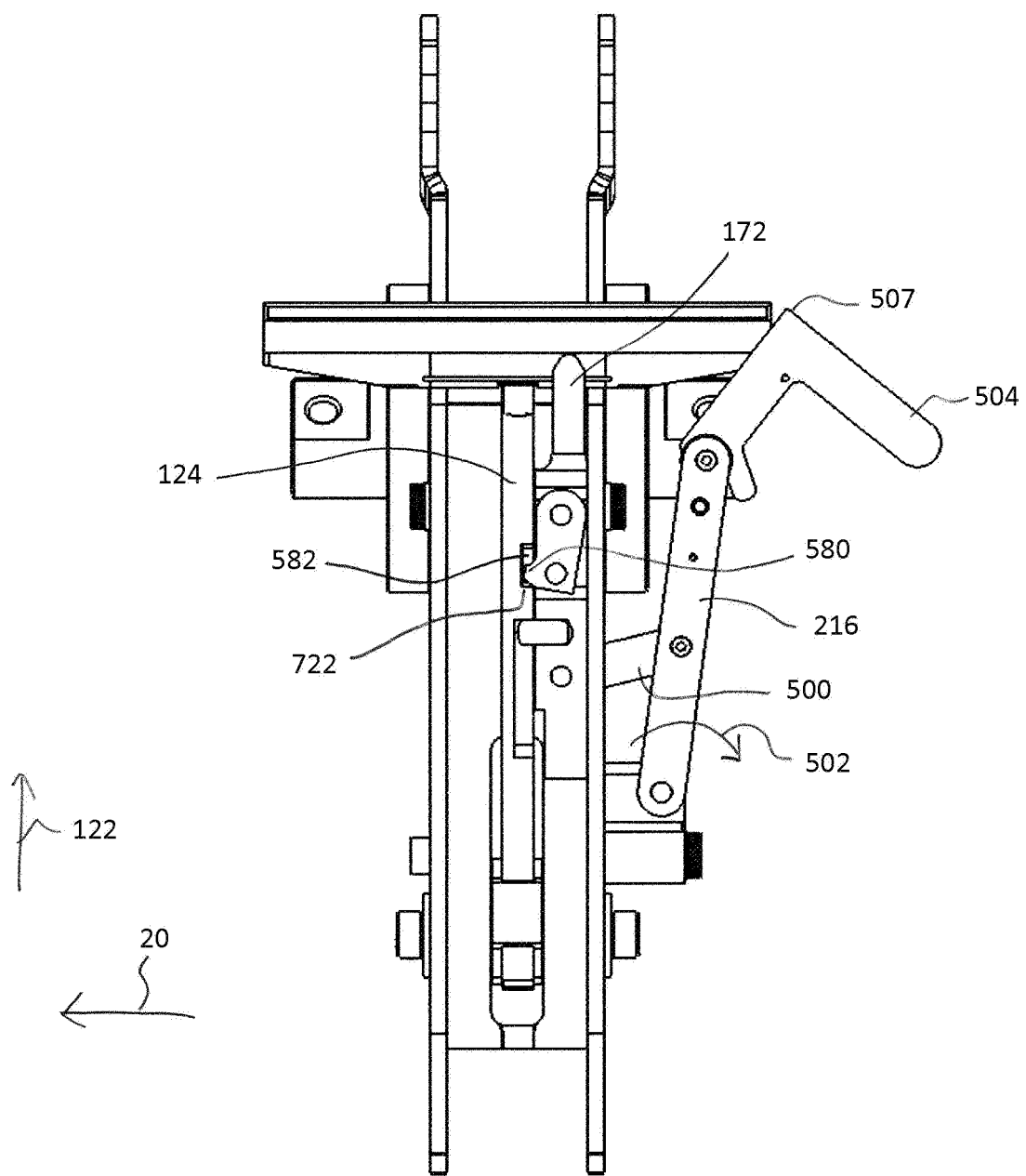
FIG. 32 shows the pusher shifted upward and the pilot shifted upward with the pusher due to the pivotal coupling member of the pilot extending into the recess of the pusher when the cam plate is shifted to an angular position B.

With reference to FIG. 32, the cam plate 72 has rotated to the angular position B. This rotation causes the pusher arms 110 to shift the pusher 124 upward in direction 122. Because the tooth 580 of the coupling member 540 abuts a wall 722 (see also FIG. 20) of the recess 582 of the pusher 124, the coupling member 540 transfers the movement of the pusher 124 in direction 122 into movement of the pilot 172 in direction 122. The upward movement of the pilot 172 in direction 122 also causes pivoting of the advancing arm 216 in direction 502 due to the pivotal connections between the link 500, the advancing arm 216, and the pilot 172. The edge 507 of the advancing finger 504 is engaged with the corner 510 of one of the holes 516 so that pivoting of the advance arm 216 in direction 502 causes the applicator 18 to shift laterally in direction 20 along the fastener bed 14.

Figure 33:
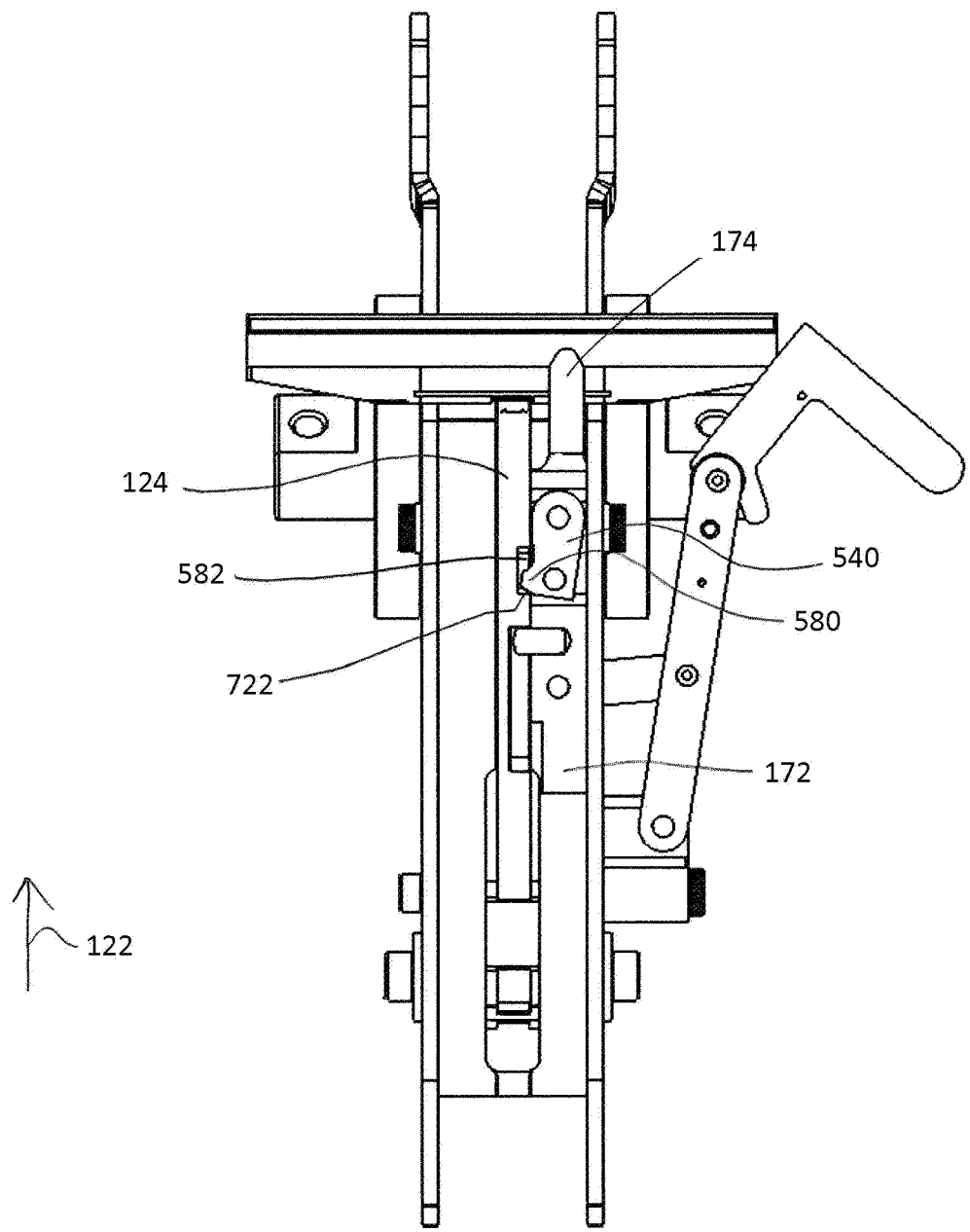
FIG. 33 shows the pusher and the pilot continuing to shift upward together when the cam plate is shifted to an angular position C.

With reference to FIG. 33, the cam plate 72 has rotated in direction 40 to the angular position C. The pusher arms 110 have shifted the pusher 124 further upward in direction 122. The tooth 580 of the coupling member 540 continues to abut the wall 722 of the recess 582 of the pusher 124. In this manner, the coupling member 540 causes the pilot 172 to shift upward in the direction 122 with the pusher 124. Thus, the pilot finger 174 may begin to advance into the enlarged lower portion 570 of the hole 16 next to the hole 16 aligned with the pusher 124.

With reference to FIG. 34, the cam plate 72 has rotated in direction 40 to the angular position D. The pusher arms 110 continue to shift the pusher 124 upward in direction 122 and the coupling member 540 keeps the pilot 172 shifting upward in direction 122 with the pusher 124. However, the pin 544 of the coupling member 540 has entered the dog leg portions 568, 570 of the control grooves 552, 556 of the front and rear guide walls 550, 554. The sliding engagement between the coupling member pin 544 and the dog leg portions 568, 570 causes the coupling member 540 to start pivoting in direction 578 (see also FIG. 23). The pivoting of the coupling member 540 in direction 578 withdraws the tooth 580 of the coupling number 540 from the recess 582 of the pusher 124.

With reference to FIG. 35, the cam plate 72 has rotated in direction 40 to the angular position E. The pusher arms 110 continue to shift the pusher 124 upward in direction 122. However, the pin 544 of the coupling member 540 has reached the end portions of the dog legs 568, 570 so that the coupling member 540 has fully pivoted in direction 578. As shown in FIG. 35, the tooth 580 of the coupling member 540 has been withdrawn from the recess 582 of the pusher 124 and no longer abuts the wall 722 of the recess 582. Because the coupling member 540 is now in clearance with the pusher 124, the pusher 124 may shift upward in direction 122 without causing upward movement of the pilot finger 174. In this manner, the pusher 124 has been decoupled from the pilot 172.

The pilot 172 decouples from the pusher 124 at the upper end of the stroke of the pilot 172 where the pilot 172 is at its maximum upper position. Once the pilot 172 has been decoupled from the pusher 124, the pilot 172 remains at the maximum upper position because the coupling member 540 is locked in position by the pusher surface 583 contacting the coupling member tooth 580 on one side and the dog leg portions 568, 570 receiving the pin 544 on the other side of the coupling member 540. The locked coupling member 540 maintains the pilot 172 at the maximum upper position thereof because the coupling member 540 is connected to the pilot 172 via pin 560. Because the pilot 172 is at its maximum upper position, the pilot finger 174 remains fully engaged with the enlarged lower portion 570 of the hole 16 and locks the applicator 18 in position along the fastener bed 14 during the plate clench, staple drive, leg swipe, and final set operations.

Figure 36:
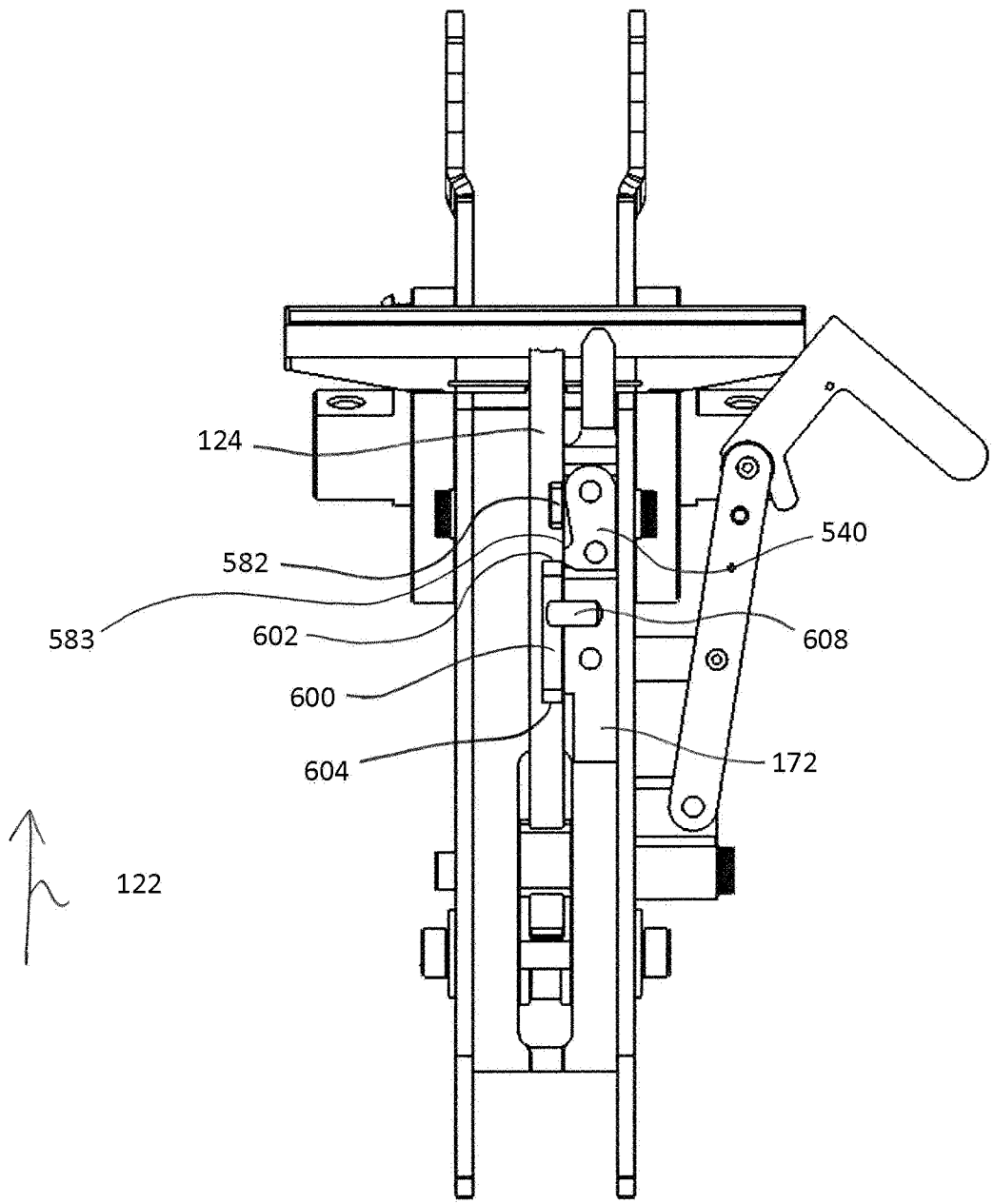
FIG. 36 shows the pusher shifting upward to drive the staples of the fastener while the pilot remains stationary when the cam plate is shifted to an angular position G.

With reference to FIG. 36, the cam plate 72 has been rotated in direction 40 to angular position G. Because the pilot 172 is no longer coupled to the pusher 124, the pusher 124 can shift upwardly in direction 122 without producing corresponding upward movement of the pilot 172. Additionally, once the pilot 172 has been decoupled from the pusher 124, the pusher 124 may shift upward in direction 122 without causing pivoting of the advancing arm 216 in direction 502 and associated movement of the advancing finger 504.

With reference to FIG. 36, because the pilot 172 has been decoupled from the pusher 124, the elongated channel 600 of the pusher 124 moves relative to the pin 608 of the pilot 172 as the pusher 124 shifts upwardly in direction 122. This causes the lower end 604 of the channel 600 to move toward the pin 608 and the upper end 602 of the channel 600 to move away from the pin 608.

Figure 37:
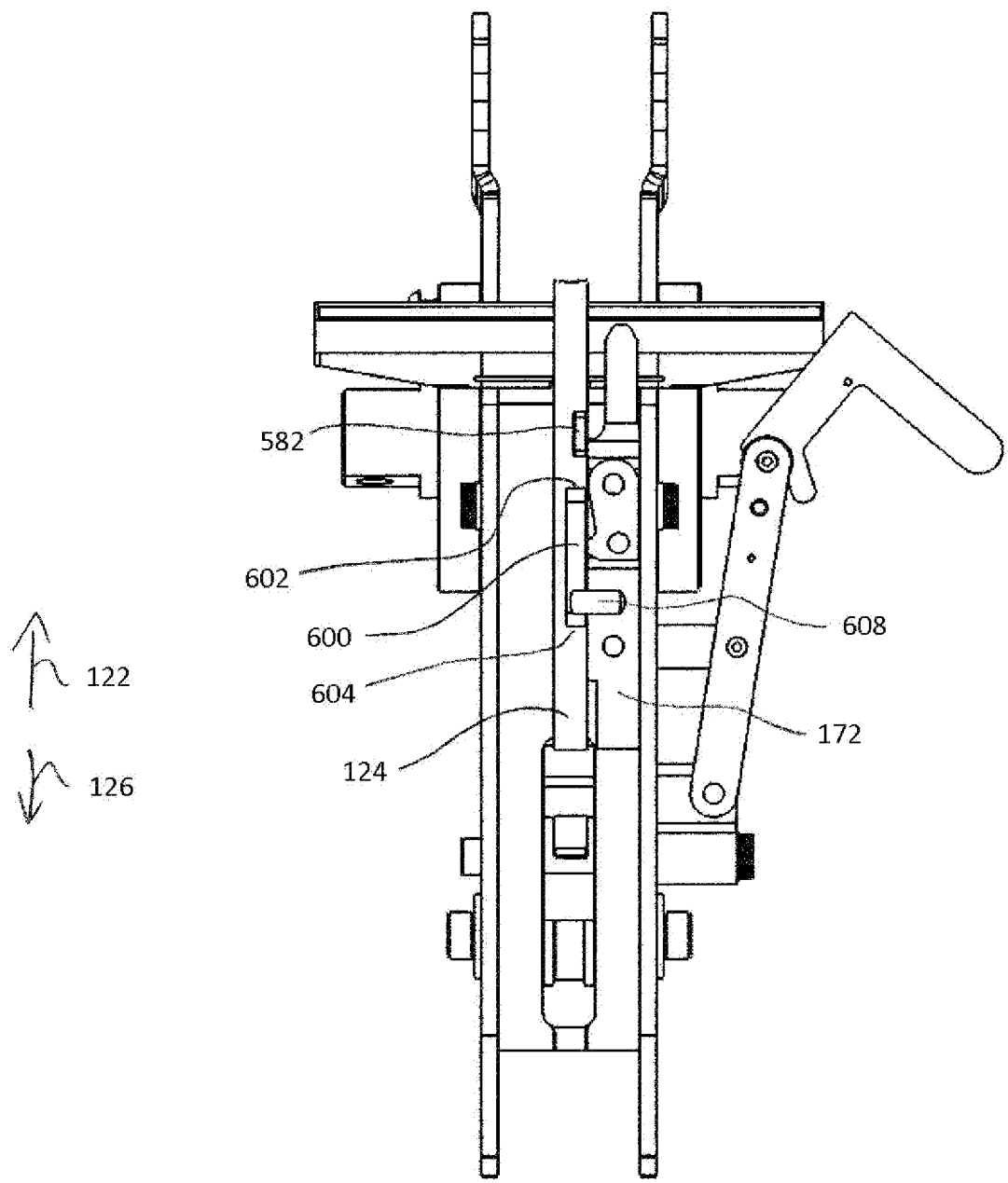
FIG. 37 shows the pusher shifted fully vertically upward to drive the staples through the conveyor belt while the pilot remains stationary when the cam plate is shifted to an angular position H.

With references to FIG. 37, the cam plate 72 has been rotated in direction 40 to the angular position H. The pusher arms 110 have shifted the pusher 124 upward in direction 122 to a maximum upper position which fully drives the staple legs 460, 462 through the conveyor belt 13 and through the apertures 464 of the upper plate 414. As discussed above, the continued rotation of the cam plate 72 in direction 40 to the final angular position K may not result in any additional pivoting of the pusher arms 110 because the pusher cam follower 116 travels through the idle portion 222 of the cam path 118. This idle portion 222 thereby maintains the pusher 124 at the maximum upper position until the cam plate 72 reaches the final, angular position K (see FIG. 30). In another embodiment, the cam plate 72 may be configured to cause the pusher 24 to shift slightly downward as the cam plate 72 rotates to angular position H and then causes the pusher 24 to shift back upwardly as the cam plate 72 rotates to angular position K.

After the user has pivoted the handle 30 to the lower position 42 and caused the cam plate 72 to rotate to the angular position K, the user pivots the handle 30 upward in direction 44 and reverses the paths of the head cam follower 90, pusher cam follower 116, and the swiper cam follower 142 through the respective head cam path 92, pusher cam path 118, and the swiper cam path 144. This reverses the operations discussed above. The reversal of these operations includes pivoting the pusher arms 110 in direction 120 (see FIG. 30) and shifting the pusher 124 downward in direction 126.

As the pusher 124 shifts downward in direction 126 due to the user pivoting the handle 30 in direction 44, the upper end 602 of the channel 600 shifts back toward and contacts the pin 608 of the pilot 172. The abutting contact of the end 602 against the pin 608 re-couples the pilot 172 to the pusher 124. The re-coupled pilot 172 thereby shifts downward in direction 126 with the pusher 124.

The downward movement of the pilot 172 in direction 126, due to the user continuing to pivot the handle 30 in direction 44, shifts the recess 582 back into alignment with the coupling member tooth 580 and shifts the coupling member pin 544 in direction 126 along the control grooves 552, 556 (see FIG. 23). This causes the pin 544 to shift into the straight portions 564, 566 which, in turn, pivots the coupling member 540 in direction 592 (see FIG. 23). The pivoting of the coupling number in direction 592 causes the tooth 580 to advance back into the recess 582 of the pusher 124. In this manner, the pilot 172 is disconnected from the pusher 124 at a point in the upward stroke in the pusher 124 and is subsequently reconnected to the pusher 124 as the pusher 124 travels on the down stroke of the pusher 124.

Once the pusher 124 returns to the initial, lower position thereof (see FIG. 31), the tooth 580 of the coupling member 540 will again be in overlapping interference with the wall 722 of the recess 582 of the pusher 124. When the user again pivots the handle 30 in direction 40 from the initial, upper position 33 to the lower position 42 to secure the next fastener 12 to the conveyor belt end, the pusher 124 will again shift upward in direction 122 and the tooth 580 will abut the wall 722 and cause the pilot 172 to shift in direction 122 with the pusher 124.

Figure 38:
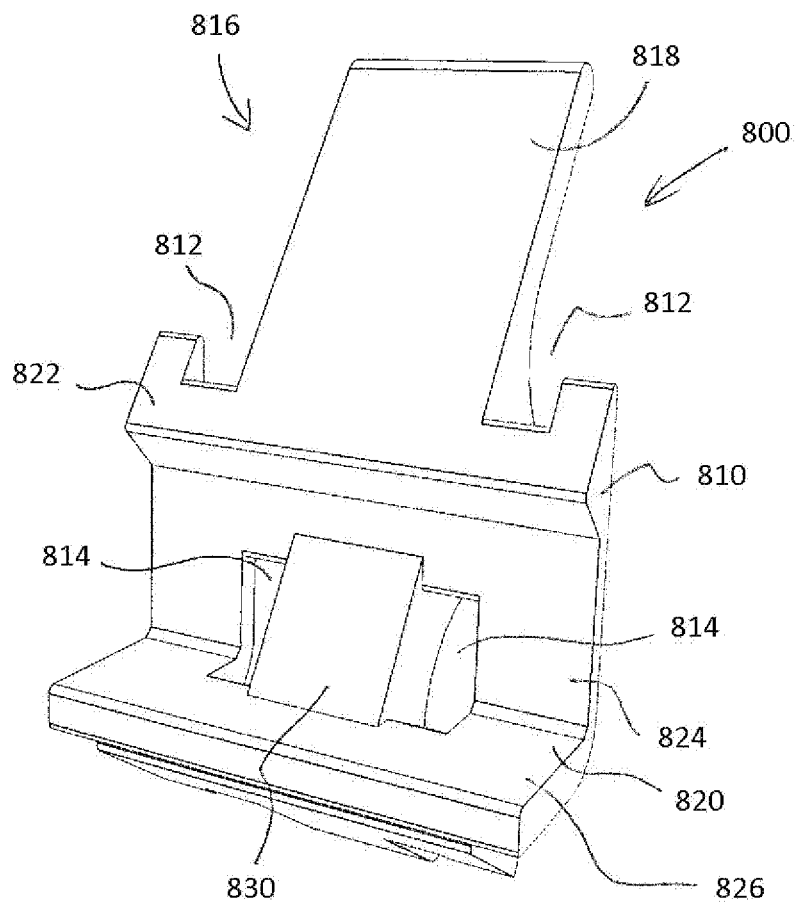
FIG. 38 is a perspective view of a seal that may be used to seal a forward opening of the applicator that faces the fasteners and the fastener bed.

With reference to FIG. 38, the applicator 18 may include a seal 800 (see FIG. 4) to restrict ingress of debris into an opening 804 of the applicator 18. The opening 804 may be defined at least in part by the head arms 64 and the swiper arms 134.

The seal 800 includes a body 810 having openings such as notches 812 and openings 814 that receive portions of the head arms 64 and the swiper arms 134. The seal 800 also includes a resilient upper portion 816 that may extend into the gap between the head arms 64. The upper portion 816 includes an upper shield portion 818 that extends into a gap between the head arms 64 (see FIG. 41). The body 810 also includes a gib-receiving portion 820 having a lip 822, a rear wall 824, and a seat 826 that are configured to mate with the gib 56 and resist ingress of debris therebetween. The upper shield portion 818 and the lip 822 resist ingress of material into the applicator 18 by filling the space between the head arms 64 and the pinch between the gib 56 and the frame plates 62.

Figure 39:
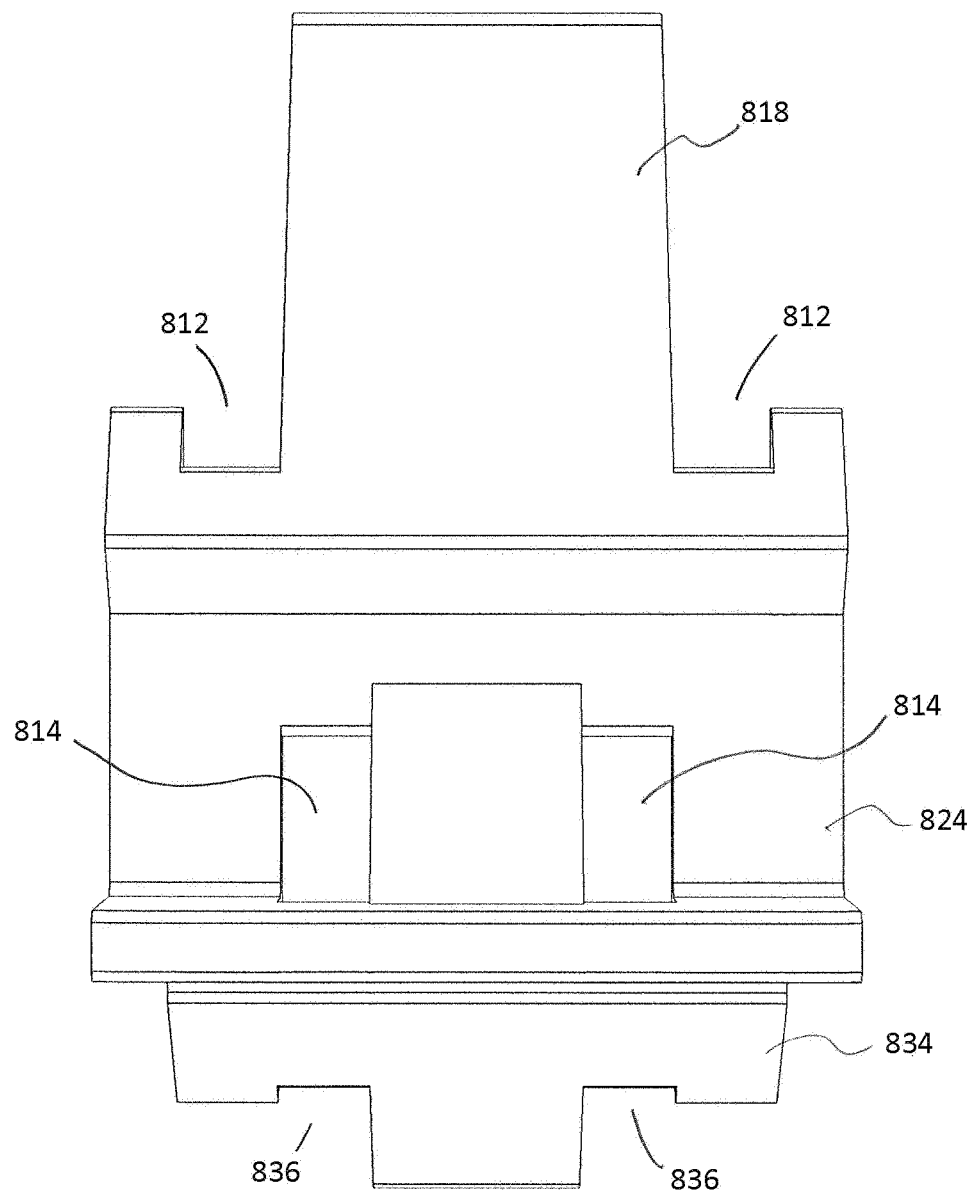
FIG. 39 is a front elevation view of the seal showing through openings of the seal that receive portions of the applicator.

The gib-receiving portion 820 may also include a mating feature 830 for engaging an inverse feature on the gib 56 and resisting lateral movement of the seal 800 relative to the gib 56. With reference to FIG. 39, the body 18 may also include a lower portion 834 with openings such as notches 836. The notches 836 may be a continuation of the clearance provided by notches 814 for the swiper arms 134.

In one form, the seal 800 may be monolithically formed as one piece of material. For example, the seal 800 may be formed from a single piece of urethane or rubber material. The upper portion 816 may be resilient to permit the upper shield portion 818 to be deflected to a position 872 (see FIG. 42) as the head 50 is pivoted in direction 102 to perform a fastener clenching operation. In another form, the upper shield portion 818 may be deflected by the head 50 when the position of the head 50 is adjusted using the height adjustment mechanism 302.

Figure 40:
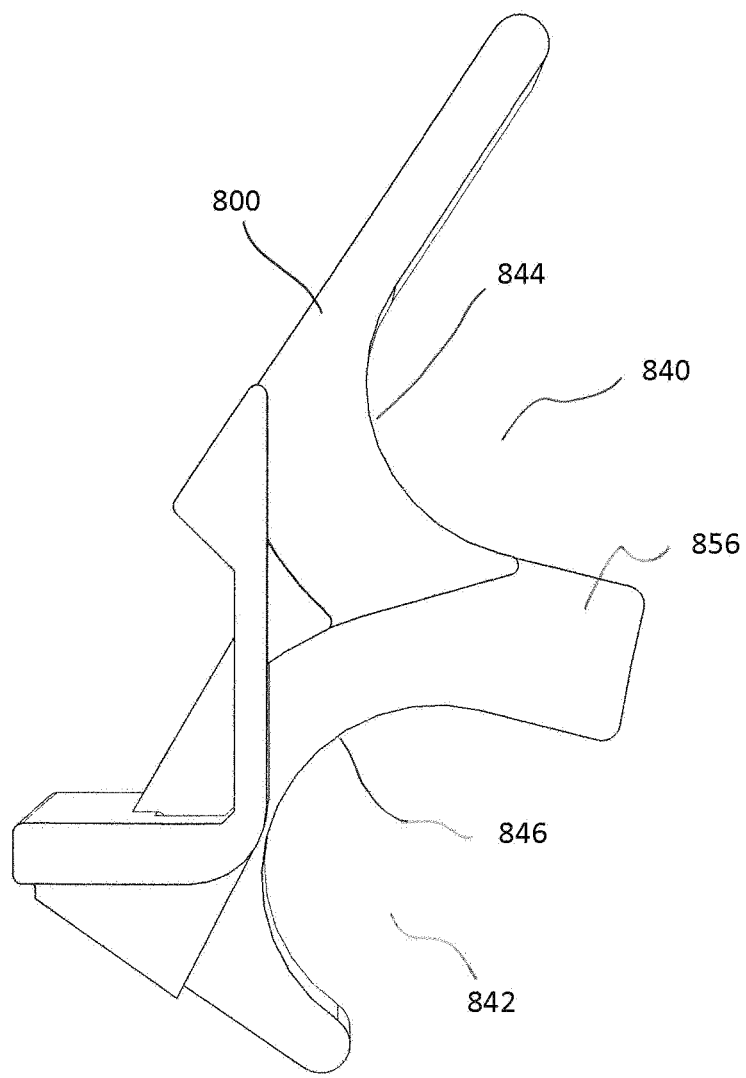
FIG. 40 is a left side elevation view of the seal of FIG. 38 showing pockets of the seal that fit onto bushings of the applicator.

With reference to FIG. 40, the seal 800 includes a pocket 840 sized to fit onto the bushing 94 and a pocket 842 sized to fit onto the bushing 140. The pockets 840, 842 include curved surfaces 844, 846 having a curvature similar to the bushings 94, 140. The material(s) of the seal 800 may be selected so that the materials of the pockets 840, 842 conforms to the bushings 94, 140.

Figure 41:
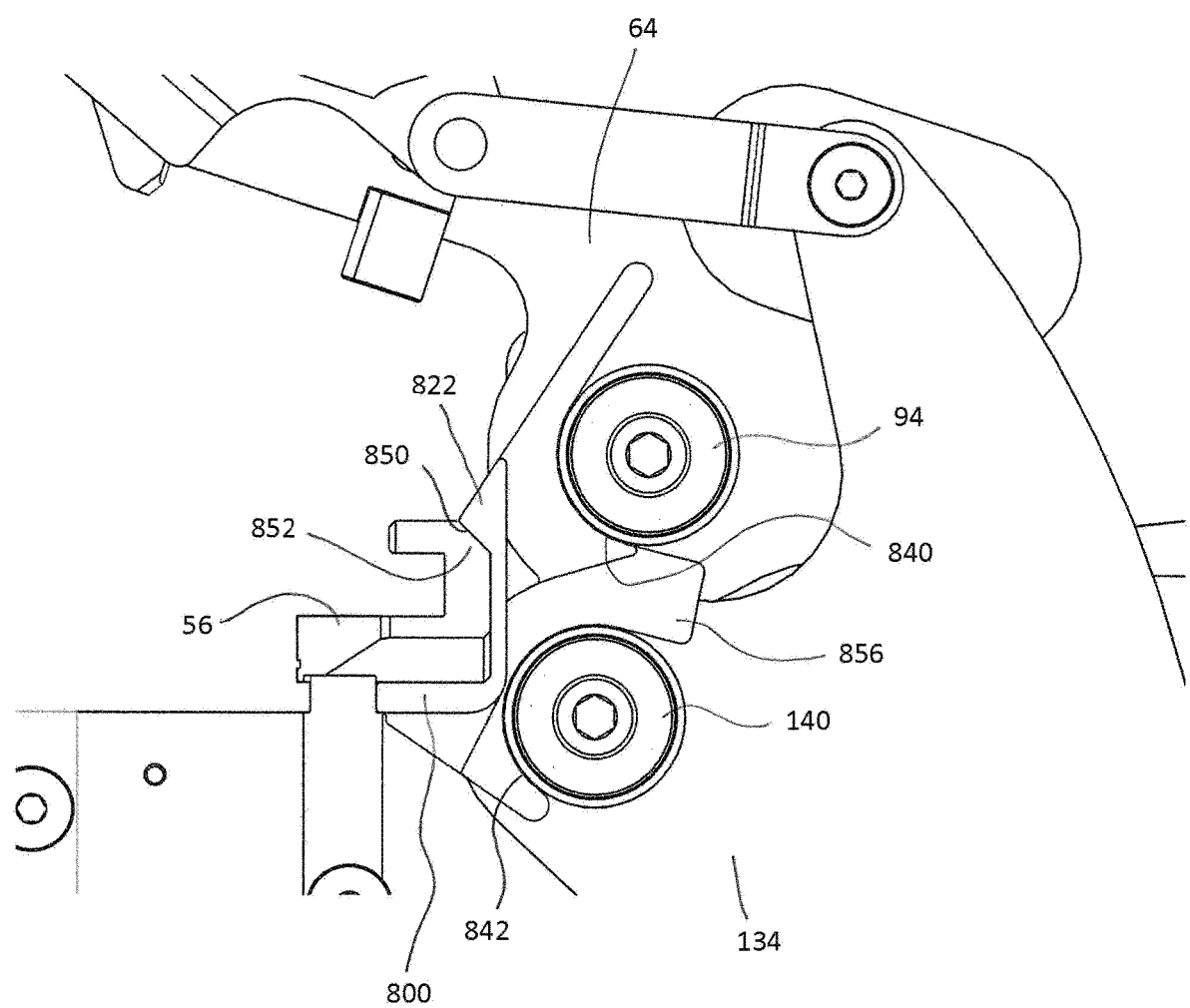
FIG. 41 is a view similar to FIG. 6 showing the seal connected to the bushings of the applicator and covering the forward opening of the applicator.

With reference to FIG. 41, the seal 800 in shown in position between the gib 56 and the bushings 94, 140 when the head 50 is at an upper position thereof. The lip 822 forms a debris resistant interface 850 with a tapered portion 852 of the gib 56. The seal 800 may also include a center support portion 856 extending into the space between the bushings 94, 140. The center support portion 856 may provide additional support to the seal 800 by resting on an upper portion of the bushing 140.

Figure 42:
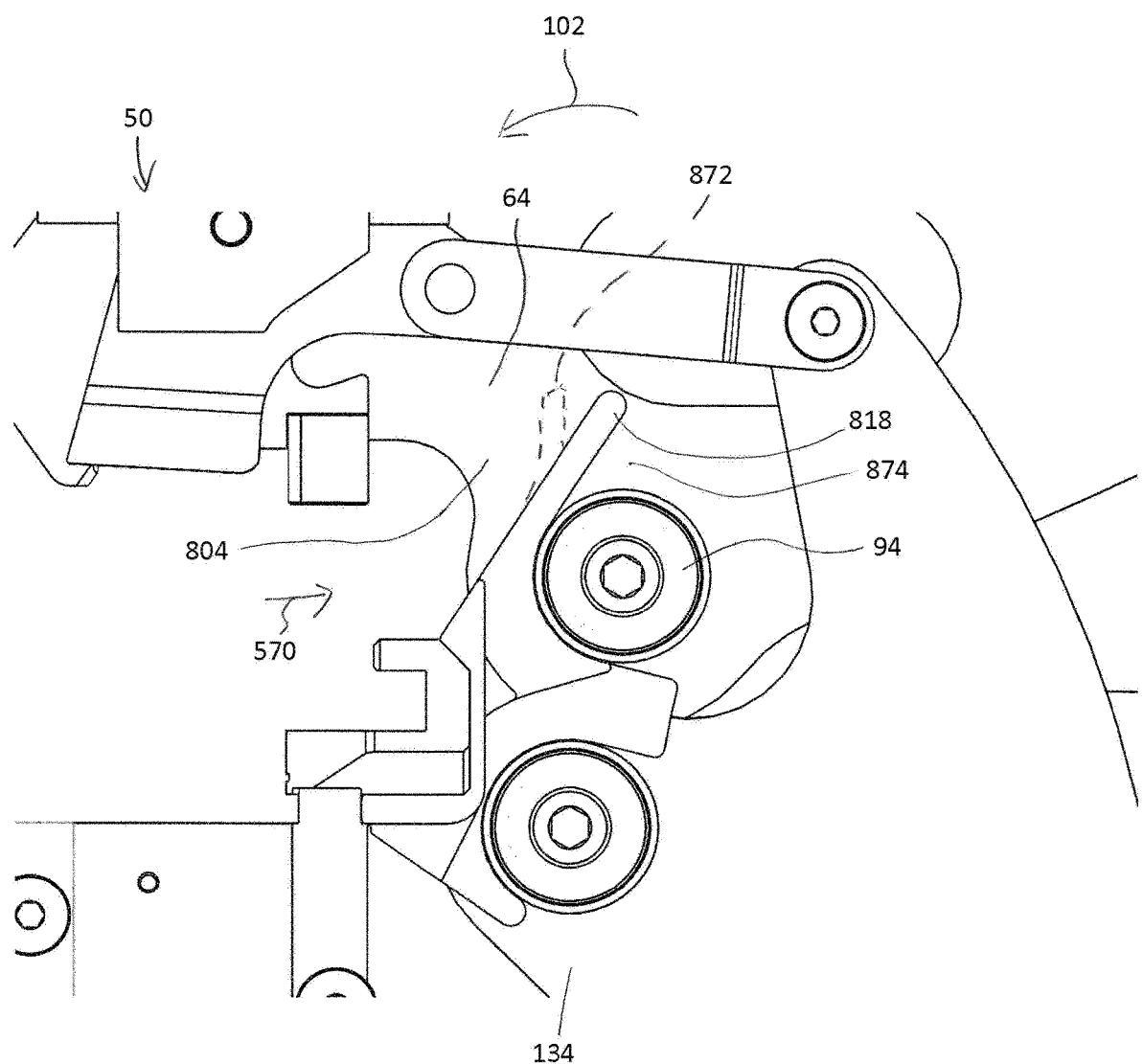
FIG. 42 is a view similar to FIG. 41 showing the head of the applicator pivoted downward, the seal continuing to cover the opening of the applicator, and a deflected portion of the seal in dash resulting from contact with a portion of the head.

With reference to FIG. 42, the head 50 is shown pivoted in direction 102 to a lower position such as during a fastener clenching operation. As shown, the head arms 64 pivot in direction 102 on either side of the upper shield portion 818. However, the upper shield portion 818 continues to extend between the head arms 64 and resists ingress of debris generally in direction 570 into the opening 804 whether the head 50 is in the upper or lower position thereof. In some approaches, pivoting of the head 50 in direction 102 to the lower position thereof or adjusting the height of the head 50 may cause the upper shield portion 818 to contact a component of the applicator 18 and be deflected to the position 872. However, the upper shield portion 818 may be made of resilient material so that the upper shield portion 818 returns to the un-deflected position 874 upon pivoting of the head 50 in direction 104 or re-adjusting the height of the head 50.

Figure 43:
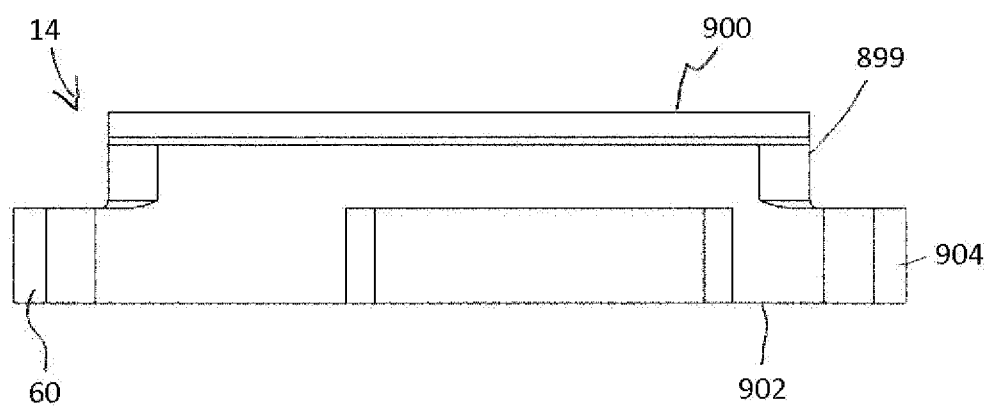
FIG. 43 is a left side elevation view of an end of the fastener bed of FIG. 1B showing a generally inverted T-shape configuration including an enlarged lower portion of the fastener bed.

With reference to FIG. 43, the bed 14 has a generally upside-down, T-shaped profile. The bed 14 includes a narrowed portion 899 with an upper surface 900 and an enlarged base 904 with a lower surface 902.

Figure 44:
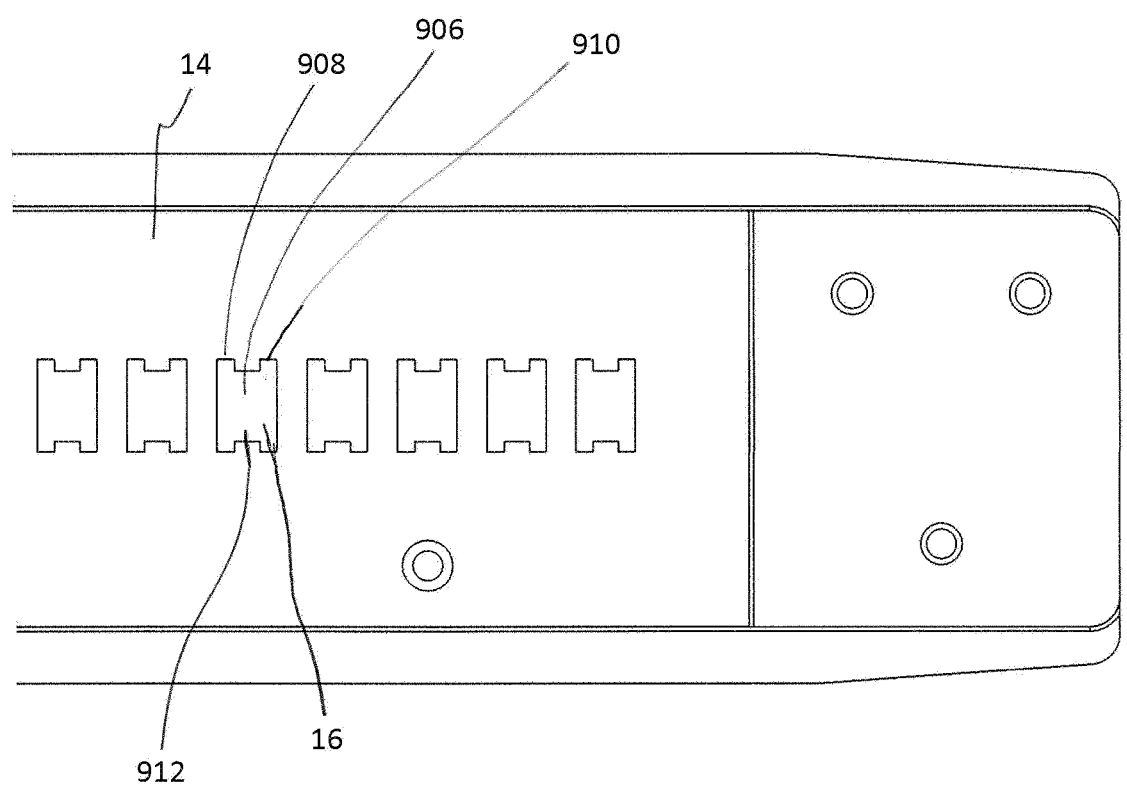
FIG. 44 is a top plan view of the fastener bed of FIG. 43 showing generally H-shaped fastener staple-receiving holes of the fastener bed.

With reference to FIG. 44, the holes 16 extend through the bed 14 and have a through hole or an upper portion 906, which may have a generally H-shape, and permits the staples 412 to extend therethrough. The upper portion 906 includes enlarged sides 908, 910 and a narrowed center 912. The enlarged sides 908, 910 each receive one of the staples 412 of the fastener 12.

Figure 45:
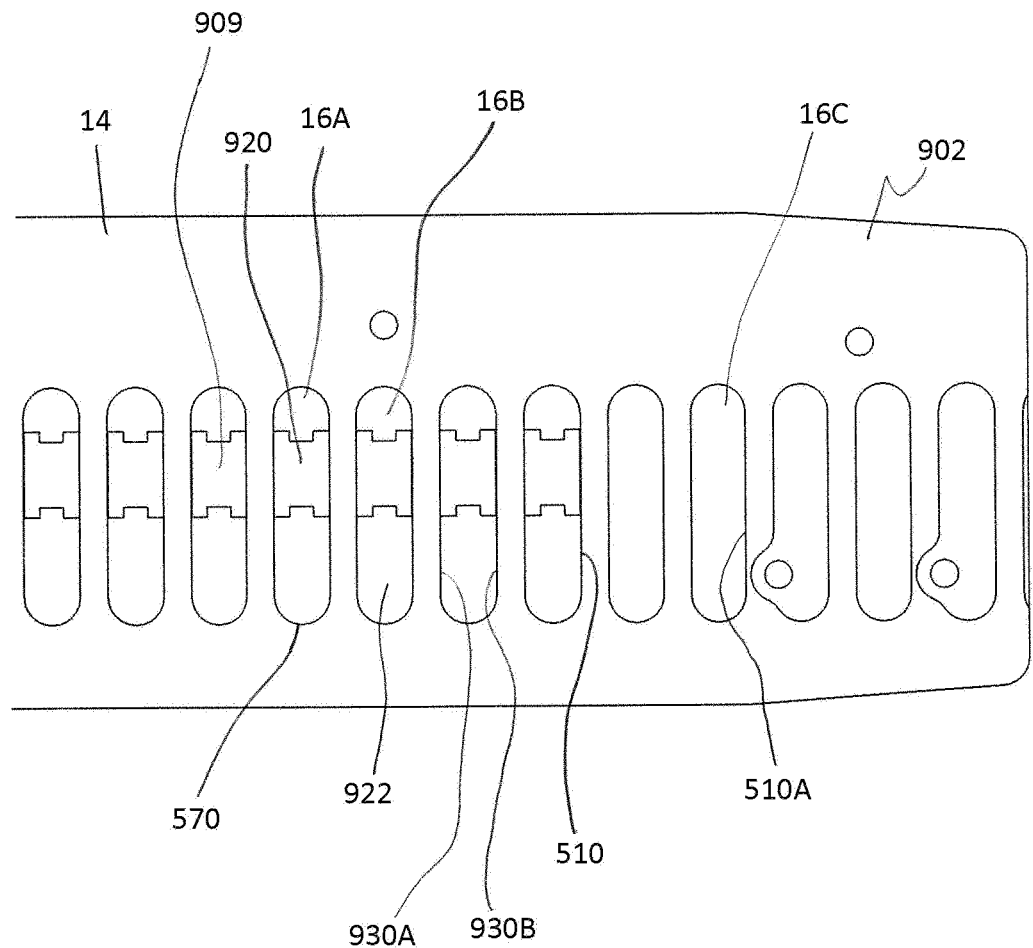
FIG. 45 is a bottom plan view of the fastener bed showing enlarged lower portions of the holes.

Turning to FIG. 45, the holes 16 also include the enlarged lower portion 570 extending upward from the lower surface 902 and entirely overlapping and extending longitudinally (with reference to the fastener lower plate 416) beyond the H-shaped hole upper portion 906. The enlarged lower portion 570 may be countersunk so that it is recessed from the lower surface 902 and extends longitudinally away from either end of the H-shaped upper portion 906.

The pusher 124 travels through an area 920 of hole 16A while the pilot finger 172 is received in an area 922 of another hole, hole 16B. Additionally, the edge 507 of the advancing finger 504 will be contacting a corner 510A of the hole 16C when the pusher 124 is extending through the area 920 of the hole 16A and driving the staples 412 into the conveyor belt end 13. As shown in FIG. 45, the fastener bed 14 may include blind holes such as the hole 16A to provide corners 510 for the advancing finger 504 to engage when the applicator 18 is securing fasteners 12 to the conveyor belt end 13 near the side 19 thereof.

Figure 46:
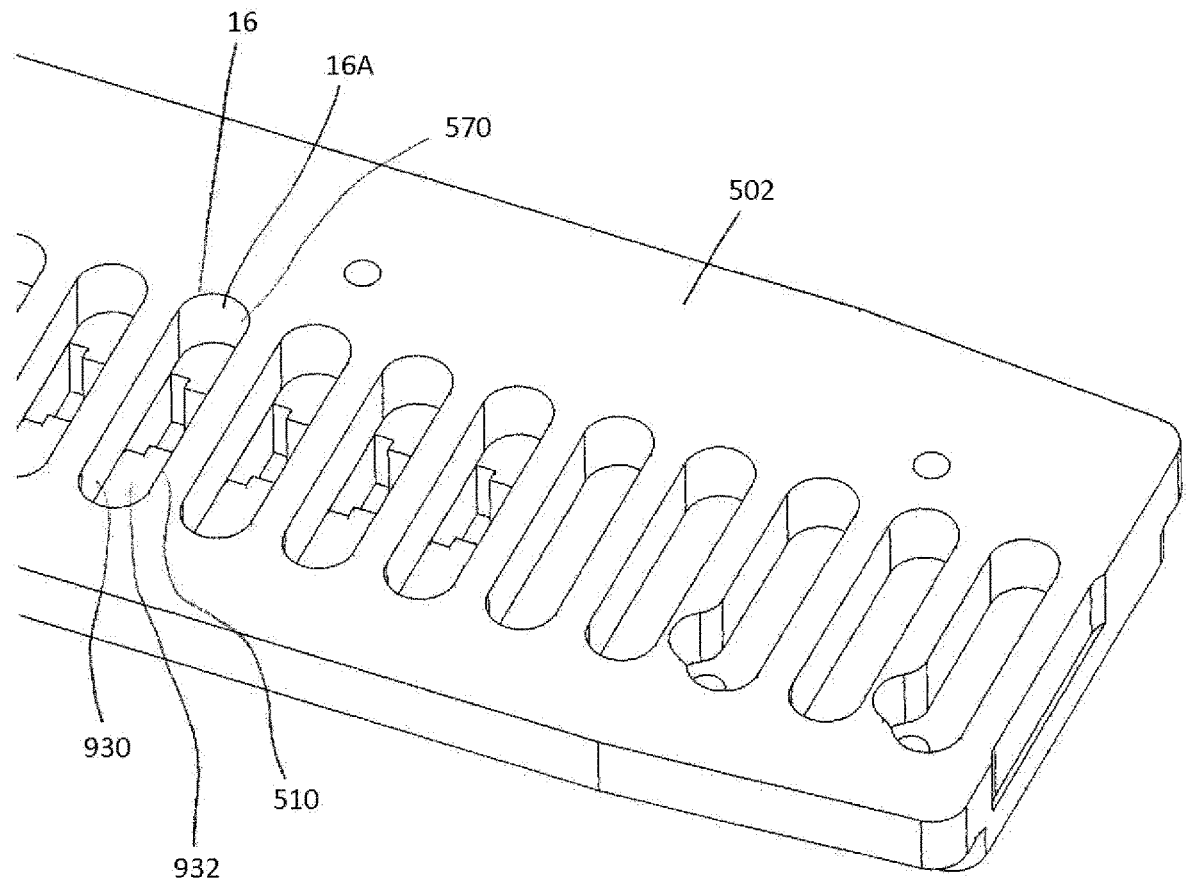
FIG. 46 is a bottom, perspective view of the fastener bed showing obround side walls of the lower portion of the fastener holes.

With reference to FIG. 46, each hole 16 includes the side wall 930 extending about the enlarged lower portion 570. The corner 510 connects the lower surface 902 and the side wall 930. In some forms, the advancing finger 504 may contact the side wall 930 rather than the corner 510 to advance the applicator 18 along the anvil 12. The holes 16 may also have a transition wall extending up from the side walls 930 to the H-shaped upper portion 906 of the hole 16.

In one form, various components of the applicator 18 may be made from various metallic materials, such as the cam plate 72 being made of steel. The head arms 64, pusher arms 110, and swiper arms 134 may be made of steel and joined to the cam plate 72 via a yoke type needle bearing steel cam follower.

Figure 47:
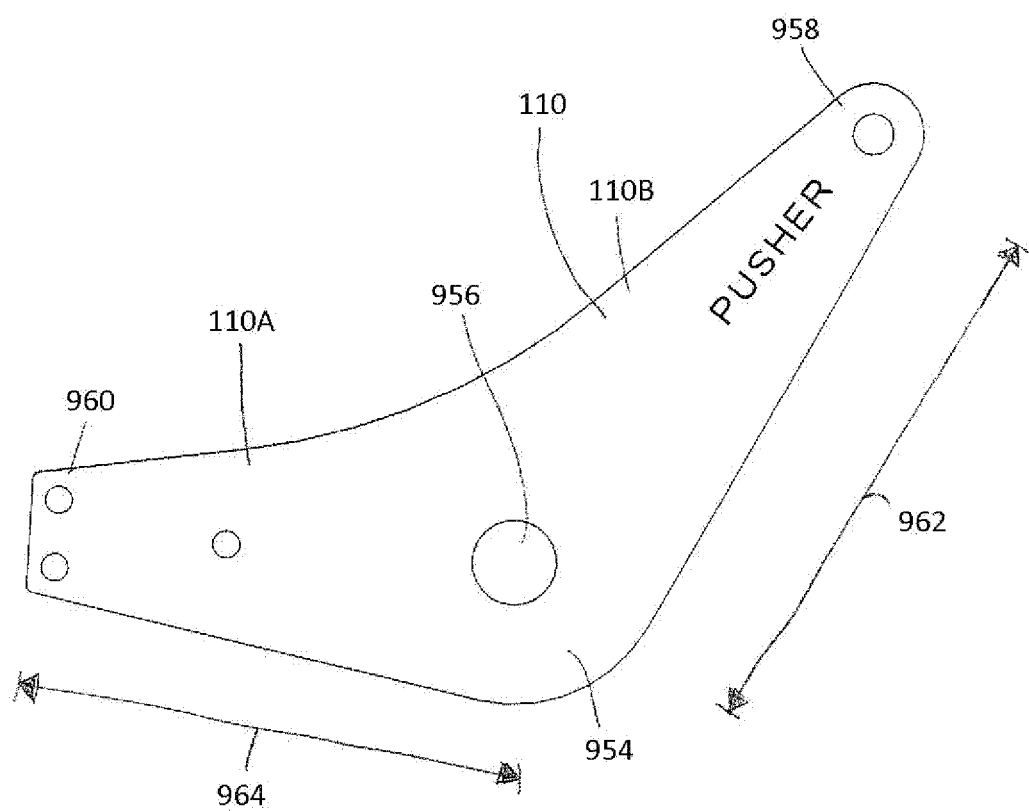
FIG. 47 is a side elevation view of one of the pusher arms of the applicator of FIG. 3.
Figure 48:
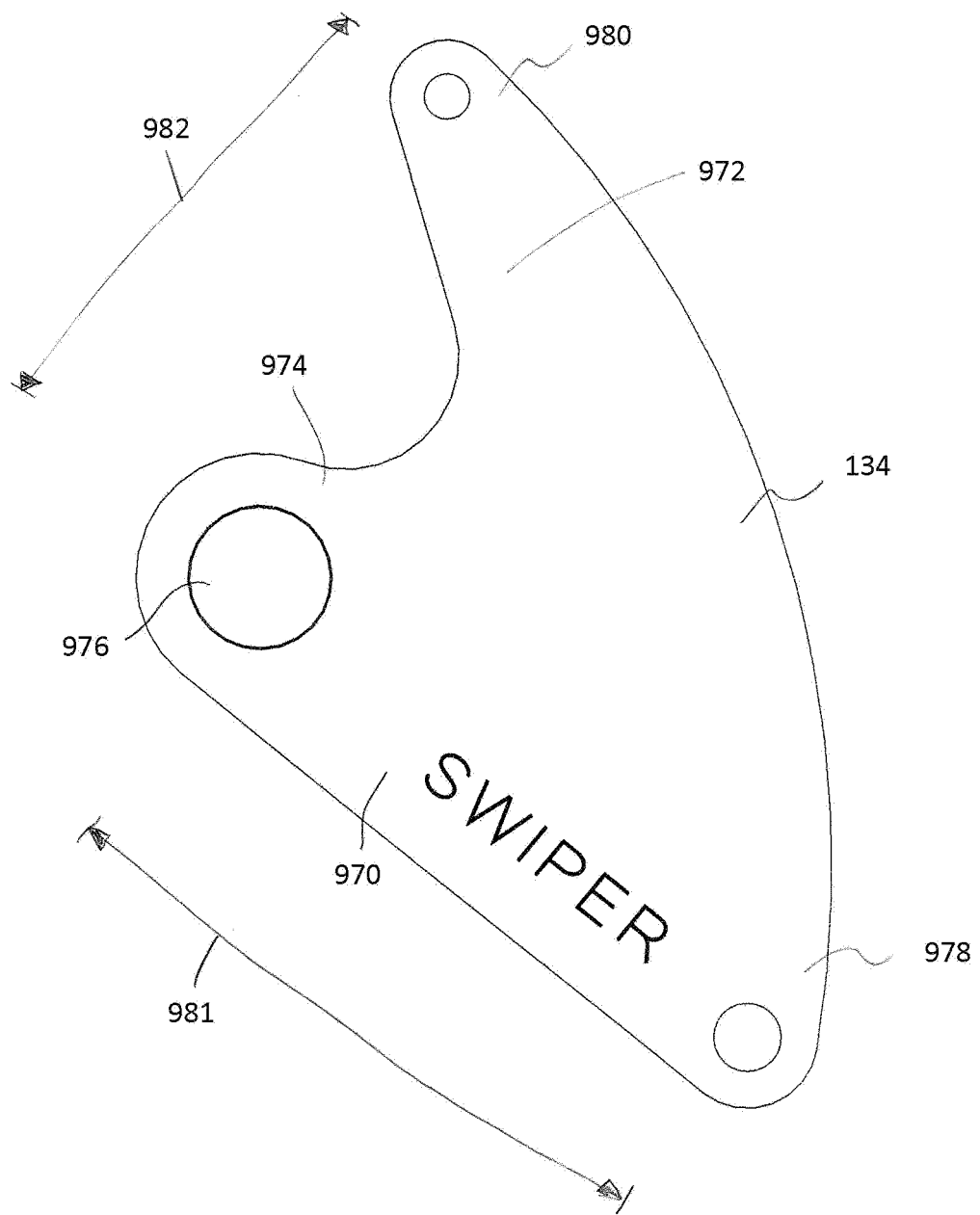
FIG. 48 is a side elevation view of one of the swiper arms of the applicator of FIG. 3.
Figure 49:
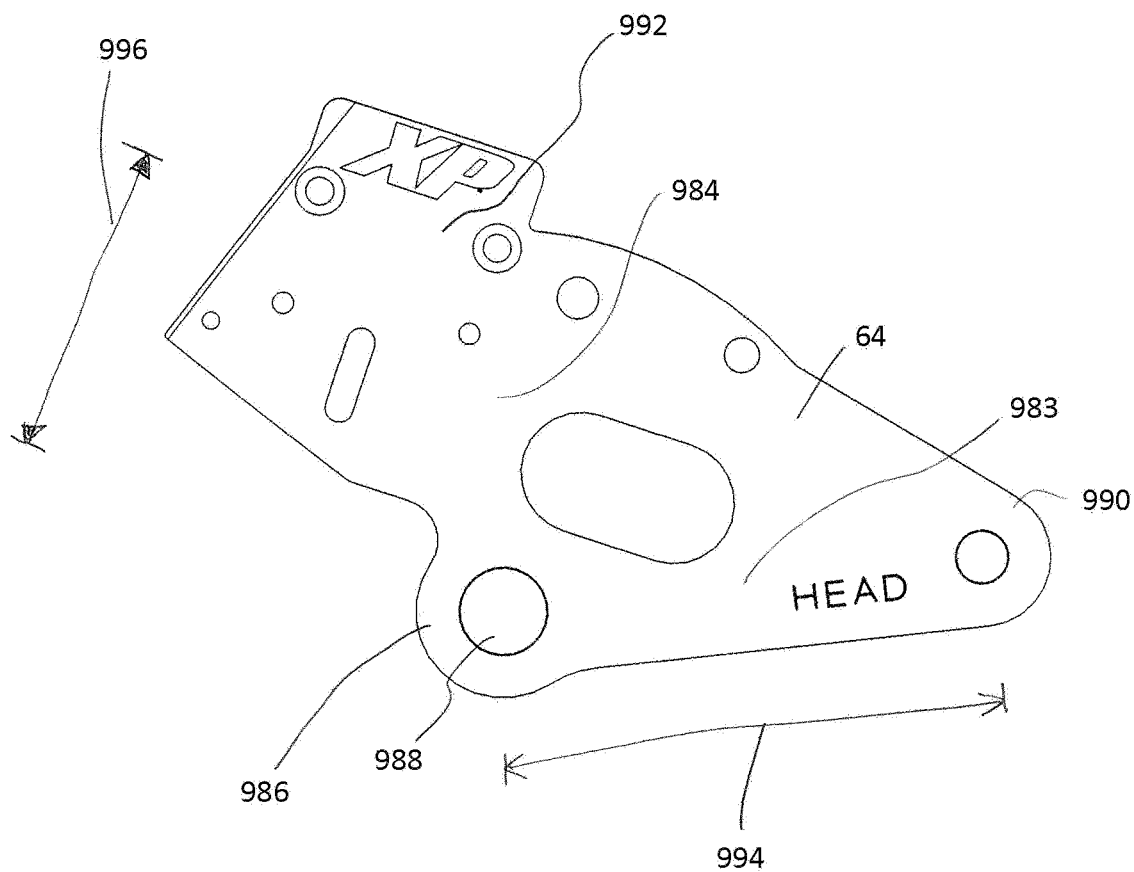
FIG. 49 is a side elevation view of one of the head arms of the applicator of FIG. 3.

With reference to FIGS. 47, 48, and 49, the pusher arm 110, swiper arm 134, and head arm 64 may have a bellcrank configuration which transfers radial movement of the followers 90, 116, 142 into non-radial movement of the head 50, swipers 130, 132, and pusher 124. For example, each pusher arm 110 may have the arm portions 110A, 110B thereof extending transversely to each other and joined together a pivot portion 954 with an opening 956 sized to receive the bushing 112. The arm portions 950, 952 have end portions 958, 960 for being connected to the pusher cam follower 116 and the pusher ball 612 and lengths 962, 964. The lengths 962, 964 may be selected to apply a mechanical advantage if desired.

As shown in FIG. 48, each swiper arm 134 has a pair of arm portions 970, 972 extending transversely to each other and joined together at a pivot portion 974 with an opening 976 sized to receive the bushing 140. The arm portions 970, 972 have end portions 978, 980 for being connected to the swiper cam follower 142 and one of the links 374. The arm portions 970, 972 may also define lengths 981, 982. The lengths 981, 982 may be selected to provide a mechanical advantage if desired.

As shown in FIG. 49, each head arm 64 have a pair of arm portions 983, 984 extending transversely to each other and joined together at a pivot portion 986 with an opening 988 sized to receive the bushing 94. The arm portions 983, 984 have end portions 990, 992 for being connected to the head cam follower 90 and the head 50. The arm portions 983, 984 may define lengths 994, 996. In one form, the length 994 is longer than the length 996. This difference in lengths 994, 996 provides a mechanical advantage such that the head 50 may be clenched against the fastener upper plate 414 with a force greater than the force applied to the head cam follower 90 by the cam plate 72.

Figure 50:
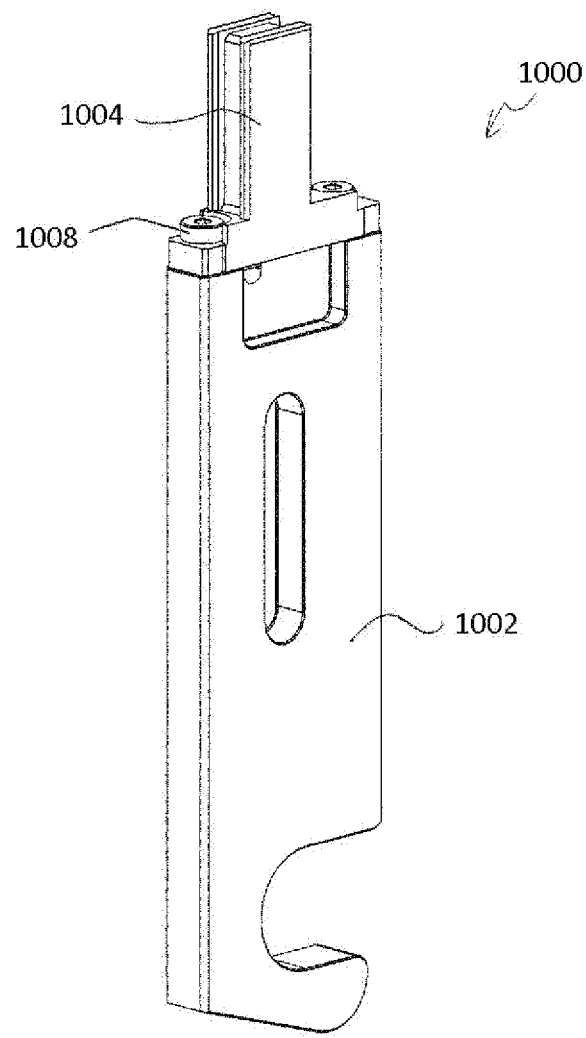
FIG. 50 is a perspective view of an alternative embodiment of the pusher showing a two-piece construction of the pusher.

With reference to FIG. 50, an alternative embodiment of a pusher 1000 is provided. The pusher 1000 includes a body 1002 a driving portion 1004 releasably secured to the body 1002 such as by fasteners 1008. The body 1002 and the driving portion 1004 may be of different materials that permits the material properties thereof to be optimized. For example, the driving portion 1004 may be made of tungsten carbide, the body 1002 may be made of steel and the fasteners 1008 may be bolts. Another advantage of the pusher 100 is that the fasteners 1008 may be released and the driving portion 1004 replaced without having to remove the frame plates 62.

Figure 51:
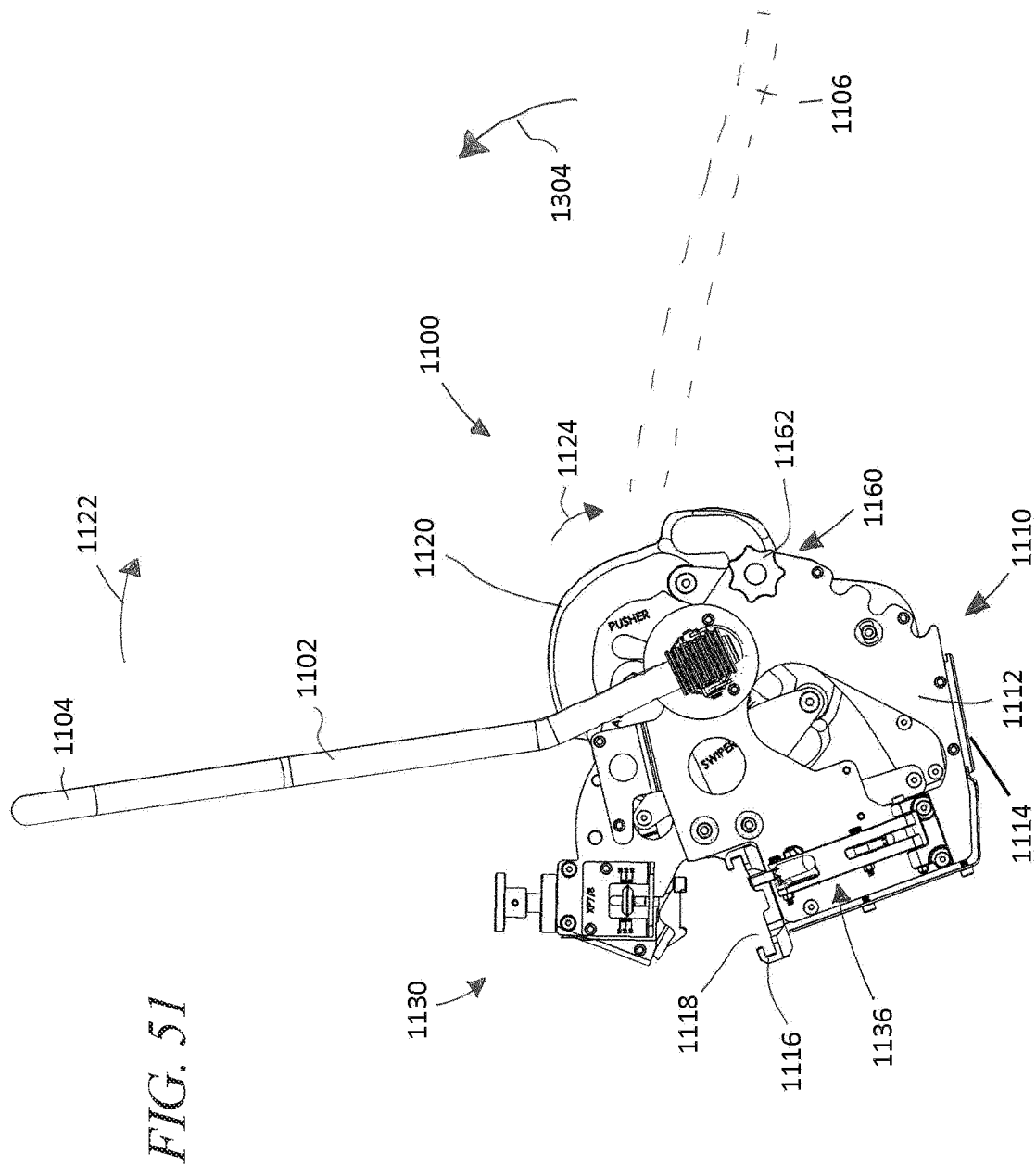
FIG. 51 is a left side elevational view of another applicator showing a handle of the applicator in an upper, start position and dashed lines showing a lower, end position of the handle.
Figure 52:
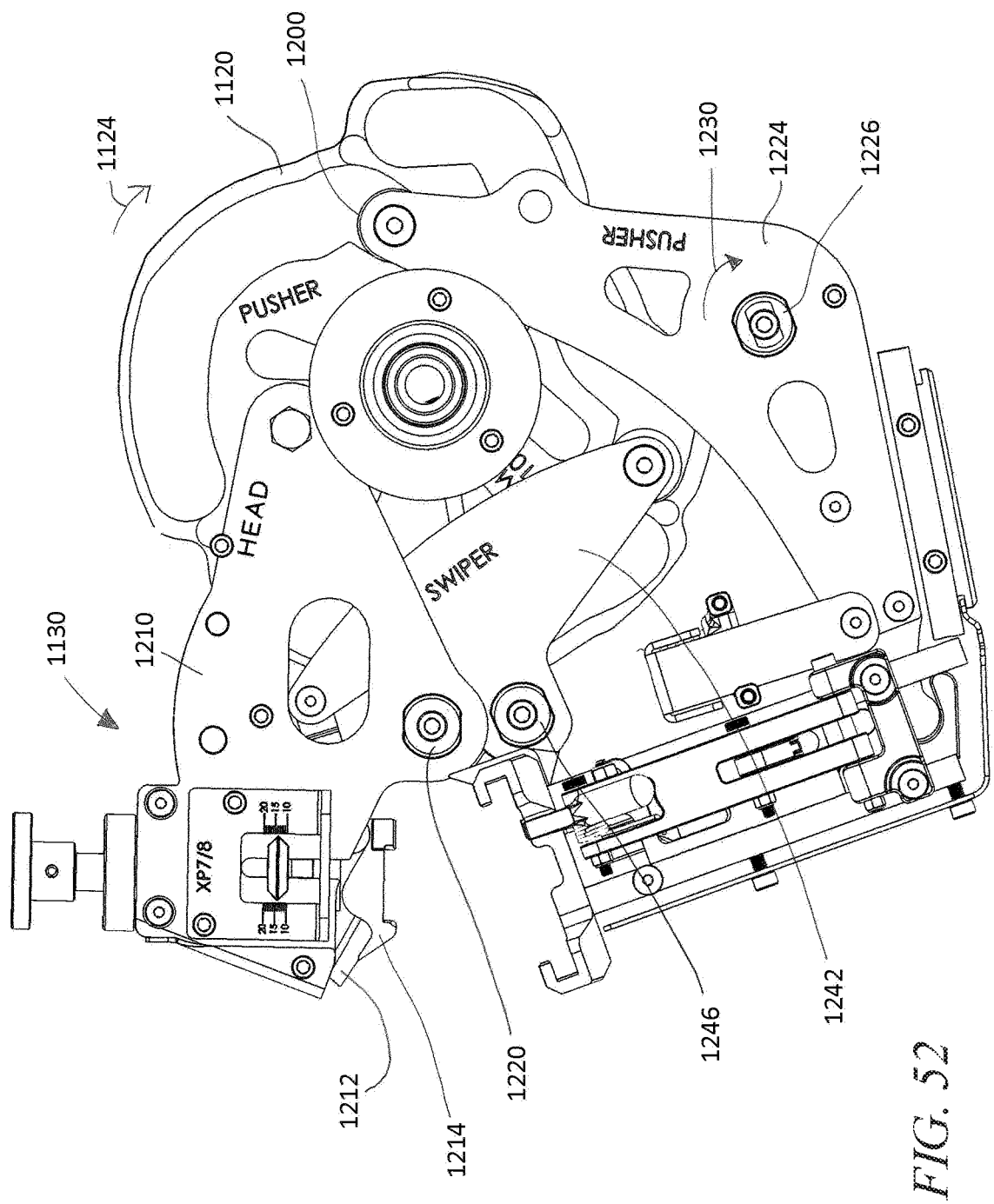
FIG. 52 is a view similar to FIG. 51 showing side plates of the applicator removed to show internal components of the applicator including a cam plate of the applicator in a start position.
Figure 53:
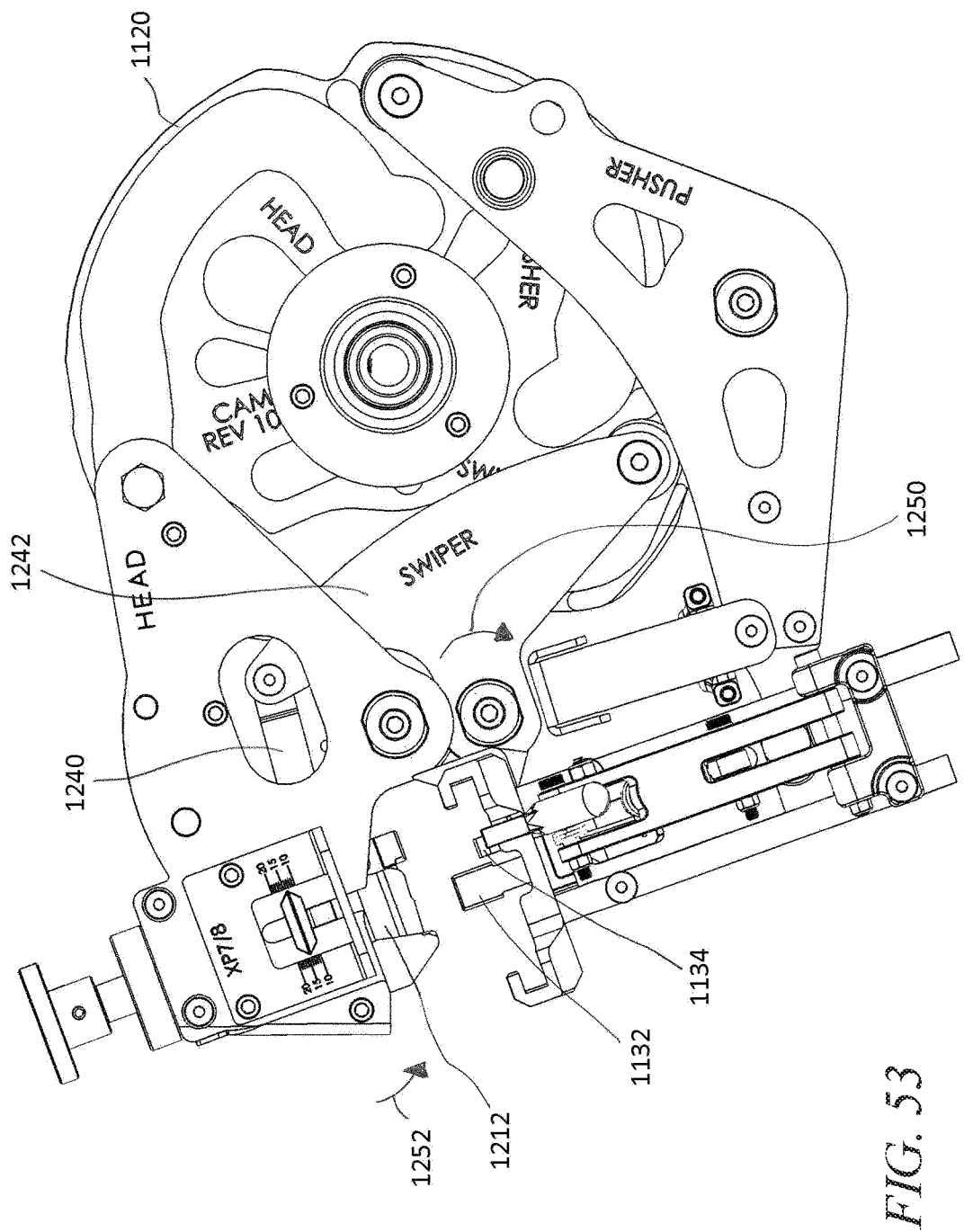
FIG. 53 is a view similar to FIG. 52 showing the cam plate of the applicator turned to an end position which has driven a head, a swiper, and a pusher of the applicator.

With reference to FIGS. 51-53, an applicator 1100 is provided that is similar in many respects to the applicator 18 discussed above such that differences between the two will be highlighted. The applicator 1100 is shown in FIG. 51 with its housing removed to show the components of the applicator 1100. The applicator 1100 includes a handle 1102 that is pivotal from an upper, start position 1104 to a lower, end position 1106. Pivoting the handle 1102 from the start to the end positions 1104, 1106 causes the applicator 1100 to advance along a fastener bed and secure a fastener to a conveyor belt. The applicator 1100 includes a body 1110 including side plates 1112, a foot 1114, and a gib 1116. The gib 1116 has a recess 1118 that receives a fastener bed, such as the fastener bed 14 discussed above. The gib 1116 forms a mating engagement with the fastener bed 14 such that the weight of the applicator 1110 is supported entirely by the fastener bed 14 while permitting the applicator 1100 to slide along the fastener bed 14.

Figure 55:
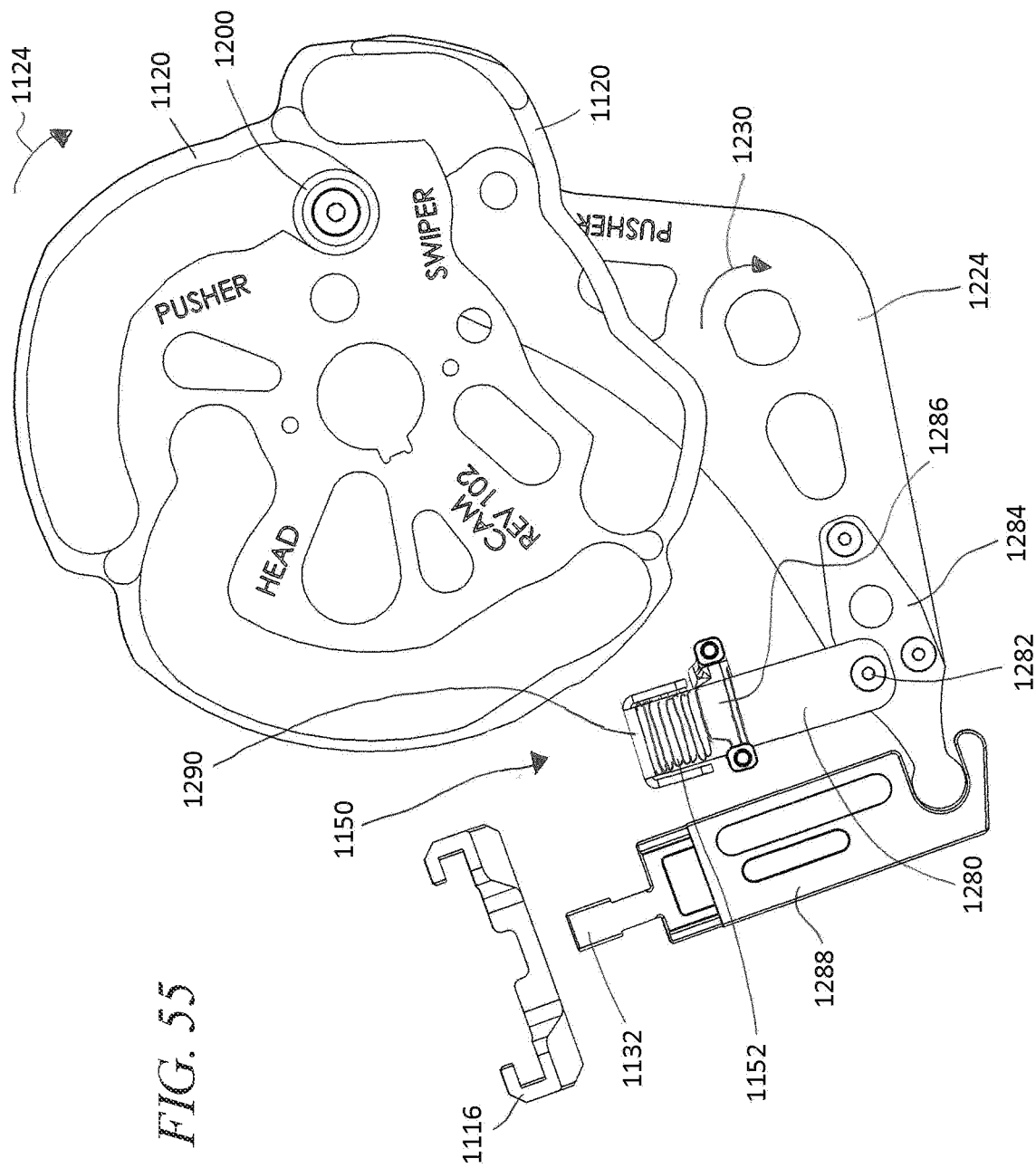
FIG. 55 is a side elevational view of the cam plate, the pusher, a pusher arm, and a resilient drive assist of the applicator of FIG. 51.
Figure 56:
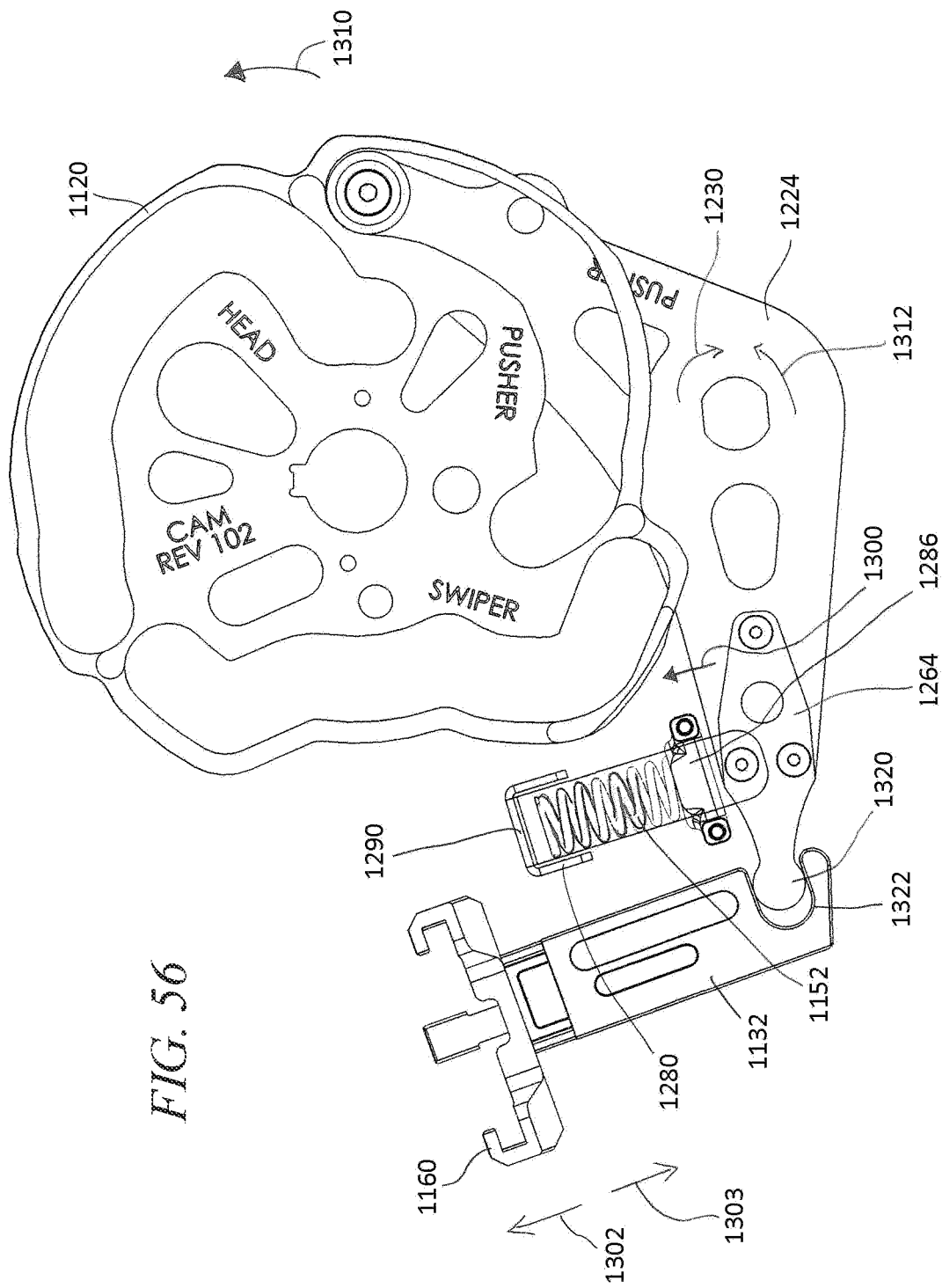
FIG. 56 is a view similar to FIG. 55 showing the cam plate turned to the end position and a spring of the resilient drive assist having been unloaded which helps pivot the pusher arm.

The applicator 1100 includes a cam plate 1120 connected to the handle 1102 so that pivoting of the handle 1102 in direction 1122 causes turning of the cam plate 1120 in a drive direction 1124. The applicator 1100 includes a head 1130, a pusher 1132, a pilot 1134, and an advancing assembly 1136 that are operated by pivoting of the handle 1102 in direction 1122. With reference to FIGS. 55 and 56, the applicator 1100 includes a resilient drive assist 1150 that includes a biasing member, such as a spring 1152, which is loaded or compressed when the user pivots the handle in direction 1304 from the end position 1106 to the start position 1104 (see FIG. 51). The spring 1152 is unloaded or decompressed and provides force to assist movement of the pusher 1132 when the user pivots the handle in direction 1122 from the start position 1104 to the end position 1106. In this manner, the spring 1152 absorbs energy during a return mode of operation of the handle 1102 and releases stored energy at an operating mode of operation of the handle 1102. The unloading of the spring 1152 is timed to occur at the beginning of the operating mode of the handle 1152 to provide force to the pusher 1132 to overcome friction or other resistance to movement thereof.

Figure 54:
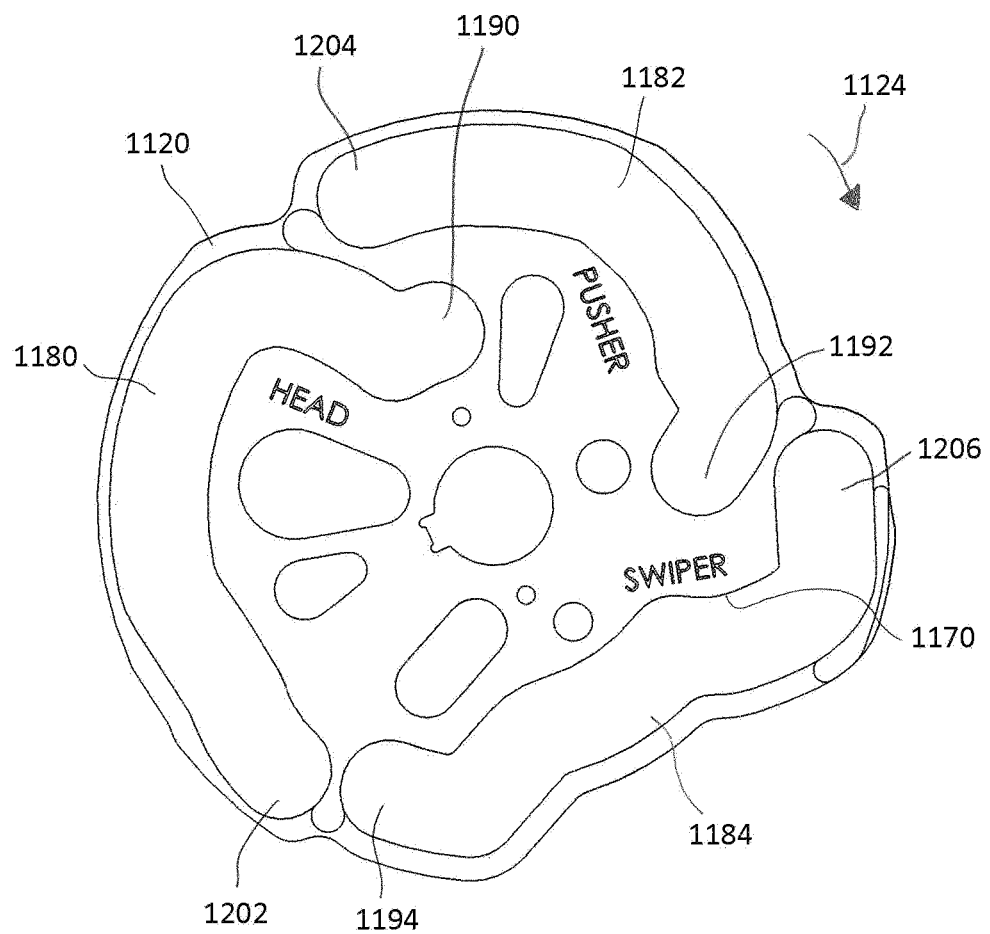
FIG. 54 is an elevational view of the cam plate of the applicator of FIG. 51 showing cam paths that control the operation of the applicator.

With reference to FIGS. 51 and 54, the applicator 1100 includes a lock 1160 having a handle 1162 and a dowel that extends through an opening in one of the side plates 1112 and through a swiper cam path 1184 of the cam plate 1120. The lock dowel contacts a wall 1170 of the cam plate 1120 and resists turning of the cam plate 1120 in direction 1124. In another form, the dowel of the lock 1160 may engage an opening of the cam plate 1120 that is separate from the cam path 1184.

To use the applicator 1100, a user pulls the handle 1162 out of the page (when viewed in FIG. 51) to withdraw the dowel from the opening 1166 of the cam plate 1120 and shift the dowel to a retracted position thereof. The user turns the handle 1162 and a catch of the lock 1160 keeps the dowel in the retracted position. With the dowel in the retracted position, the user can then turn the handle 1102 and cause turning of the cam plate 1120. To engage the lock 1160, the user turns the handle 1162 to disengage the catch and the spring of the lock 1160 shifts the dowel into a locked position wherein the dowel extends through the cam path 1184 of the cam plate 1120.

With reference to FIGS. 52 and 53, the cam plate 1120 includes a head cam path 1180, a pusher cam path 1182, and the swiper cam path 1184. The cam paths 1180, 1182, 1184 have respective starting ends 1190, 1192, 1194 where cam followers 1200 are positioned when the handle 1102 is in the start position 1104 and the cam plate 1120 is in the initial position thereof. Pivoting of the handle 1102 in direction 1112 turns the cam plate 1120 in direction 1124 and the cam followers 1200 travel along the cam paths 1180, 1182, 1184 until they reach finish ends 1202, 1204, 1206 of the cam paths 1180, 1182, 1184. In one form, the cam paths 1180, 1182, 1184 of the cam plate 1120 have the form of through openings that are elongated about the cam plate 1120 and are close-ended. In another form, the cam paths 1180, 1182, 1184 are recesses in a plate rather than being through openings. In yet another form, the cam paths may be portions of a continuous surface(s).

With reference to FIG. 52, the head 1130 includes head arms 1210, swipers 1212, and anvils 1214. The head arms 1210 are pivotally connected to the side plates 1112 by bushing 1220 and are connected to the cam plate 1120 by an associated cam follower 1200.

The pusher 1132 is connected to the cam plate 1120 by a pusher arm 1224. The pusher arm 1224 is pivotally connected to the side plates 1112 by a bushing 1226. As shown in FIGS. 52 and 53, turning of the cam plate 1120 in direction 1124 causes pivoting of the pusher arm 1224 in direction 1230 and drives the pusher 1132 upward. The pusher arm 1242 is connected to the cam plate 1120 by a cam follower 1200 engaged with the pusher cam path 1182. The swipers 1212 are connected to the cam plate 1120 by a link member 1240 and swiper arms 1242. The swiper arms 1242 are pivotally connected to the side plates 1112 by a bushing 1246. As shown in FIGS. 52 and 53, turning of the cam plate 1120 in direction 1124 pivots the swiper arm in direction 1250 which pivots the swipers 1212 in direction 1252 to swipe end portions of the staple legs of a fastener.

Figure 58:
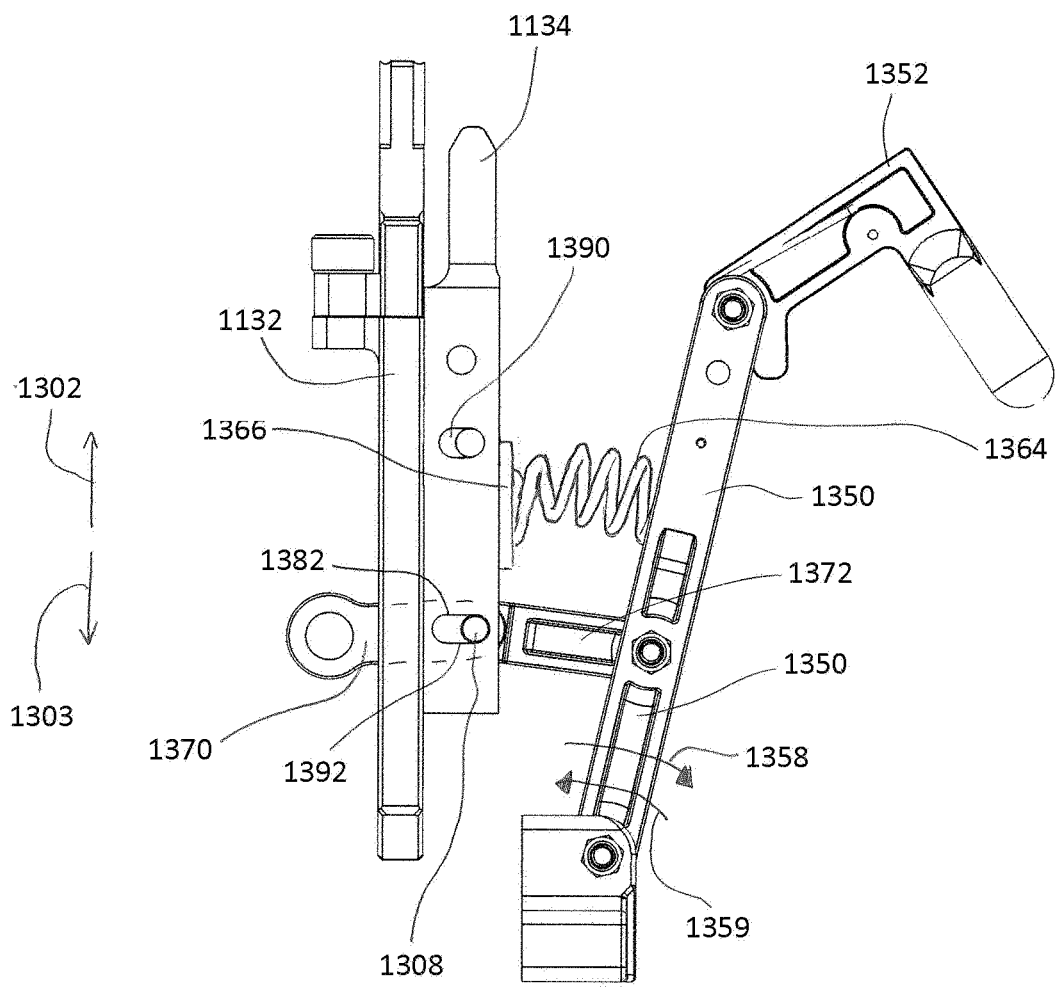
FIG. 58 is a view similar to FIG. 57 showing the pusher, the pilot, and the advancing assembly when the handle has been pivoted to the end position.

With reference to FIGS. 55 and 56, the resilient drive assist 1150 includes a spring cage 1280 that is pivotally connected 1282 to a pusher plate 1284 of the pusher arm 1224. The resilient drive assist 1150 includes a seat 1286 having supports 1288 that are secured to the side plates 1112. The spring cage 1280 includes a seat 1290 that compresses the spring 1152 against the seat 1286 when the cam plate 1120 is in the initial position thereof and the handle 1102 is in the start position 1104, as shown in FIG. 58. When the user pivots the handle 1102 from the start position 1104 toward the end position 1106, the cam plate 1120 turns in the drive direction 1124, the pusher arm 1124 pivots in direction 1230, and the spring 1152 unloads and expands which applies a force in direction 1300 on the pusher plate 1284 and urges pivoting of the pusher arm 1224 in direction 1230. The spring 1152 unloads at the beginning of the downward path of the handle 1102 and the initial turning of the cam plate 1122 to rapidly urge the pusher 1132 upward in direction 1302. The release of the energy stored in the compressed spring 1152 (see FIG. 55) assists the user in advancing the pusher 1152. As discussed in greater detail below, the pusher 1132 drives the advancing assembly 1136. The released energy from the compressed spring 1152 is applied to the pusher arm 1224 in addition to the force from the user pulling on the handle 1102. This additional force assists in moving the pusher 1132 quickly with a large amount of force to advance the applicator 1100 along a fastener bed.

After the user has secured the fastener to the conveyor belt, the user pivots the handle 1102 in direction 1304 (see FIG. 51) from the end position 1106 toward the start position 1104. This causes the cam plate 1120 to turn in return direction 1310. The turning of the cam plate 1120 in return direction 1310 causes the pusher arm to pivot in direction 1312 which pulls the seat 1290 of the spring cage 1280 toward the seat 1286 thereby compressing the spring 1152. During the return of the handle 1102 in direction 1304, the resistance of the components of the applicator 1100 to the pivoting of the hand 1102 is reduced because the components are not securing a fastener to a conveyor belt. The handle 1102 is therefore generally easier to pivot from the end position 1106 to the start position 1104 than vice versa due to the reduced resistance the components of the applicator 1100 encounter. The spring 1152 is compressed by the movement of the pusher arm 1224 during this easier return stroke of the handle 1102 in direction 1304. By using the easier return stroke of the handle 1102 in direction 1304 to load the spring 1152, the user barely notices the work involved in loading the spring 1152.

Once the handle 1102 has reached the start position 1104, the energy stored in the compressed spring 1152 is ready for use. The user can pull the handle 1102 in direction 1122 to advance the applicator 1100 along the fastener bed and secure the next fastener to the conveyor belt. The power assist assembly 1150 releases the stored energy in the spring 1152 at the beginning of the downstroke of the handle 1102 in direction 1122. Releasing the stored energy of the spring 1152 at the beginning of the downstroke may be advantageous to overcome inertia and frictional resistance of the applicator 1100.

With reference to FIG. 56, the pusher arm 1224 includes a pusher ball 1320 that is received in a socket 1322 of the pusher 1132. The connection between the ball 1320 and socket 1322 causes shifting of the pusher 1132 in directions 1302, 1303 when the pusher arm 1224 pivots in directions 1230, 1312 in response to turning of the cam plate 1120.

Figure 57:
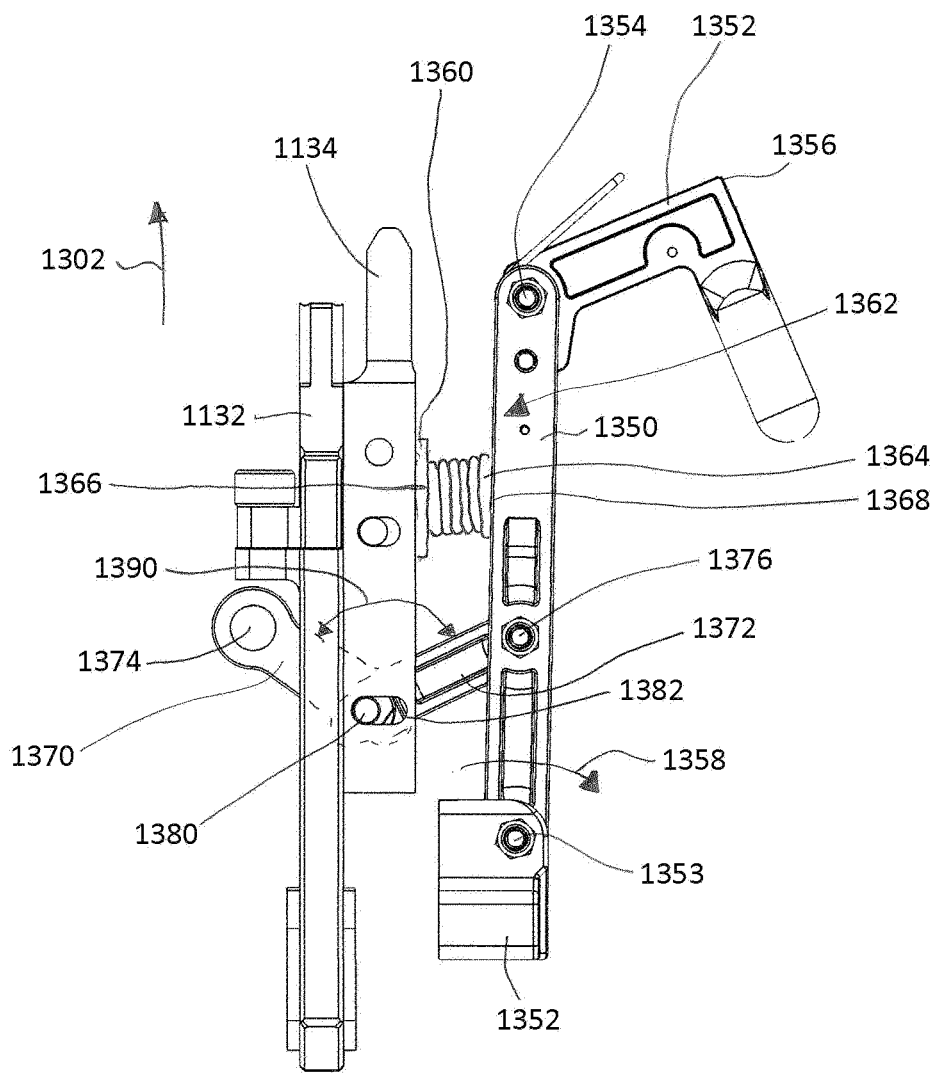
FIG. 57 is an elevational view of the pusher, a pilot, and an advancing assembly of the applicator of FIG. 51 when the handle is in the start position.

Turning to FIG. 57, the advancing assembly 1136 includes an advancing arm 1350 connected to a mount 1352 of the body 1110 at a pivot connection 1353 and an advancing finger 1352 connected to the advancing arm 1350 at a pivot connection 1354. The advancing finger 1352 has a portion 1356 that engages the fastener bed and shifts the applicator 1100 along the fastener bed in response to the advancing arm 1350 pivoting in direction 1358. One of the side plates 1112 includes a portion 1360 and the advancing assembly 1136 and the resilient drive assist 1150 includes a resilient drive assist assembly 1362 having a spring 1364. The spring 1364 is held between a seating surface 1366 of the side plate portion 1360 and a seating surface 1368 of the advancing arm 1350. The ends of the spring 1364 are secured to the side plate portion 1360 and the advancing arm 1350.

The advancing assembly 1136 also includes one or more link members, such as a pair of link members 1370, 1372, for causing pivoting of the advancing arm 1350 with shifting of the pilot 1134. The link member 1372 is pivotally connected 1374 to the body 1110, the link member 1372 is pivotally connected 1376 to the advancing arm 1350, and the link members 1370, 1372 are pivotally connected to each other at a pin 1380. The pin 1380 extends through an elongated opening 1382 of the pilot 1134 and rides in the elongated opening 1382 during up and down shifting of the pilot 1134. When the handle 1102 is in the start position 1104 and the pusher 1132 is in the retracted position of FIG. 60, the link members 1370, 1372 are oriented to extend at an angle 1390 relative to each other.

Figure 60:
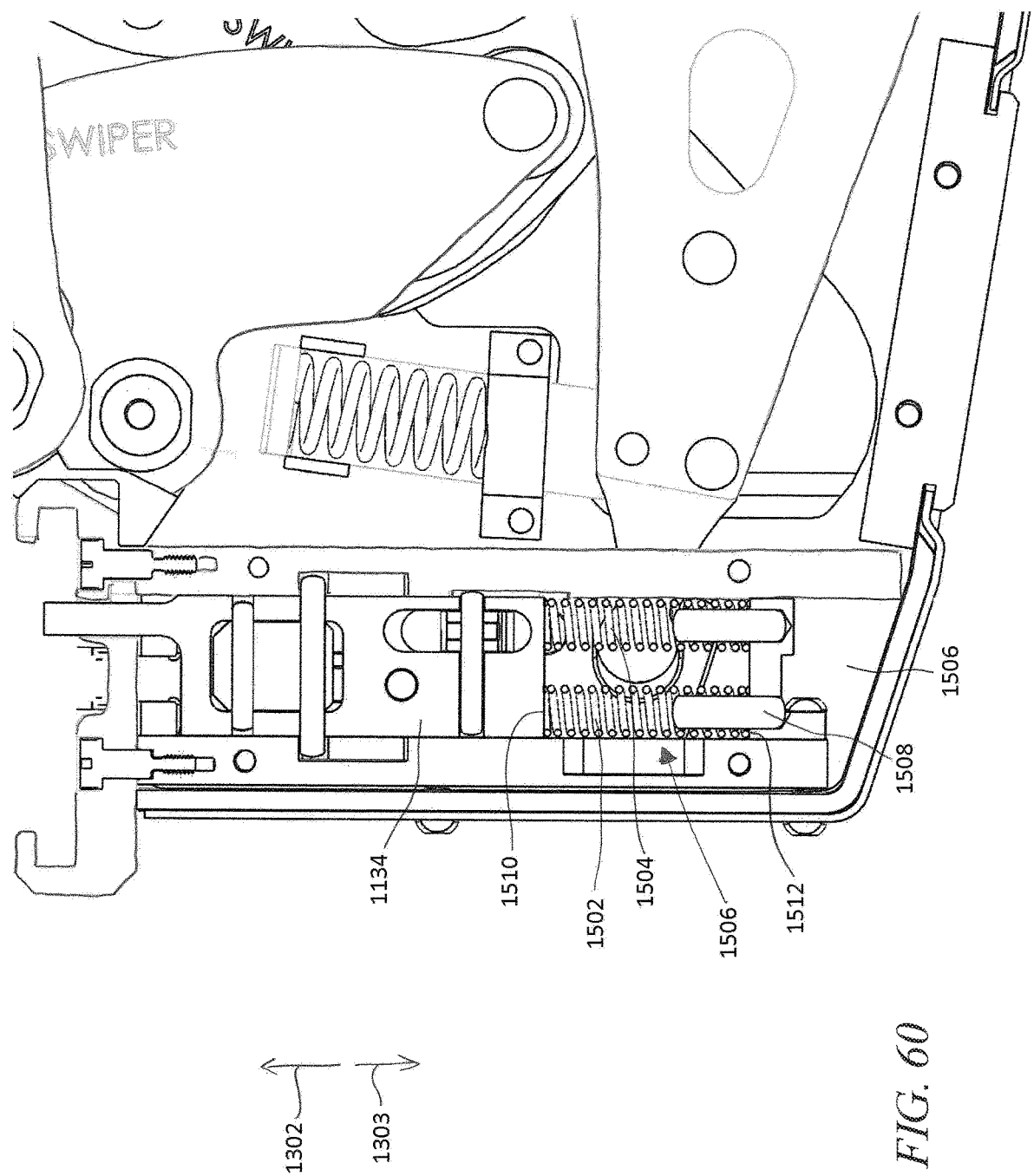
FIG. 60 is a cross-sectional view of a portion of the applicator of FIG. 51 having another resilient drive assist assembly.
Figure 61:
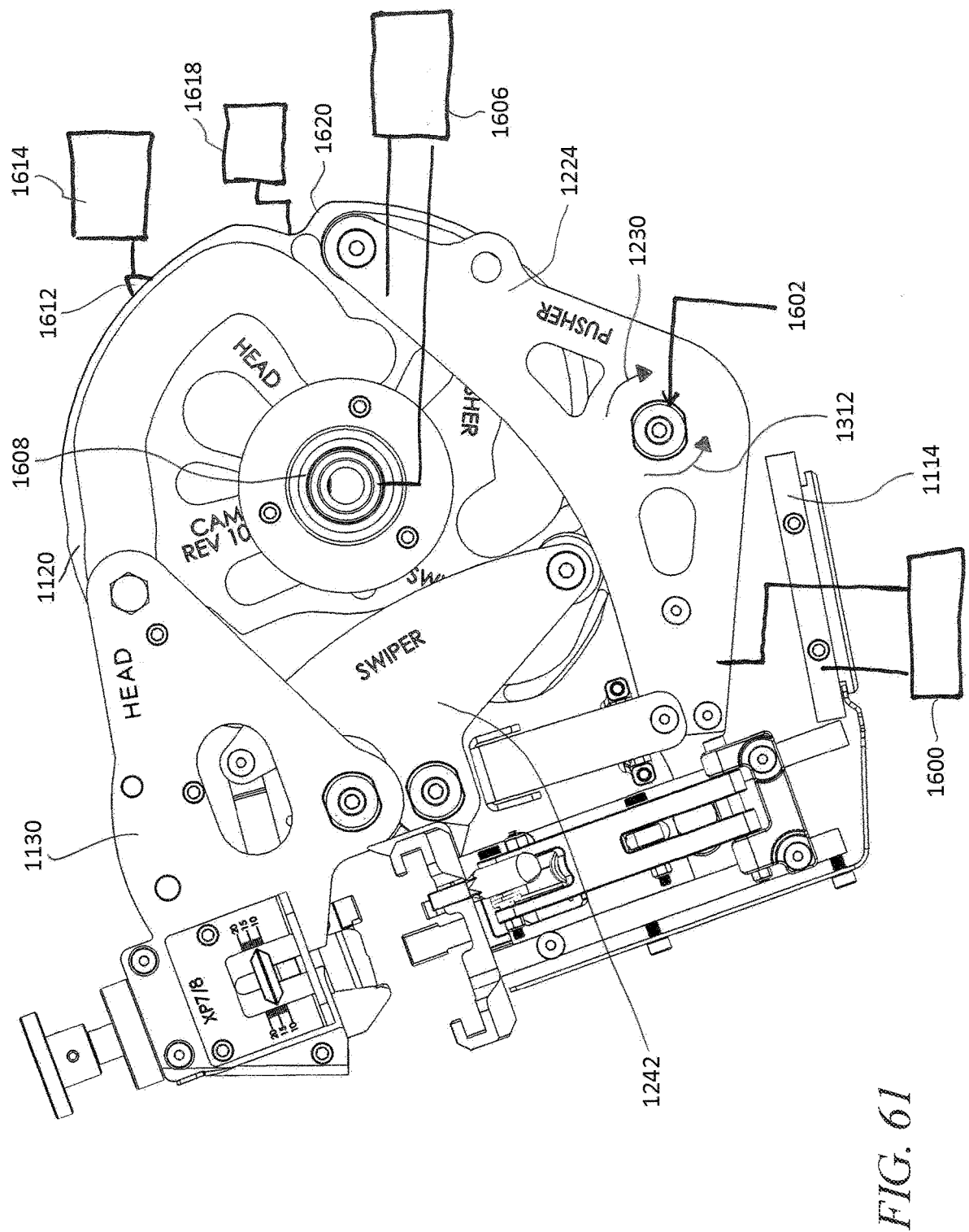
FIG. 61 is a partially schematic view of the applicator of FIG. 51 having additional resilient drive assist assemblies.

With reference to FIGS. 57 and 58, when the handle 1102 is pivoted in direction 1122, the pusher arm 1224 is pivoted in direction 1230 which drives the pusher 1132 upward in direction 1302 and drives the pilot 1134 upward with the pusher 1132 until a coupling number 1390 pivots and decouples the pilot 1134 from the pusher 1132 at a predetermined vertical location. The pusher 1132 then continues upward to its fully extended position. The upward movement of the pilot 1134 in direction 1302 causes a wall 1392 of the pilot 1134 that extends around the elongated opening 1382 to contact the pin 1380 and lift the pin 1380 with the pilot 1134. The upward movement of the pin 1380 pivots the links 1370, 1372 and increases the angle 1390 between the links 1370, 1372. This pivots the advancing arm 1350 outward in direction 1358 and causes the advancing finger 1352 to engage the fastener bed and shift the applicator 1100 therealong. As shown in FIGS. 60, and 61, the spring 1364 expands and unloads as the advancing arm 1350 pivots in direction 1358. The unloading of the spring 1364 applies force to the advancing arm 1350 in addition to the force applied by the link 1372 and assists in advancing the applicator 1100 along the fastener bed.

Once the handle 1104 has reached the lower end position 1106, the user then pivots the handle 1102 back in direction 1304 toward the upper, start position 1104. This causes the cam plate 1120 to turn in return direction 1310 which, in turn, causes the pusher 1132 to shift downward in direction 1303. The pusher 1132 eventually recouples with the pilot 1134 and draws the pilot downward in direction 1303 as the pusher 1132 travels toward the retracted position thereof. This shifts the pin 1380 generally downwardly in direction 1303 and return the links 1370, 1372 to their initial orientation of FIG. 60. The return of the links 1370, 1372 to their initial orientation pivots the advancing arm 1350 in direction 1359 (see FIG. 58) which compresses the spring 1364 between the advancing arm 1350 and the side plate portion 1360. Like the spring 1152 discussed above, the spring 1364 is compressed as the user pivots the handle 1102 from the lower end position 1106 back to the start position 1104. This configuration also uses the lower resistance return stroke of the handle 1102 to compress the spring 1364 and capture energy. This captured energy is then deployed when the user pivots the handle 1102 from the start position 1104 toward the end position 1106 and causes the pilot 1134 to shift upward in direction 1302 and pivot the advancing arm 1350 in direction 1358. The spring 1364 is fully compressed when the handle 1102 is in the start position 1104 and applies full force against the advancing arm 1350 at the beginning of the downward stroke of the handle 1102.

Figure 59:
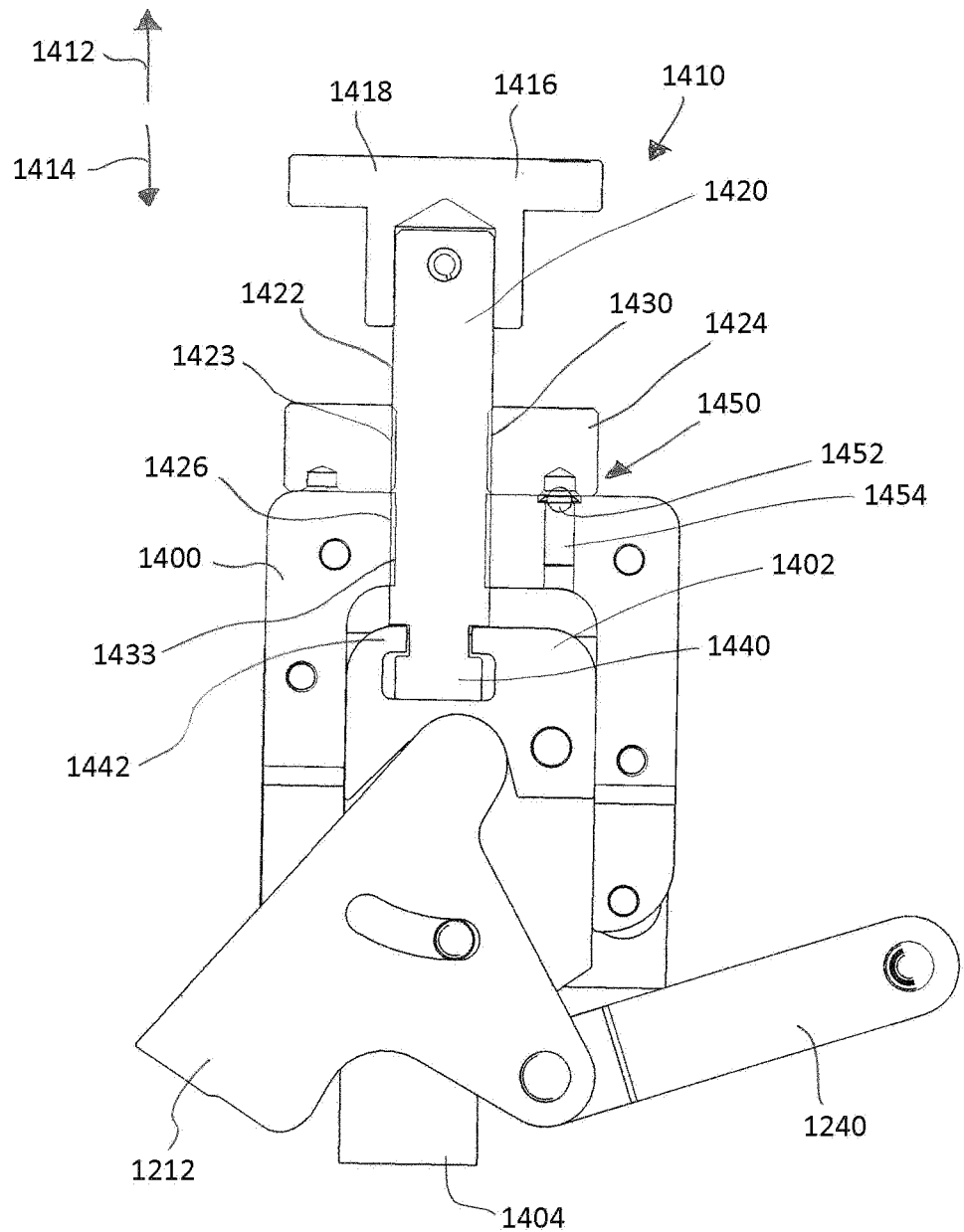
FIG. 59 is a cross-sectional view of a portion of the head of the applicator of FIG. 51 showing an upper rocker of one of the swipers that is received in a rocker pocket of a center anvil of the head of the applicator.

With reference to FIG. 59, the head 1130 includes a guide 1400 and the anvils 1212 include a central anvil 1402 having a clamping leg 1404 for contacting an upper plate of a fastener and pressing the upper plate against a conveyor belt. The head 1130 includes a height adjustment mechanism 1410 for shifting the anvils 1214 and the swipers 1212 up- and down in directions 1412, 1414 to compensate for different conveyor belt thicknesses. The height adjustment mechanism 1410 includes an adjuster 1416 having a handle 1418 and a shaft 1420. The shaft 1420 has threads 1422. The shaft 1420 extends through an opening 1423 of a collar 1424 and an opening 1426 of the guide 1400. The collar 1424 and the guide 1400 include threads 1430, 1433 that are engaged with the threads 1422 of the shaft 1420. The user turns the handle 1418 which causes turning of the shaft 1410 and upward and downward movement of the swipers 1212 and anvils 1214 by way of a connection between a head 1440 of the shaft 1420 and a collar 1442 of the anvils 1214.

To lock the swipers 1212 and anvils 1214 at a particular vertical position, the user tightens down the collar 1424. The collar 1424 acts as a jam nut to resist movement of the shaft 1420 in directions 1412, 1414. The height adjustment mechanism 1410 may include a detent 1450 to resist turning of the collar 1450 and keep the collar 1450 tightly engaged against the guide 1400. The detent 1450 may include a ball 1452 that is urged upward in direction 1412 by a spring in a cavity 1454 of the guide 1400.

With reference to FIG. 60, the resilient drive assist 1150 of applicator 1100 may have one or more resilient drive assist assemblies that assist in movement of components of the applicator 1100. For example, the applicator 1100 may include a resilient drive assist assembly 1500 having springs 1502, 1504 that are positioned between the pilot 1134 and a portion 1506 of the body 1110. The springs 1502, 1504 are kept from deflecting laterally by dowels 1508 and are engaged with seating surfaces 1510, 1512 of the pilot 1134 and body portion 1506. When the pilot 1134 shifts downward in direction 1303 in response to the user pivoting the handle 1102 from the end position 1106 in direction 1304 to the start position 1122, the seating surfaces 1510, 1512 are brought together which compresses the springs 1502, 1504. When the user pivots the handle 1102 in direction 1112 from the start position 1104, the pusher 1132 drives the pilot 1134 upward in direction 1302 and the springs 1502, 1504 decompress. The decompression or unloading of the springs 1502, 1504 applies a force in direction 1302 which urges the pilot 1134 upwardly. In this manner, the springs 1502, 1504 are loaded during the return mode in direction 1304 of the handle 1102 and are unloaded during the operating mode of the handle in direction 1122.

With reference to FIG. 61, the resilient drive assist 1150 of the applicator 1100 may have one or more resilient drive assist assemblies that capture energy from different components of the applicator 1100. For example, the applicator 1100 may have a compression spring 1600 connecting the pusher arm 1224 and the foot 1114 of the body 1110. The spring 1600 will be loaded or compressed by pivoting of the pusher arm 1224 in direction 1312 and will unload or decompress with pivoting of the pusher arm 1224 in direction 1230.

The applicator 1100 may have a torsion spring 1602 between the pusher arm 1224 and the side plates 1112. The torsion spring 1602 is loaded by pivoting of the pusher arm 1224 in direction 1312 and unloaded with pivoting of the pusher arm 1224 in direction 1230.

The applicator 1100 may have a compression shaft 1606 connected to the pusher arm 1224 and a drive shaft 1608 to which the cam plate 1120 is mounted. The compression shaft 1606 is loaded with pivoting of the pusher arm 1224 in direction 1312 and unloaded with pivoting of the pusher shaft 1224 in direction 1230.

The applicator 1100 may include a portion, such as at least one tooth 1612, which engage a resilient drive assist assembly 1614 at a particular orientation of the cam plate 1120. The resilient drive assist assembly 1614 may include a torsion spring connected to a shaft having a pinion mounted thereon. The pinion meshes with the at least one tooth 1612 when the cam plate 1120 has reached an angular position that brings the at least one tooth 1612 into engagement with the pinion of the resilient drive assist assembly 1614. Continued turning of the cam plate 1120 in direction 1310 causes turning of the pinion engaged with the at least one tooth 1612 and loading of the tension spring connected to the pinion shaft. The at least one tooth 1612 is positioned around only a portion of the periphery of the cam plate 1120 so that the loading and unloading of the torsion spring of the resilient drive assist assembly 1614 occurs only during a portion of the range of motion of the cam plate 1120.

In another form, the resilient drive assist assembly 1614 includes a one-way drive mechanism, such as a ratchet, configured to engage the tooth 1612. The ratchet may engage the at least one tooth 1612 and drive the tooth 1612 and cam plate 1120 in direction 1124.

The applicator 1100 may also include a resilient drive assist assembly 1618 having a resilient member that interfaces with an outer periphery of the cam plate 1120, such as a pocket 1620. The resilient member 1618 captures energy from turning of the cam plate 1120 when the resilient member interfaces with the pocket 1620 as the cam plate 1120 turns in direction 1124 and releases the captured energy to the cam plate 1120 as the cam plate 1120 turns in direction 1310.

The resilient drive assist 1150 of the applicator 1100 may have various types of energy retention mechanisms. For example, springs including compression, extension, torsion, and constant force springs may be used. Springs that may be used include coil springs, gas springs such as a nitrogen spring. Magnets could also be used as energy retention mechanisms.

Referring now to FIGS. 62-69, an alternative fastener bed 1700 is illustrated that is similar in many respects to fastener bed 14 discussed above such that differences between the beds will be highlighted. The fastener bed 1700 is configured to be used in connection with the system 10 and the various applicators described above (e.g., applicator 18, applicator 1100). In this regard, the fastener bed 1700 has the same functionality as fastener bed 14 in terms of its operation with the described applicators 18, 1100, such as with respect to its interaction with the fasteners 12, pusher 124, pilot finger 174, and advancing finger 504. However, the fastener bed 1700 has multiple components as described hereinbelow so that if one of the components is damaged, that component can be removed for repair or replacement without having to repair or replace the entire bed.

As illustrated, the elongate fastener bed 1700 includes upper bed segments 1702 and a lower bed member 1704 that form portions of the assembled fastener bed 1700 once the members 1702, 1704 are rigidly fastened or coupled together. The fastener bed 1700 includes a plurality of fastener holes 1706 that extend through the bed 1700. The holes 1706 include an H-shaped hole upper portion 1708 formed in the upper bed segments 1702 and an obround, enlarged hole lower portion 1710 (shown in FIGS. 63 and 66) formed in the lower bed member 1704.

Figure 63:
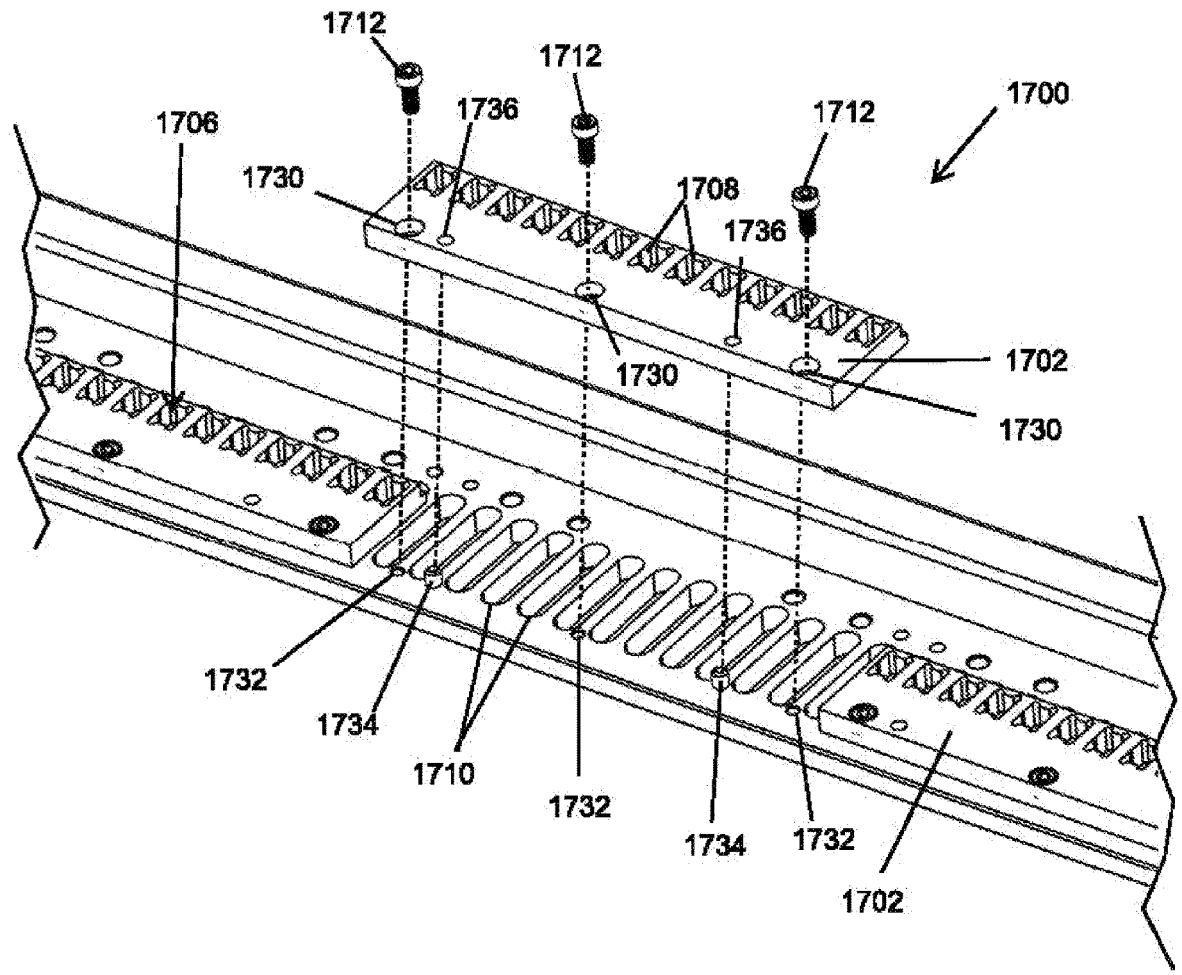
FIG. 63 is a partially exploded view of the portion of the fastener bed of FIG. 62.

Referring to FIG. 63, the upper bed segments 1702 each include a plurality of apertures 1730 that are configured to align with corresponding apertures 1732 of the lower bed member 1704 so that fasteners may be received therethrough. As shown, the apertures 1732 may be threaded such that the fasteners may be threaded bolts 1712 that may be received through the apertures 1730 and secured in the apertures 1732 to rigidly couple an upper bed segment 1702 to the lower bed member 1704. In addition, the lower bed member 1704 may include one or more locating posts 1734 configured to be received within secondary apertures 1736 of the upper bed segments 1702 for aligning the apertures 1730 and 1732 for fixing the upper bed segments 1702 and to the lower bed member 1704 together using the bolts 1712.

Once the upper bed segments 1702 have been rigidly fastened or coupled to the lower bed member 1704 using the bolts 1712, each H-shaped hole upper portion 1708 formed in the upper bed segments 1702 will be aligned with a corresponding enlarged hole lower portion 1710 formed in the lower bed member 1704 such that their corresponding side surface portions are aligned. In this manner, one of the hole upper portions 1708 and a corresponding one of the hole lower portions 1710 cooperate to form one of the holes 1706. The holes 1706 of the assembled fastener bed 1700 have generally the same configuration as the holes 16 of the fastener bed 14 to function substantially similar thereto with respect to the applicator locating, staple driving, and applicator advancing operations.

Figure 62:
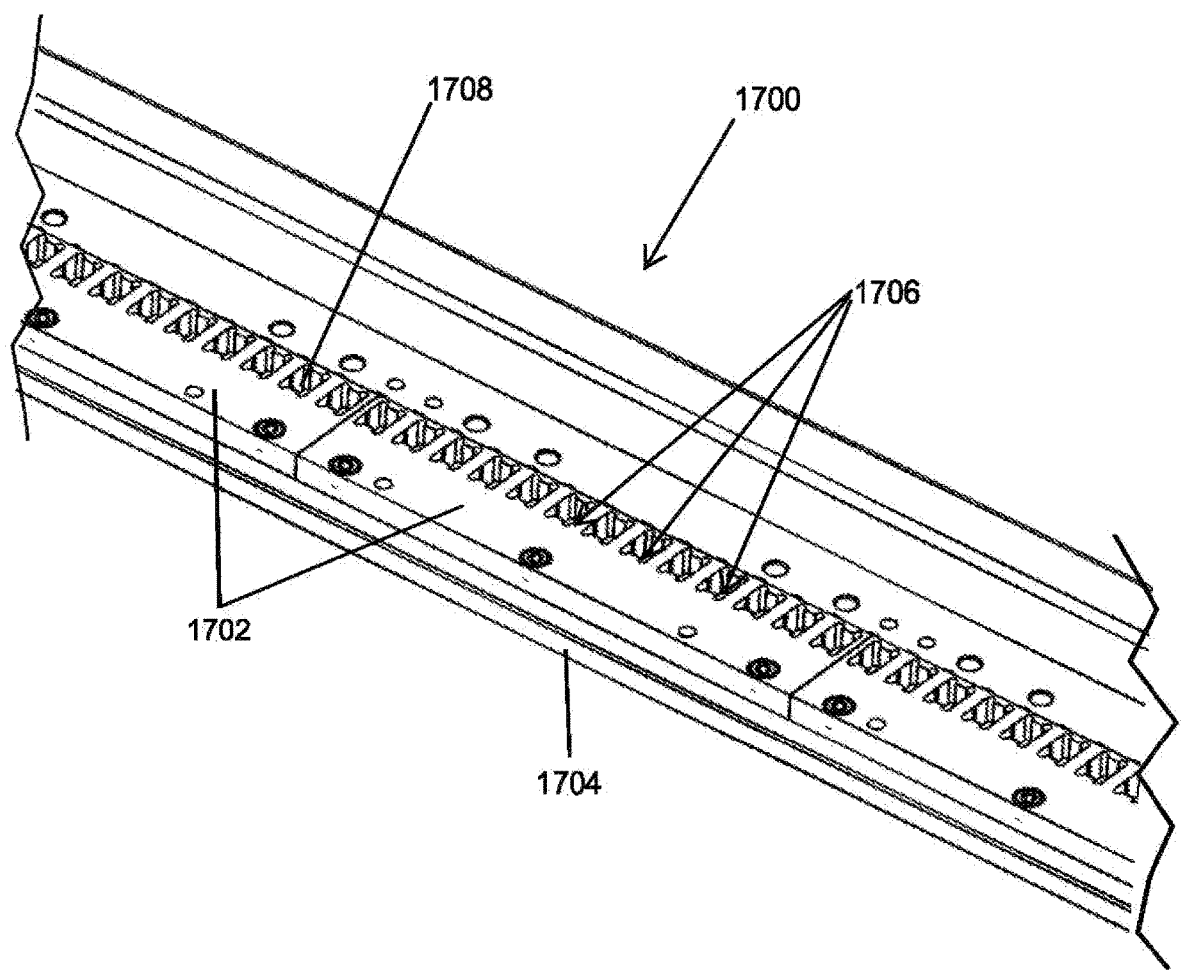
FIG. 62 is a perspective view of a portion of an alternative fastener bed including a lower bed member and a plurality of upper bed segments fixed together so that the fastener bed has a plurality of fastener holes.

Referring to FIGS. 62 and 63, in the preferred and illustrated form, the upper bed segments 1702 are each of equal length, and the lower bed member 1704 has a length longer than that of the individual upper bed segments 1702. In other forms, individual ones of the upper bed segments 1702 may be of differing lengths. The length of the lower bed member 1704 is sized so that a predetermined number of bed segments 1702 are secured to the lower bed member 1704 to extend over each of the enlarged hole lower portions 1710 of the lower bed member 1704 and form the fastener bed 1700 including the plurality of holes 1706 thereof. So configured, if an individual hole 1706 becomes unusable for any reason, the individual upper bed segment 1702 including the unusable hole may be detached from the lower bed member 1704 and be repaired or replaced while the remaining upper bed segments 1702 stay in place secured to the lower bed member 1704.

Figure 64:
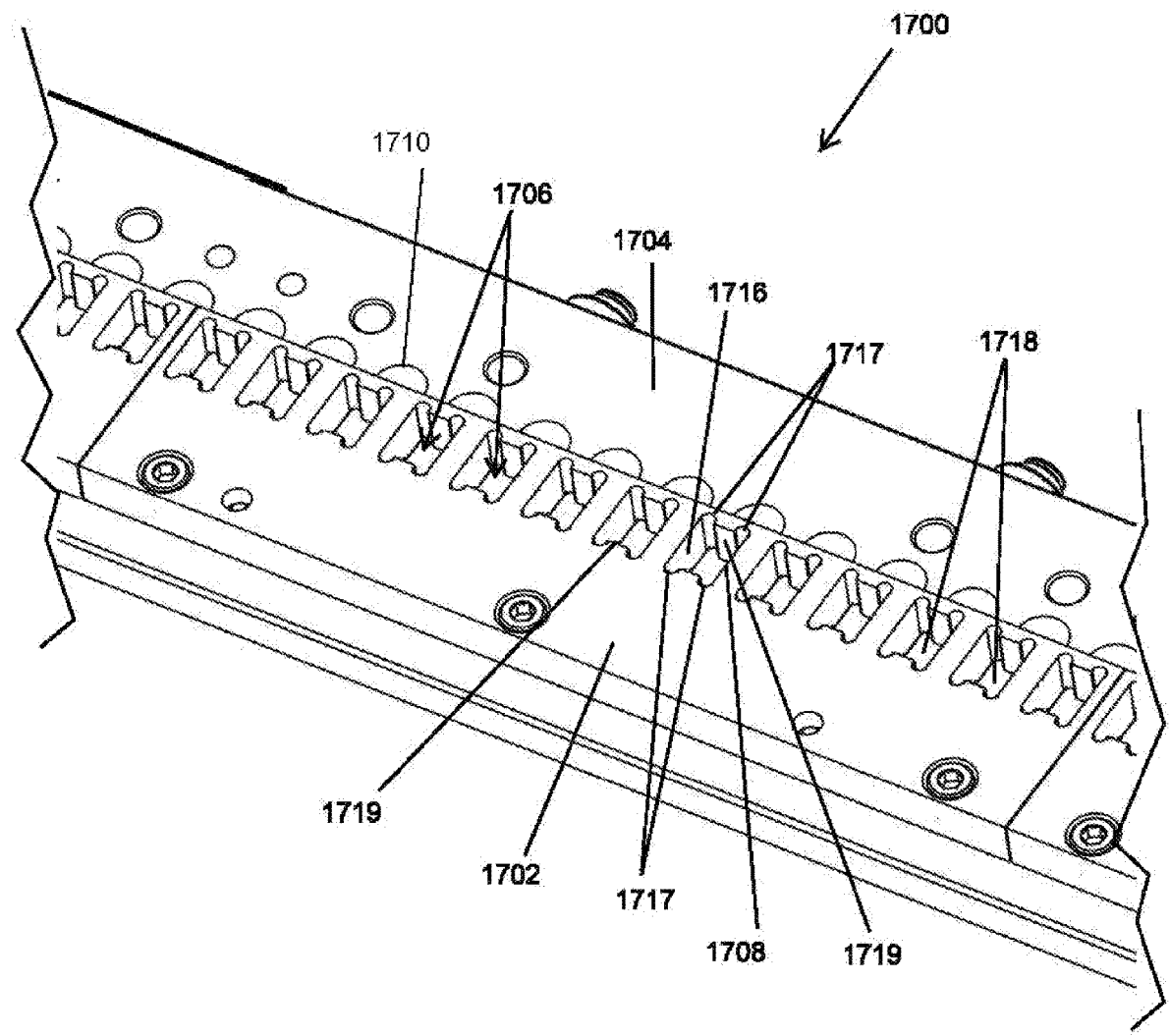
FIG. 64 is an enlarged perspective view of a portion of the fastener bed of FIG. 62 showing the H-shaped hole upper portion of each fastener hole.

As shown in FIG. 64, the H-shaped hole upper portion 1708 includes a pair of spaced, enlarged or long side surface portions 1716 that are flat and extend linearly along either side of the hole upper portion 1708, and staple leg receiving pocket portions 1717 at the corners of the hole upper portion 1708. More specifically, the pocket portions 1717 of each hole 1706 are formed at the ends of each of the opposite side surface portions 1716 and on either side of central tab protrusions 1719 that extend toward each other and are spaced apart from each other in the lengthwise direction of the hole upper portion 1708. In this manner, in the illustrated form, the hole upper portion 1708 is configured to receive the legs of a pair of staples in the pocket portions 1717 at the four corners of the hole upper portion 1708. The pocket portions 1717 can have a generally arcuate or semi-circular configuration to correspond to the round cross-sectional configuration of the staple legs of each staple.

Figure 65:
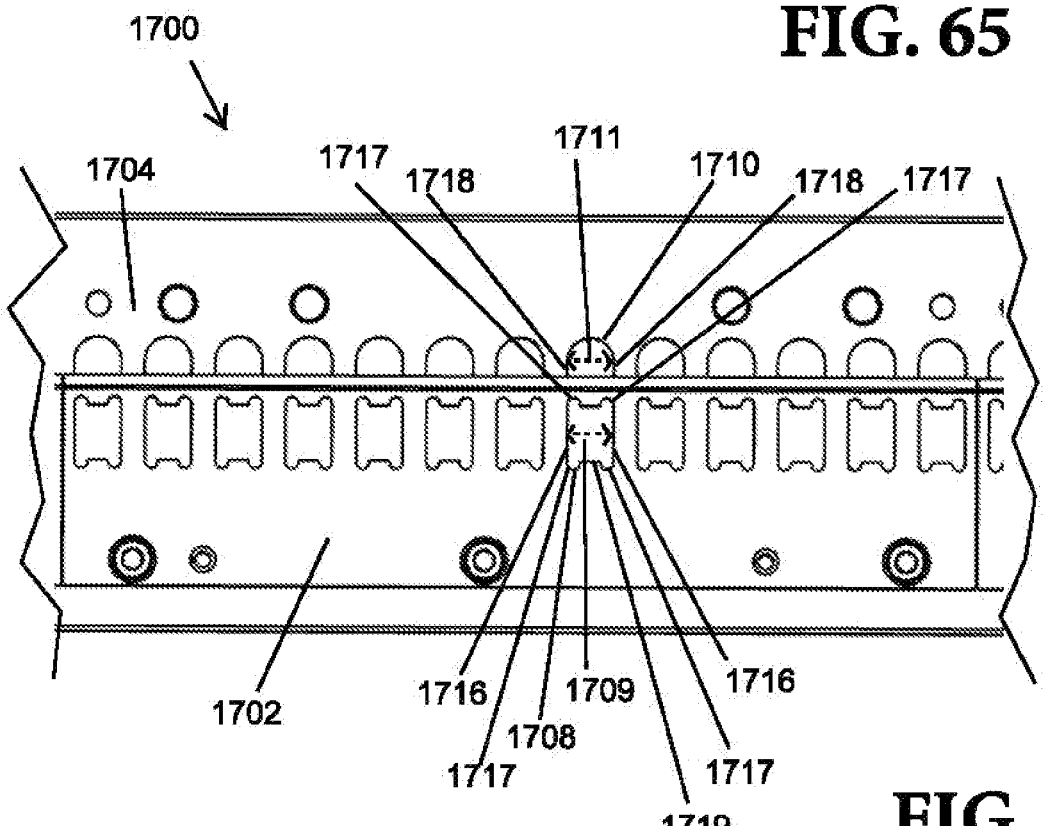
FIG. 65 is a top plan view of a portion of the fastener bed of FIG. 62 showing the H-shaped hole upper portion of each fastener hole and an end portion of the enlarged lower portion of each fastener hole that extends beyond the upper bed segments.
Figure 66:
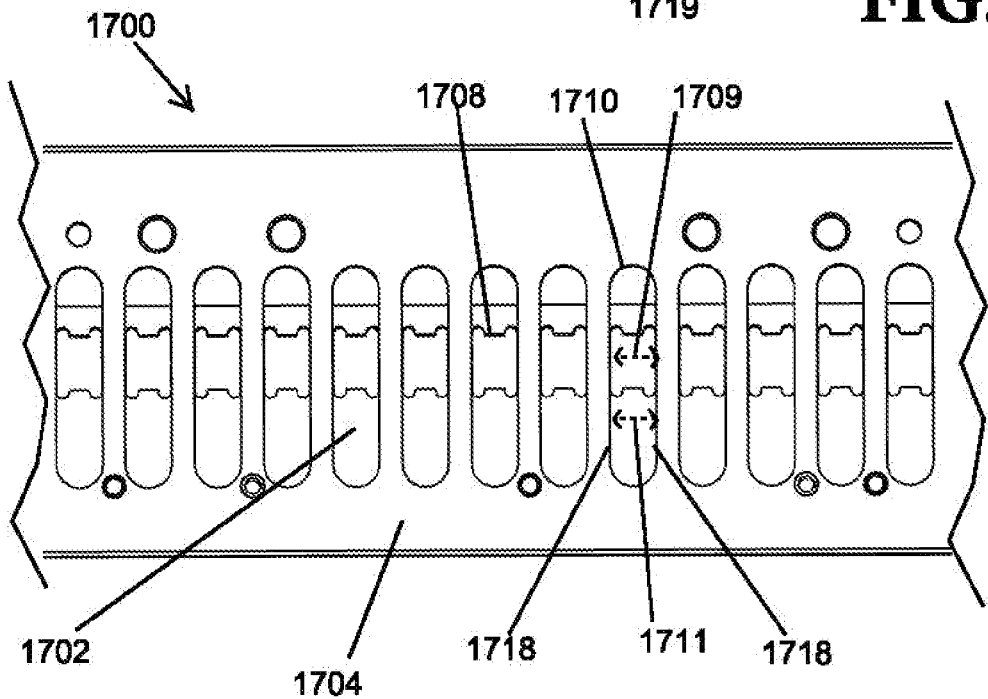
FIG. 66 is a bottom plan view of a portion of the fastener bed of FIG. 62 showing equal widths of the enlarged lower portion and the H-shaped upper portion arranged so that corresponding sides thereof are aligned.

The H-shaped hole upper portion 1708 has a width 1709 (shown in FIGS. 65 and 66) extending across the hole upper portion 1708 between the opposite, straight long side surface portions 1716 thereof. Likewise, the enlarged hole lower portion 1710 formed in the lower bed member 1704 similarly includes enlarged or long side surface portions 1718 that face each other, extend linearly and have a flat configuration, and are spaced from each other across the hole lower portion 1710 by a width 1711. The width 1709 of the H-shaped hole upper portion 1708 and the width 1711 of the enlarged hole lower portion 1710 are preferably sized to correspond to one another and be identical as shown in FIG. 65. As a result, the corresponding side surface portions 1716 and 1718 of corresponding ones of the H-shaped hole upper portion 1708 and the enlarged hole lower portion 1710 are aligned to be generally flush with one another once the upper bed segment 1702 has been rigidly fastened to the lower bed member 1704 to form the fastener bed 1700.

Figure 67:
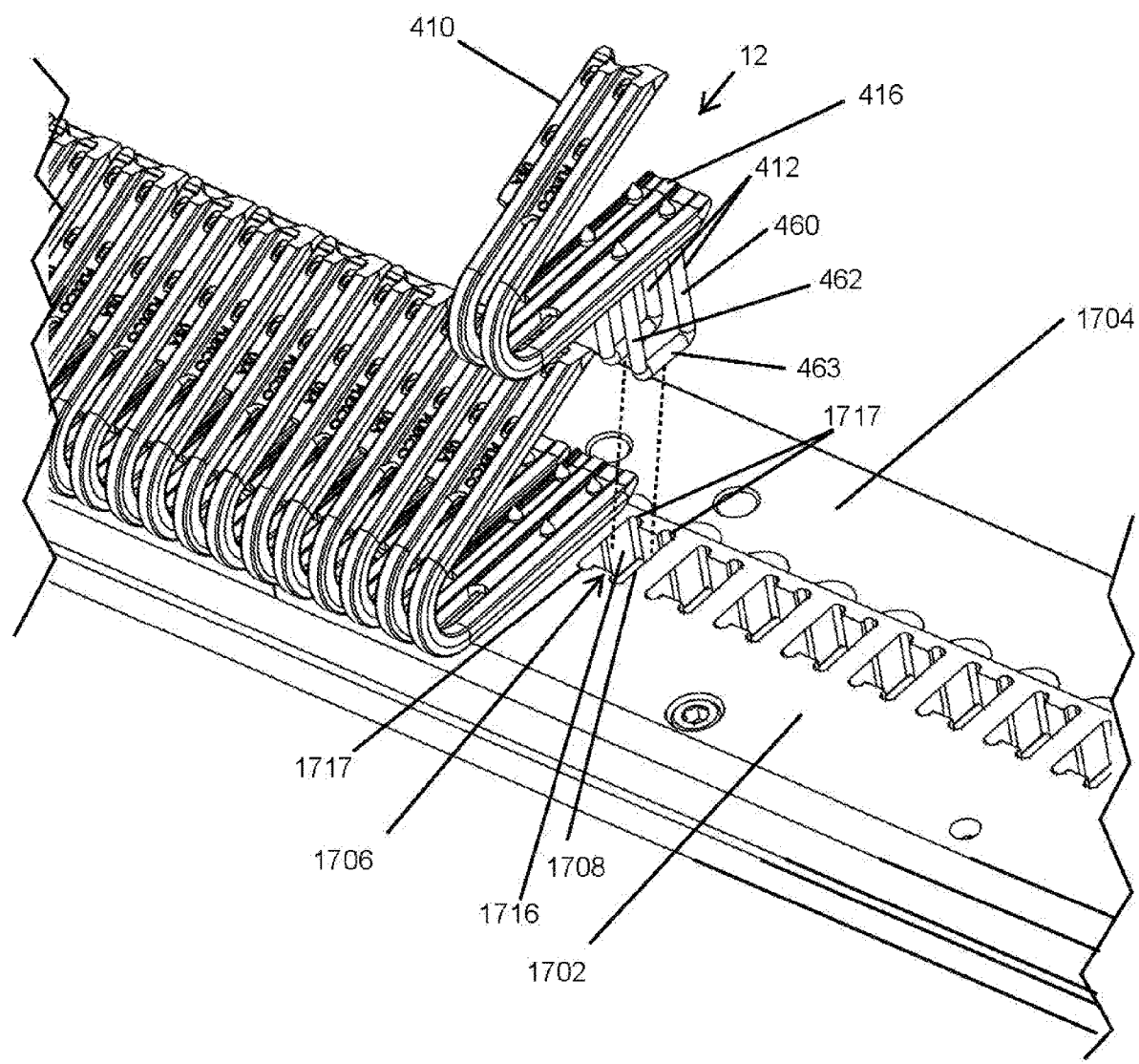
FIG. 67 is a perspective view similar to FIG. 64 showing fasteners having staples disposed in the fastener holes of the fastener bed.
Figure 68:
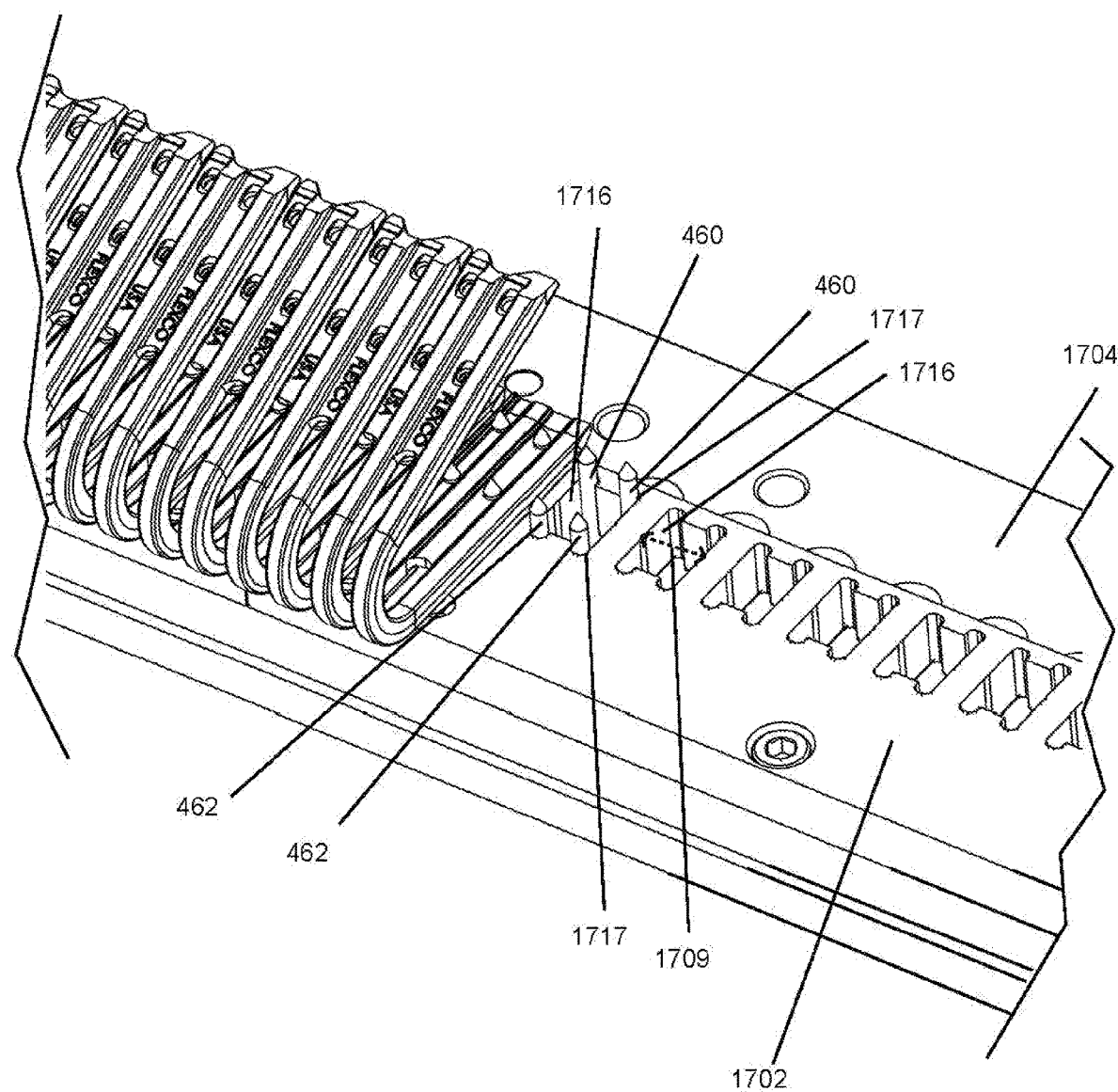
FIG. 68 is a perspective view similar to FIG. 67 with one fastener body removed to show staple legs of the staples of the fastener disposed in corner pocket portions of the H-shaped hole upper portion and along side surfaces of a fastener hole.
Figure 69:
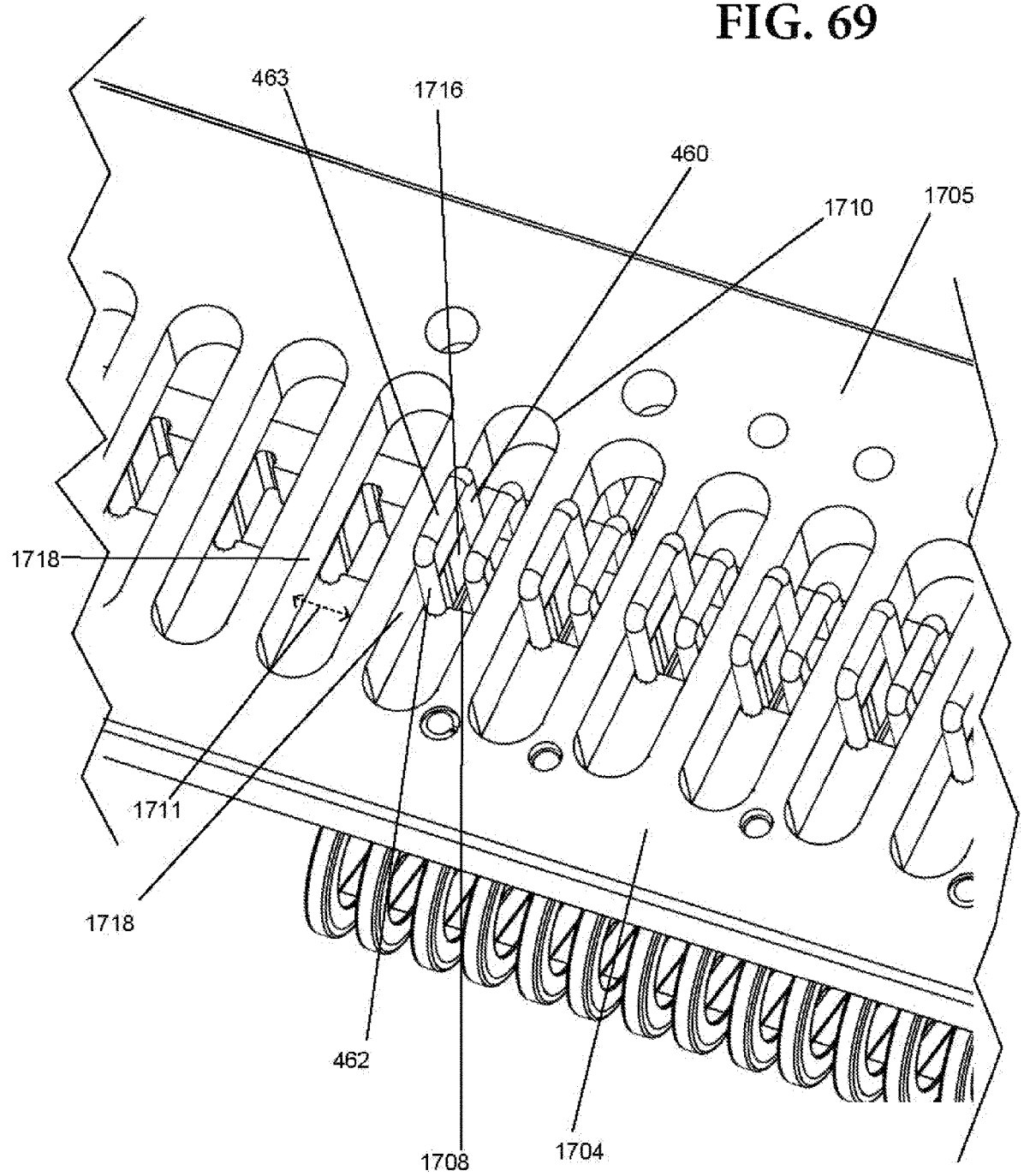
FIG. 69 is perspective view from below the fastener bed of FIG. 67 showing the staple legs extending through the H-shaped hole upper portion and the enlarged hole lower portion to be in a close sliding fit with the facing surface portions thereof.

Referring to FIGS. 67-69, various views illustrating the fasteners 12 (see FIGS. 15A and 15B) placed on the fastener bed 1700 so that the staples 412 thereof extend into and through the holes 1706 are shown. Similar to the fastener bed 14, the staple legs 460, 462 of a staple 412 and the holes 1706 are sized such that the staple legs 460, 462 may be positioned in one of the holes 1706 so as to extend downward through the H-shaped upper portion 1708 and the enlarged lower portion 1710 closely adjacent the facing surface portions of the holes 1706 to have a close sliding fit therewith. As shown in FIG. 69, with the staples 412 received in the holes 1706, the crowns 463 of the staples 412 may be oriented below a lower surface 1705 of the lower bed member 1704 of the fastener bed 1700.

As illustrated in FIG. 67, a pair of staples 412 received in each hole 1706 are spaced from each other on the lower plate 416 of the fastener 12 so that corresponding legs 460, 462 of the pair of staples 412 have a close sliding fit with the aligned side surface portions 1716, 1718 (see FIG. 69). By way of example and not limitation, the width 1709, 1711 across the aligned side surface portions 1716, 1718 of the holes 1706 can be only slightly larger than the distance measured from the surface portions of the staple legs 460 or 462 which are facing the side surface portions 1716, 1718, such that the staple legs 460 or 462 are spaced from the side surface portions 1716, 1718 by approximately 0.005 inches when positioned in the hole 1706. In a similar manner, the staple legs 460, 462 and the hole upper portion 1708 are sized so that the staple legs 460, 462 will have a close sliding fit with arcuate surfaces of the pocket portions 1717 at the corners of the H-shaped hole upper portion 1708 (see FIG. 68). With this sizing, the aligned side surface portions 1716, 1718 and the arcuate surfaces of the pocket portions 1717 are arranged to serve as guide surfaces for the staple legs 460, 462 of the staples 412 as they are driven through and out from the holes 1706 during a belt fastener application operation. The aligned side surface portions 1716, 1718 and the central tab protrusions 1719 may have close tolerances with the staple legs and the pusher 124 so that the aligned side surface portions 1716, 1718 and central tab protrusions 1719 may wear down over time with repeated use of the applicator 18. An operator may remove the upper bed segment 1702 that has worn down and replace the upper bed segment 1702 with a new upper bed segment 1702.

In a similar manner, the pusher of the applicator (e.g., pusher 124 of applicator 18 shown in FIG. 4) is sized to have a width so that it has a close sliding fit with the aligned side surface portions 1716, 1718. In operation, when the pusher 124 of the applicator 18 is driven upwards, side surfaces of the pusher 124 are closely adjacent to the side surface portions 1716, 1718 of the H-shaped hole upper portion 1708 and the enlarged hole lower portion 1710, respectively, so as to be guided as grooves of the pusher 124 engage the crowns 463 of the staples 412 and drives the staples 412 including the legs 460, 462 thereof upwardly though and out from the holes 1706 and through the conveyor belt. So configured, the H-shaped hole upper portion 1708 and the enlarged hole lower portion 1710 of each hole 1706 (including the aligned side surface portions 1716, 1718 thereof) cooperate to promote effective alignment of the pusher and the staples during staple driving operations.

Although the alternative fastener bed 1700 is configured to function substantially similar to the fastener bed 14 described herein with respect to the applicator locating, staple driving, and applicator advancing operations, the fastener bed 1700 may be formed using less material than the fastener bed 14 resulting from the separation of the upper bed segments 1702 from the lower bed member 1704. So configured, the upper bed segments 1702 may require less raw material to manufacture than the portion of the fastener bed 14 including the H-shaped hole upper portion because the upper bed segments 1702 do not extend so as to fully overlap the enlarged hole lower portions 1710 in the lower bed member 1704 as shown in, for example, FIG. 64. In some forms, the upper bed segments 1702 may be formed of different materials than the lower bed member 1704. In one non-limiting example, the upper bed segments 1702 may be formed of one type of metal, such as A2 steel, and the lower bed member 1704 may be formed of another, different type of metal. Alternatively, the upper bed segments 1702 and the lower bed member 1704 may be formed of the same material. So configured, varying material configurations of the components forming the fastener bed 1700 are contemplated.

Referring now to FIGS. 70-73, another alternative fastener bed 1800 is illustrated that is also similar in many respects to fastener bed 14 discussed above such that differences between the two will be highlighted. The fastener bed 1800 is configured to be used in connection with the system 10 and the various applicators described above (e.g., applicator 18, applicator 1100). In this regard, the fastener bed 1800, like alternative fastener bed 1700, has the same functionality as fastener bed 14 in terms of its operation with the applicators 18, 1100, such as with respect to its interaction with the staples, pusher 124, pilot finger 174, and advancing finger 504. However, like the fastener bed 1700, the fastener bed 1800 has multiple components as described hereinbelow so that if one of the components is damaged, that component can be removed for repair or replacement without having to repair or replace the entire bed.

As illustrated, the elongate fastener bed 1800 includes first upper guide strip segments 1802, second upper guide strip segments 1803, and a lower bed member 1804 that form portions of the fastener bed 1800 once rigidly fastened or coupled together. The fastener bed 1800 includes a plurality of holes 1806 that extend through the bed 1800 with each hole 1806 including an H-shaped upper portion 1808 defined by the upper guide strip segments 1802, 1803 and an enlarged lower portion 1810 (shown in FIG. 71), formed in the lower bed member 1804, as described in further detail below. The holes 1806 of the assembled fastener bed 1800 have generally the same configuration as the holes 16 of the fastener bed 14, as well as the holes 1706 of the other alternative fastener bed 1700, to function substantially similar thereto with respect to the applicator locating, staple driving, and applicator advancing operations.

Figure 71:
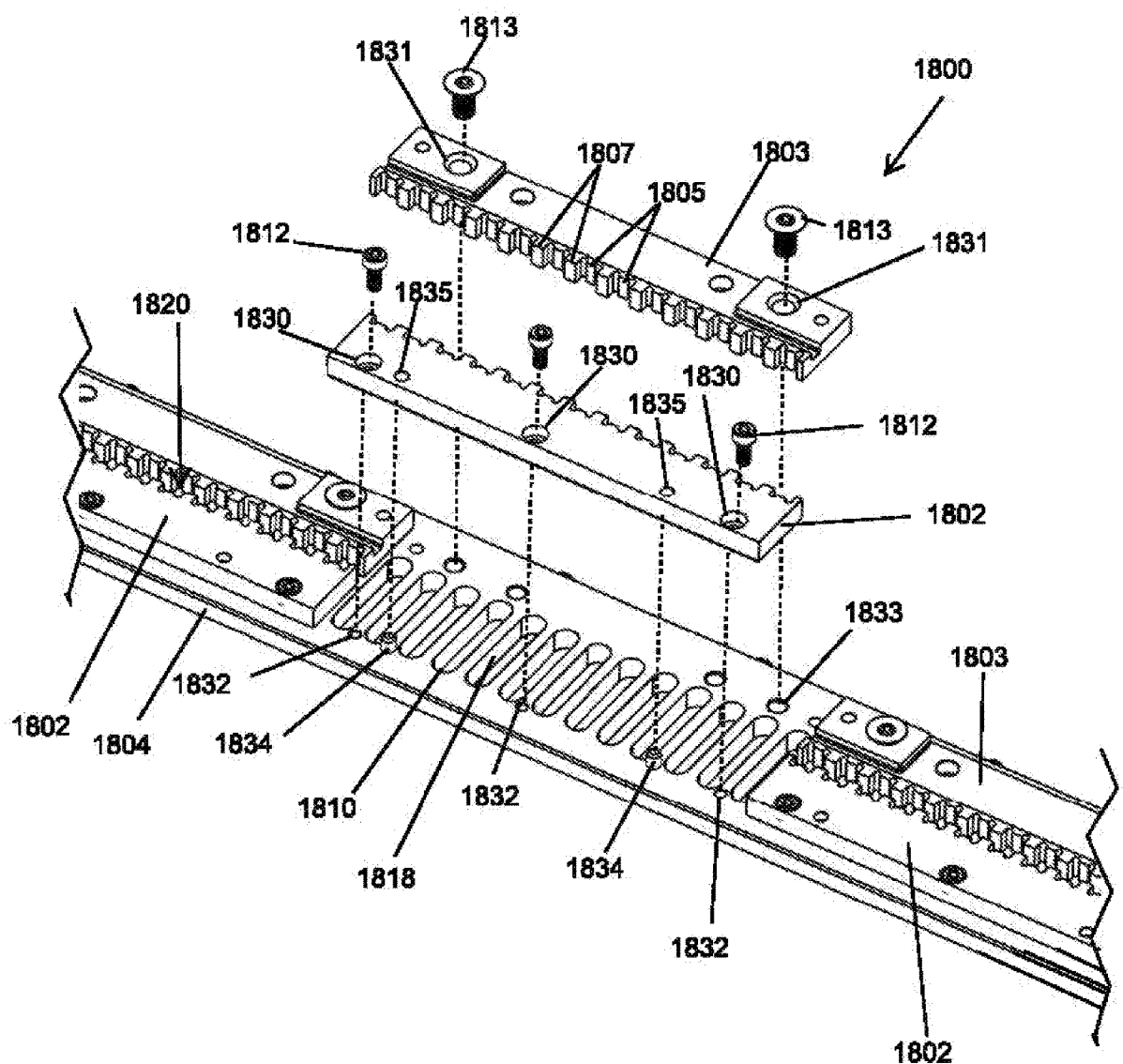
FIG. 71 is a partially exploded view of the portion of the fastener bed of FIG. 70.

Referring to FIG. 71, each of the first upper guide strip segments 1802 includes a plurality of apertures 1830 that are configured to align with corresponding apertures 1832 of the lower bed member 1804 so that fastening members may be received therethrough. As shown, the apertures 1832 may be threaded such that the fastening members may be threaded bolts 1812 that can be received through the apertures 1830 and secured in the apertures 1832 to rigidly couple the first upper guide strip segments 1802 to the lower bed member 1804. Similarly, each of the second upper guide strip segments 1803 includes a plurality of apertures 1831 that are configured to aligned to corresponding apertures 1833 of the lower bed member 1804 so that fastening members may be received therethrough. As shown, the apertures 1833 may be threaded such that the fastening members may be threaded bolts 1813 that can be received through the apertures 1831 and secured in the apertures 1833 to rigidly couple the second upper guide strip segments 1803 to the lower bed member 1804. In addition, the lower bed member 1804 may include one or more locating posts 1834 configured to be received within secondary apertures 1835 of the first guide strip segments 1802 for aligning the apertures 1830 and 1832 for fixing the bed member 1804 and the guide strip segments 1802 together using the bolts 1812.

The first upper guide strip segments 1802 and the second upper guide strip segments 1803 each include alternating small central tab protrusions 1805, similar to the previously-described central tab protrusions 1719 of the hole upper portion 1708, and larger divider protrusions 1807 that are configured to define the generally H-shaped hole upper portion 1808 of each hole 1806. When assembled and rigidly coupled to the lower bed member 1804, the upper guide strip segments 1802 and 1803 are not directly engaged with one another, and instead are spaced from each other along the length of enlarged hole lower portions 1810 so as to form a continuous gap 1820 extending between the upper guide strip segments 1802, 1803. The larger divider protrusions 1807 on each of the strip segments 1802, 1803 form generally segregated sections of the gap 1820 so that each section includes surface portions of one of the hole upper portions 1808, as described in more detail hereinafter.

The small central tab protrusions 1805 of the strip segments 1802, 1804 cooperate with the larger divider protrusions 1807 so that the segregated sections of the gap 1820 have a generally "H"-shaped profile with each of the sections being aligned over the corresponding enlarged hole lower portions 1810. So configured, each H-shaped hole upper portion 1808 does not have an entirely closed perimeter. It is also contemplated that the large divider protrusions 1807 of each guide strip segment 1802, 1803 may be extended so that when fixed to the lower bed member 1804 the flat ends of the corresponding oppositely extending protrusions 1807 will be closely adjacent to or in abutment with each other to form a closed perimeter of the hole upper portion 1808.

Figure 70:
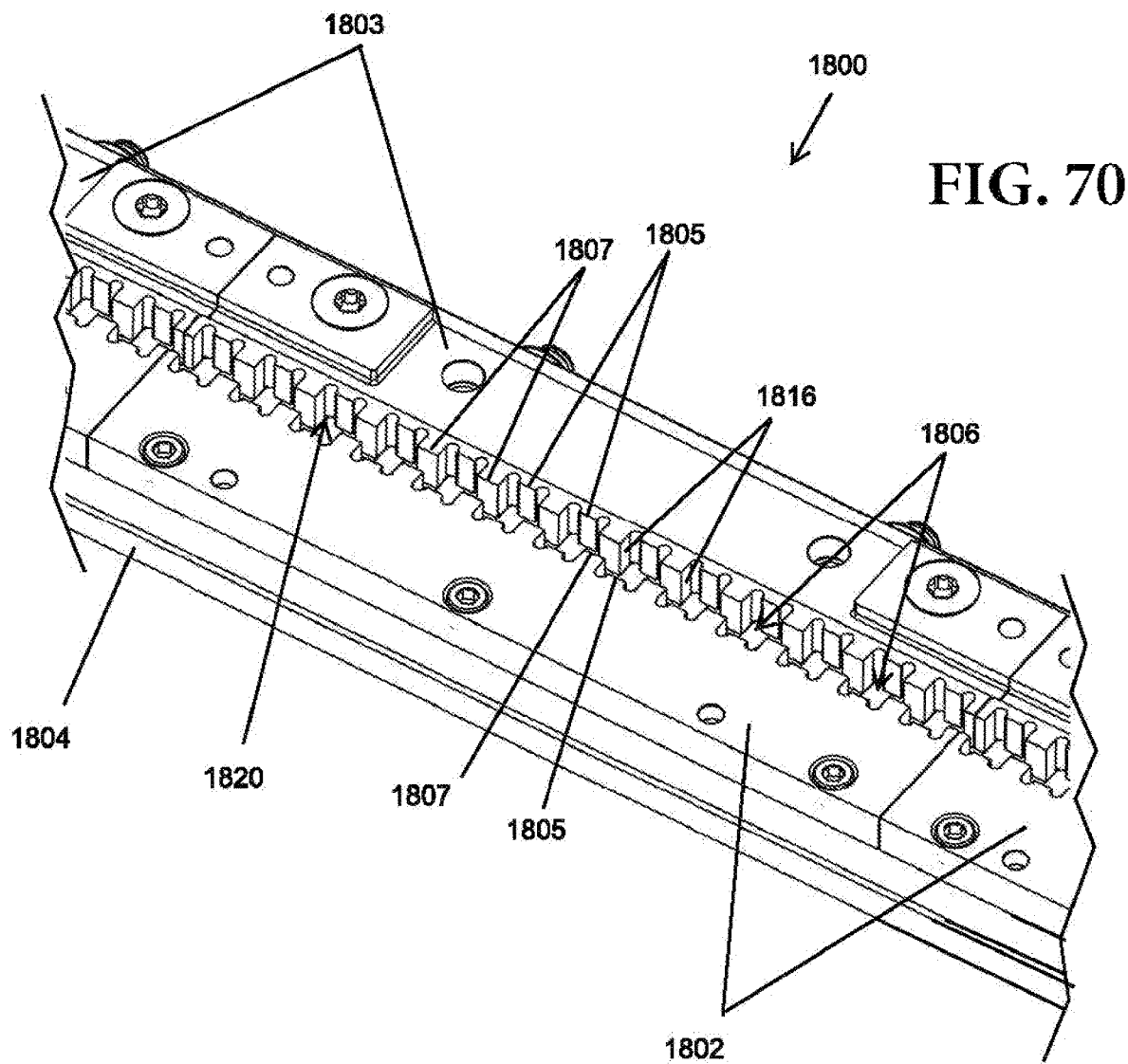
FIG. 70 is a perspective view of a portion of an alternative fastener bed including a lower bed member, first upper guide strip segments, and second upper guide strip segments fixed together so that the fastener bed has a plurality of fastener holes.

Referring to FIGS. 70 and 71, in the preferred and illustrated form, the first and second guide strip segments 1802, 1803 are each of equal length, and the lower bed member 1804 has a length longer than that of the individual bed segments 1802, 1803. The length of the lower bed member 1804 is sized so that a predetermined number of guide strip segments 1802, 1803 are secured to the lower bed member 1804 to extend over the plurality of hole lower portions 1810 thereof and form the fastener bed 1800 including the plurality of holes 1806 thereof. So configured, if an individual one of the guide strip segments 1802, 1803 becomes unusable for any reason, the unusable guide strip portion may be detached from the lower bed member 1804 and be repaired or replaced while the remaining guide strips 1802, 1803 stay in place secured to the lower bed member 1804.

As discussed earlier, once the fastener bed 1800 has been assembled by coupling the upper guide strips 1802, 1803 to the lower bed member 1804, the fastener bed 1800 functions substantially similar to the fastener beds 14 and 1700. Although the H-shaped upper portion 1808 of each hole 1806 does not have a closed perimeter, each of the small central tab protrusions 1805 cooperates with the larger divider protrusions 1807 on either side thereof to form mirror image "J"-shaped openings 1817. Each J-shaped opening 1817 has one of the side surface portions 1816 the hole upper portion 1808 that is flat and extends linearly along the side of the divider protrusion 1807 and forms one of the staple leg receiving openings formed between the central tab protrusion 1805 and the divider protrusion 1807 and is configured have an arcuate surface portion of a generally semi-circular configuration to correspond to the round cross-sectional configuration of the staple legs 460, 462 of each staple 412 (see FIG. 15A).

Figure 72:
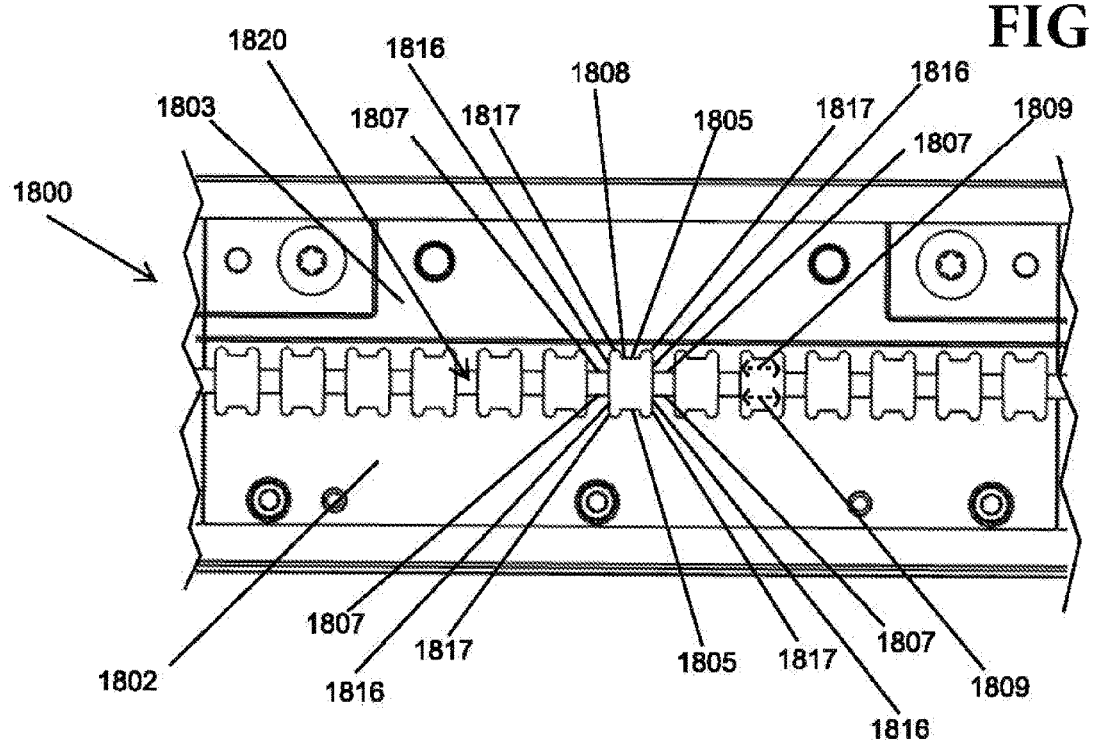
FIG. 72 is a top plan view of a portion of the fastener bed of FIG. 70 showing an H-shaped hole upper portion of each fastener hole formed by the first and second upper guide strip segments.
Figure 73:
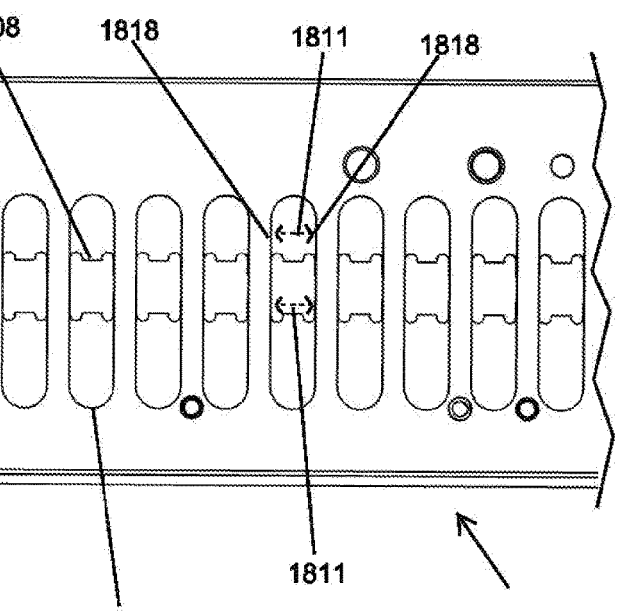
FIG. 73 is a bottom plan view of a portion of the fastener bed of FIG. 70 showing equal widths of an enlarged hole lower portion and the H-shaped hole upper portion of each fastener hole so that the corresponding sides thereof are aligned.

Referring to FIGS. 72 and 73, each H-shaped hole upper portion 1808 has a width 1809 extending between the opposite side surface portions 1816 of the large protrusions 1807 on either side of a central tab protrusion 1805 of the upper guide strip segments 1802, 1803. Likewise, the enlarged hole lower portion 1810 formed in the lower bed member 1804 similarly includes enlarged or long side surface portions 1818 of the enlarged hole lower portion 1810 that face each other, extend linearly and have a flat configuration, and are spaced from each other across the hole lower portion 1810 by a width 1811. The width of the hole upper portion 1808 and the width 1811 of the hole lower portion 1810 are preferably sized to correspond to one another and be identical, as shown in FIG. 73. As a result, the corresponding side surface portions 1816 and 1818 of corresponding ones of the hole upper portion 1808 and the enlarged hole lower portion 1810 are aligned to be generally flush with one another once the upper guide strip segments 1802, 1803 have been rigidly fastened to the lower bed member 1804 to form the fastener bed 1800.

Like with the fastener beds 14 and 1700, and similar to the description concerning FIGS. 67-69, the staple legs 460, 462 (shown in FIG. 15A) to be received in the holes 1806 are sized such that they extend downward through the H-shaped upper portion 1808 and the enlarged lower portion 1810 closely adjacent the aligned side surface portions 1816, 1818 to have a close sliding fit therewith even though each H-shaped hole upper portion 1808 does not have a closed perimeter. The pair of staples 412 received in each hole 1806 are spaced from each other on the lower plate 416 of the fastener 12 so that corresponding legs 460 or 462 of the pair of staples 412 have a close sliding fit with the aligned side surface portions 1816, 1818. By way of example and not limitation, the width 1809, 1811 across the aligned side surface portions 1816, 1818 of the holes 1806 can be only slightly larger than the distance measured from the surface portions of the staple legs 460 or 462 which are facing the side surface portions 1816, 1818, such that the staple legs 460 or 462 are spaced from the side surface portions 1816, 1818 by approximately 0.005 inches. In a similar manner, the staple legs 460, 462 and the hole upper portion 1808 are sized so that the staple legs 460, 462 will have a close sliding fit with the arcuate surfaces of the J-shaped pocket portions 1817 at the corners of the hole upper portion 1808 in the semi-circular openings thereof.

With this sizing, the aligned side surface portions 1816, 1818 are configured and arranged to serve as guide surfaces for both the staple legs 460, 462 of the staples as they are driven through and out from the holes 1806 during a belt fastener application operation. In a similar manner, the pusher of the applicator (e.g., pusher 124 of applicator 18 shown in FIG. 4) is sized to have a width so that it has a close sliding fit with the aligned side surface portions 1816, 1818. In operation, when the pusher 124 of the applicator 18 is driven upwards, side surfaces of the pusher 124 are closely adjacent to the side surface portions 1816, 1818 of the H-shaped hole upper portion 1808 and the enlarged hole lower portion 1810, respectively, so as to be guided as the pusher 124 engages the crowns of the staples and drives the staples including the legs thereof upwardly through and out from the holes 1806. So configured, the H-shaped hole upper portion 1808 and the enlarged hole lower portion 1810 of each hole 1806 (including the aligned side surface portions 1816, 1818 thereof) cooperate to promote effective alignment of the pusher and the staples during staple driving operations.

Although the alternative fastener bed 1800 is configured to function substantially similar to the fastener bed 14 described herein with respect to the applicator locating, staple driving, and applicator advancing operations, the fastener bed 1800 may be formed using less material than the fastener bed 14 based on the separation of the upper guide strip segments 1802, 1803 from the lower bed member 1804. So configured, the upper guide strip segments 1802, 1803 may require less raw material to manufacture than the portion of the fastener bed 14 including the H-shaped hole upper portion because of the gap 1820 formed therebetween (shown in FIG. 70). In some forms, the upper guide strip segments 1802, 1803 may be formed of different materials than the lower bed member 1804. In one non-limiting example, the upper guide strip segments 1802, 1803 may be formed of one type of metal, such as A2 steel, and the lower bed member 1804 may be formed of another, different type of metal. Alternatively, the upper guide strip segments 1802, 1803 and the lower bed member 1804 may be formed of the same material. So configured, varying material configurations of the components forming the fastener bed 1800 are contemplated.

While there have been illustrated and described particular embodiments of the present invention, those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept. Further, directional language such as upper, lower, upward, and downward are used to describe the relative orientation and movement of components as viewed in the drawings and is not intended to limit the scope of the claims. For example, although the fastener plate 414 is described as an upper plate, when installed on an operating conveyor belt, the fastener plate 414 will be below the fastener plate 416.

What is claimed is:

1. A system for securing fasteners to a conveyor belt end, the system comprising:
   a fastener bed to support fasteners, the fastener bed including a plurality of aligned fastener holes configured to receive staples of lower plates of the fasteners; and
   an applicator comprising a plurality of operating members operable to interface with the fastener holes of the fastener bed to advance the applicator along the fastener bed, secure the applicator relative to the fastener bed, and drive end portions of legs of the staples through the conveyor belt and into apertures of upper plates of the fasteners; and
   the applicator is operable to urge upper plates of the fasteners against the conveyor belt end and bend the staple leg end portions against the upper plates of the fasteners to secure the fasteners to the conveyor belt end.

2. The system of claim 1 wherein the applicator is shiftable along the fastener bed to any one of the fastener holes and the applicator is operable to secure the fastener at the one fastener hole to the conveyor belt without the applicator shifting along the fastener bed.

3. The system of claim 1 wherein the applicator is operable to urge the upper plate of one of the fasteners against the conveyor belt end, drive the staple leg end portions of the one fastener through the conveyor belt end and into the through apertures of the upper plate, and bend the staple leg end portions against the upper plate of the fastener while the applicator remains secured relative to the fastener bed.

4. The system of claim 1 wherein each fastener hole includes an upper hole portion and a lower hole portion;
   wherein the operating members include a staple pusher configured to be advanced into the lower hole portion and the upper hole portions of the fastener holes to drive the staple leg end portions through the conveyor belt; and
   wherein the operating members include a pilot configured to be advanced into the lower hole portion but not the upper hole portion to secure the applicator relative to the fastener bed.

5. The system of claim 1 wherein the operating members include at least two distinct operating members configured to be advanced into the fastener holes; and
   wherein the fastener holes each include a pair of side wall portions spaced across the fastener hole from each other and configured to guide the at least two of the operating members as the at least two operating members are advanced into the fastener holes.

6. The system of claim 1 wherein the fastener holes are aligned in a longitudinal direction and each fastener hole includes an upper hole portion have a first lateral width and a lower hole portion having a second lateral width that is greater than the first lateral width.

7. The system of claim 1 wherein the fastener bed includes a lower bed member and an upper bed member configured to be separably coupled to the lower bed member;
   the lower bed member including a plurality of lower hole portions;
   the upper bed member including a plurality of upper hole portions;
   the lower hole portions of the lower bed member and the upper hole portions of the upper bed member cooperate to form the plurality of fastener holes with the upper bed member coupled to the lower bed member.

8. The system of claim 1 wherein the operating members include a pilot configured to extend into and engage the fastener holes.

9. The system of claim 8 wherein the operating members include a pusher operable to be advanced into the fastener holes and drive the staple leg end portions through the conveyor belt end.

10. The system of claim 9 wherein the operating members include an advancing member operable to engage the fastener bed at the fastener holes and advance the applicator along the fastener bed.

11. The system of claim 1 wherein the applicator includes an anvil operable to urge the upper plates of the fasteners against the conveyor belt end and a swiper operable to bend the staple leg end portions against the upper plate of the fasteners.

12. The system of claim 11 wherein the operating members include a pusher operable to drive the staples of the fasteners out of the fastener holes; and wherein the anvil and the swiper are aligned with the pusher such that the anvil is operable to urge an upper plate of one of the fasteners against the conveyor belt end and the pusher and swiper are operable to drive the staple leg end portions of the fastener through the conveyor belt end and bend the staple leg end portions against the upper plate of the fastener while the applicator remains secured to the fastener bed.

13. A system for securing fasteners to a conveyor belt end, the system comprising:
   a fastener bed having a plurality of aligned fastener holes configured to receive staples of fasteners; and
   an applicator comprising:
      an advancing member having at least a portion thereof configured to extend into the fastener holes, the advancing member operable to shift the applicator along the fastener bed;
      a pilot configured to extend into the fastener holes and secure the applicator along the fastener bed;
      an anvil configured to contact upper plates of the fasteners and move the upper plates toward a conveyor belt end received in the fasteners;
      a pusher operable to be advanced into the fastener holes to drive end portions of legs of the fastener staples through the conveyor belt end and into apertures of the upper plates of the fastener; and
      a swiper operable to bend the staple leg end portions against the upper plates of the fasteners and secure the fasteners to the conveyor belt end.

14. The system of claim 13, wherein each fastener hole includes an upper hole portion and a lower hole portion;
   wherein the pusher has an extended position wherein the pusher extends in the upper hole portions and the lower hole portions of the fastener holes and a retracted position wherein the pusher is outside of the fastener holes; and
   wherein the pilot has an extended position wherein the pilot extends in the lower hole portions of the fastener holes and does not extend in the upper hole portions of the fastener holes, the pilot having a retracted position wherein the pilot is outside of the fastener holes.

15. The system of claim 14, wherein the lower hole portion of each fastener hole includes a pair of side wall portions spaced apart from each other across the fastener hole; and
   wherein the pilot has side surfaces configured to engage the side wall portions of the lower hole portion of the fastener holes to secure the applicator against movement along the fastener bed.

16. The system of claim 14, wherein the upper hole portion of each fastener hole include a pair of side wall portions spaced apart from each other across the fastener hole for supporting the staple leg end portions in the fastener hole; and
   wherein the pusher includes side surfaces configured to slide along the side wall portions of the upper hole portions of the fastener holes as the pusher drives the staple leg end portions through the conveyor belt end.

17. The system of claim 16, wherein the lower hole portion of each fastener hole includes a pair of side wall portions spaced apart from each other across the fastener hole, and wherein the side wall portions of the upper hole portion and the side wall portions of the lower hole portion are flush with one another.

18. The system of claim 14, wherein the fastener holes are aligned in a longitudinal direction along the fastener bed; and
   wherein the upper hole portion has a first lateral distance thereacross; and
   wherein the lower hole portion has a second lateral distance thereacross that is larger than the first lateral distance.

19. The system of claim 13, wherein the pilot and pusher are configured to extend into adjacent fastener holes so that the pilot and pusher are side-by-side one another.

20. The system of claim 13, wherein the fastener bed includes an edge extending about each of the fastener holes; and
   wherein the advancing member is configured to engage the edge of the fastener holes to shift the applicator along the fastener bed.

21. The system of claim 13, wherein the applicator includes an advancing assembly comprising the advancing member and a pivotal advancing arm connecting the advancing member to the pusher so that advancing of the pusher causes pivoting of the advancing arm, movement of the advancing member, and shifting of the applicator along the fastener bed.

22. The system of claim 13, wherein the pusher has a retracted position wherein the pusher is below the fastener bed and outside of the fastener holes, the pusher having an extended position wherein the pusher extends in the fastener holes; and
   wherein the anvil and swiper are above the fastener bed and are aligned with the pusher, wherein the anvil, swiper, and pusher are operable perform the plate moving, staple leg driving, and staple leg bending operations on one of the fasteners while the pilot secures the applicator along the fastener bed.

23. The system of claim 13, wherein the applicator includes a coupler configured to selectively couple the pilot and the pusher together so that the pilot and pusher advance together for at least a portion of a range of movement of the pusher as the pusher advances into the fastener holes.

24. The system of claim 23, wherein the coupler is configured to decouple the pilot and the pusher at a predetermined position of the pusher to facilitate the pusher advancing into the fastener holes farther than the pilot advances into the fastener holes.

25. The system of claim 13, wherein the applicator includes a body configured to be slidably coupled to the fastener bed.

26. The system of claim 13, wherein the fastener bed includes a lower bed member and a plurality of upper bed members; and
   wherein the fastener holes include upper hole portions of the upper bed members and lower hole portions of the lower bed member.

27. A fastener bed for facilitating the securing of fasteners to a conveyor belt end, the fastener bed comprising:
   a lower bed member having a plurality of lower hole portions;
   an upper bed member configured to be separably coupled to the lower bed member, the upper bed member having a plurality of upper hole portions;
   the lower hole portions of the lower bed member and the upper hole portions of the upper bed member cooperate to form a plurality of fastener holes with the upper bed member coupled to the lower bed member, the fastener holes configured to receive staples of fasteners for being secured to the conveyor belt end;
   wall portions of each of the fastener holes spaced apart from each other across the fastener holes, the wall portions configured to be engaged by a pilot of an applicator to secure the applicator relative to the fastener holes; and the wall portions of the fastener holes are configured to guide the staples of the fasteners and a pusher of the applicator through the fastener hole as the pusher drives the staples into the conveyor belt end.

28. The fastener bed of claim 27, wherein the upper hole portions of the upper bed member each include two pairs of aligned pocket portions to receive staple legs and a pair of central tab protrusions intermediate the pairs of aligned pocket portions, the upper bed member being removable from the lower bed member to facilitate replacement of the upper bed member.

29. The fastener bed of claim 27 wherein the wall portions include, for each fastener hole, upper hole portion side wall portions of the upper bed member spaced across the fastener hole from each other and lower hole portion side wall portions of the lower bed member spaced across the fastener hole from each other; and wherein the upper hole portion side wall portions and the lower hole portion side wall portions are aligned and are configured to guide the pusher through the lower hole portion and the upper hole portion of the fastener hole.

30. The fastener bed of claim 27, wherein the upper bed member includes a plurality of upper bed segments each configured to be separably coupled to the lower bed member.

31. The fastener bed of claim 27, wherein the upper bed member and the lower bed member include a plurality of mating portions configured to position the upper bed member and lower bed member relative to one another so that the upper and lower fastener hole portions are aligned upon the upper bed member and lower bed member being separably coupled.

32. The fastener bed of claim 27, wherein the fastener holes are aligned in a longitudinal direction with the upper bed member and the lower bed member separably coupled; and wherein the upper hole portion has a first lateral distance thereacross; and wherein the lower hole portion has a second lateral distance thereacross that is larger than the first lateral distance.

33. The fastener bed of claim 27 wherein the upper hole portion has an H-shape; and wherein the lower hole portion has an obround shape.

34. The fastener bed of claim 27, wherein the upper bed member comprises a first guide strip member and a second guide strip member, the first and second guide strip members configured to be coupled to the lower bed member and form a gap between the first and second guide strip members;

wherein protrusions of the first guide strip member extending in the gap and protrusions of the second guide strip member extending in the gap cooperate to define at least a portion of the upper hole portion of each fastener hole.

35. The fastener bed of claim 34, wherein the upper hole portion of each fastener hole has a closed perimeter.

36. The fastener bed of claim 27, wherein the upper bed member is formed of a different material than the lower bed member.

* * * * *